(12) United States Patent
Miyashita et al.

(10) Patent No.: US 7,912,683 B2
(45) Date of Patent: Mar. 22, 2011

(54) TIRE TRANSIENT RESPONSE DATA CALCULATING METHOD, DATA PROCESSING METHOD, TIRE DESIGNING METHOD, VEHICLE MOTION PREDICTING METHOD, AND TIRE CORNERING CHARACTERISTIC EVALUATION METHOD AND EVALUATION DEVICE THEREFOR

(75) Inventors: Naoshi Miyashita, Kanagawa (JP); Kazuyuki Kabe, Kanagawa (JP); Hideki Seto, Kanagawa (JP); Ryoji Hanada, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1026 days.

(21) Appl. No.: 11/730,531

(22) Filed: Mar. 30, 2007

(65) Prior Publication Data
US 2007/0233352 A1 Oct. 4, 2007

(30) Foreign Application Priority Data

Mar. 31, 2006 (JP) ................................. 2006-098250
Jun. 1, 2006 (JP) ................................. 2006-153748
Feb. 9, 2007 (JP) ................................. 2007-030314

(51) Int. Cl.
*G06F 7/60* (2006.01)
*G06F 17/10* (2006.01)
(52) U.S. Cl. ...................... 703/2; 152/209.1; 152/209.15
(58) Field of Classification Search .................. 703/2, 1; 152/209.1, 209.15
See application file for complete search history.

(56) References Cited

U.S. PATENT DOCUMENTS

| 5,001,640 | A  | * | 3/1991 | Matsumoto et al. | ............ | 701/77 |
| 6,083,268 | A  | * | 7/2000 | Kelsey et al. | ...................... | 703/7 |
| 6,531,012 | B2 | * | 3/2003 | Ishiyama | ................... | 156/110.1 |
| 6,697,772 | B2 | * | 2/2004 | Mancosu et al. | .................. | 703/2 |
| 6,741,957 | B1 | * | 5/2004 | Sui et al. | ........................... | 703/8 |

(Continued)

FOREIGN PATENT DOCUMENTS

JP 2003-57134 A 8/2001
JP 2005-88832 A 9/2003

OTHER PUBLICATIONS

Iida et al., "Effects of Dynamic tire Properties on Vehicle Handling and Stability", Automotive Engineering, 1984, pp. 320-325, vol. 38, No. 3 (with its partial English translation).

(Continued)

*Primary Examiner* — Dwin M Craig
(74) *Attorney, Agent, or Firm* — Knobbe Martens Olson & Bear, LLP

(57) ABSTRACT

The tire transient response data obtained while cornering with a slip angle is calculated based on a tire dynamic model. The deformation response of a tread part in the tire dynamic is set as a first-order-lag response. The value of the transient response parameter is initialized in order to define the first-order-lag response. The time-series data of the transient response of the slip angle between the tread part and the road surface in the tire dynamic model is obtained by computing the convolution integral of the defined response function of the first-order-lag response with a time gradient of the time-series data of the slip angle. The value of a lateral force is calculated by using the tire dynamic model based on the time-series data of the transient response of the slip angle thus obtained. Accordingly, the transient response data is calculated and the value of the transient response parameter is obtained.

34 Claims, 26 Drawing Sheets

U.S. PATENT DOCUMENTS

| | | | |
|---|---|---|---|
| 6,754,615 B1 * | 6/2004 | Germann et al. | 703/8 |
| 7,050,952 B2 * | 5/2006 | Kabe et al. | 703/2 |
| 7,085,688 B1 * | 8/2006 | Sumida et al. | 703/2 |
| 7,483,821 B2 * | 1/2009 | Miyashita et al. | 703/8 |
| 2003/0115037 A1 * | 6/2003 | Sumida | 703/22 |
| 2005/0065666 A1 | 3/2005 | Miyashita et al. | |
| 2005/0150283 A1 * | 7/2005 | Shick et al. | 73/146 |

OTHER PUBLICATIONS

"A Study on Transient Property of Automotive Tires", Transaction of Society of Automotive Engineers of Japan, Jan. 15, 2004, pp. 173-178, vol. 35, No. 1, Society of Automotive Engineers of Japan (with partial English translation).

* cited by examiner

FIG. 3

| NON-LINEAR PARAMETER | LINEAR PARAMETER |
|---|---|
| $\varepsilon$   $C_q$ | $K_{y0}$   $l_e$ |
| $1/G_{mz}$   $C_{xc}$ | $A_x$   $\mu_d$ |
| $n$   $K_{y0}/\mu_s$ | |
| $t_r, t_s, t_d$ | |

SLIP ANGLE $\alpha(t)$ ⟶ MODEL ⇌ $F_y(t), M_z(t)$ $$\alpha_e(t) = \alpha(t) - \frac{1}{G_{mz}}\int_0^t \left[1-\exp\left(-\frac{t-t'}{t_r}\right)\right]\frac{dM_z(t')}{dt'}dt' \quad (1)$$

$$q = C_q \cdot M_z(t) \quad (2)$$

$$\left(\frac{x_c}{l}\right) = \frac{1}{2} - C_{xc} \cdot M_z(t) \quad (3)$$

$$\alpha_f(t) = \int_0^t \left[1-\exp\left(-\frac{t-t'}{t_s}\right)\right]\frac{d\alpha_e(t')}{dt'}dt' \quad (4)$$

$$2\left(\frac{K_{y0}}{\mu_s}\right)\cdot\left(\frac{l_h}{l}\right)\cdot\left[\tan\alpha_f - (\varepsilon\cdot l)\cdot F_{ye}(t)\cdot\left\{1-\left(\frac{l_h}{l}\right)\right\}\right] = \frac{n+1}{n}\cdot F_z \cdot D_{gsp}\left(\left(\frac{l_h}{l}\right);n,q\right) \quad (5)$$

$$F_y(t) = 2K_{y0}\cdot\int_0^{(l_h/l)}\left[u\cdot\tan\alpha_f(u) - (\varepsilon l)\cdot F_{ye}(t)\cdot u(1-u)\right]du$$
$$+ \frac{n+1}{n}\cdot\mu_d\cdot F_z\cdot\int_{(l_h/l)}^1 D_{gsp}(u;n,q)du \quad (6)$$

$$M_z(t) = l_e\cdot\left[2K_{y0}\cdot\int_0^{(l_h/l)}\left[u\cdot\tan\alpha_f(t) - (\varepsilon l)\cdot F_{ye}(t)\cdot u(1-u)\right]\left\{u-\left(\frac{x_c}{l}\right)\right\}du\right.$$
$$\left.+\frac{n+1}{n}\cdot\mu_d\cdot F_z\cdot\int_{(l_h/l)}^1 D_{gsp}(u;n,q)\cdot\left\{u-\left(\frac{x_c}{l}\right)\right\}du\right] + A_x\cdot\left(\frac{l_h}{l}\right)\cdot\tan\alpha_f(t) \quad (7)$$

$$F_{ye}(t) = \int_0^t \left[1-\exp\left(-\frac{t-t'}{t_d}\right)\right]\frac{dF_y(t')}{dt'}dt' \quad (8)$$

FIG. 4A
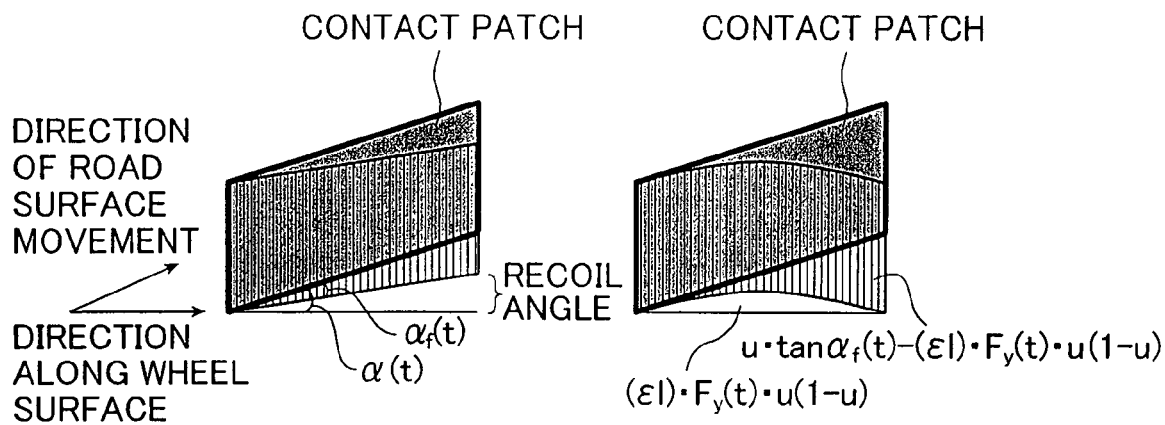
FIG. 4B
FIG. 4C
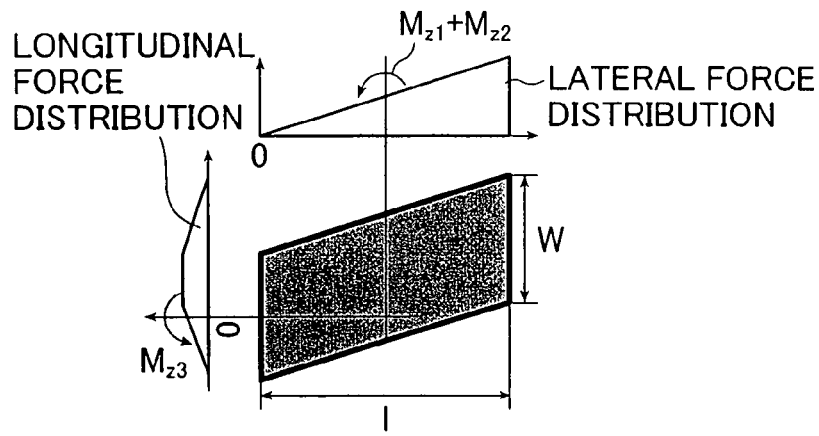

FIG. 5A
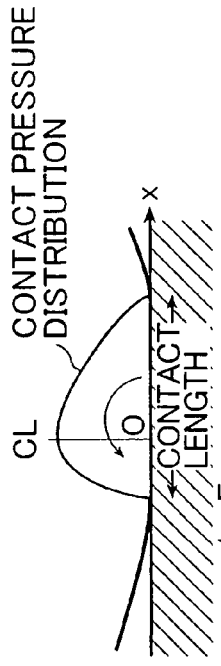
FIG. 5B
$$p(x) = \frac{n+1}{n} \cdot \frac{F_z}{wl} \cdot D_{gsp}(x;n,q) \quad (9)$$
WHERE $D_{gsp}(x;n,q) = (1-|2x-1|^n) \cdot \{1-q \cdot (2x-1)\}$
FIG. 5C
CHANGE OF $D_{gsp}(x;n,q)$ DEPENDING ON COEFFICIENT n
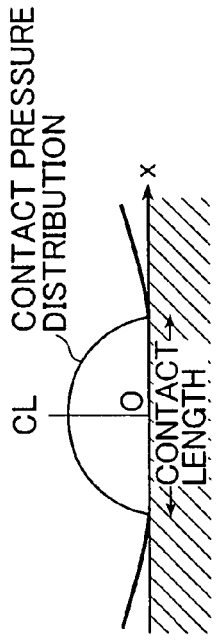
FIG. 5D
CHANGE OF $D_{gsp}(x;n,q)$ DEPENDING ON BIAS COEFFICIENT q
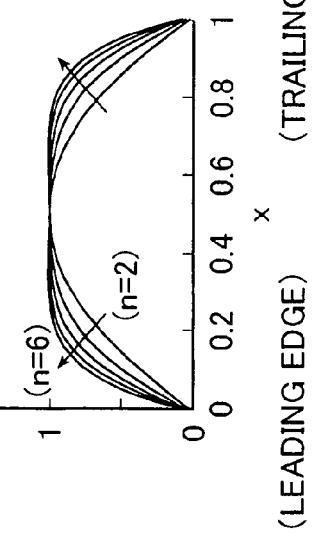

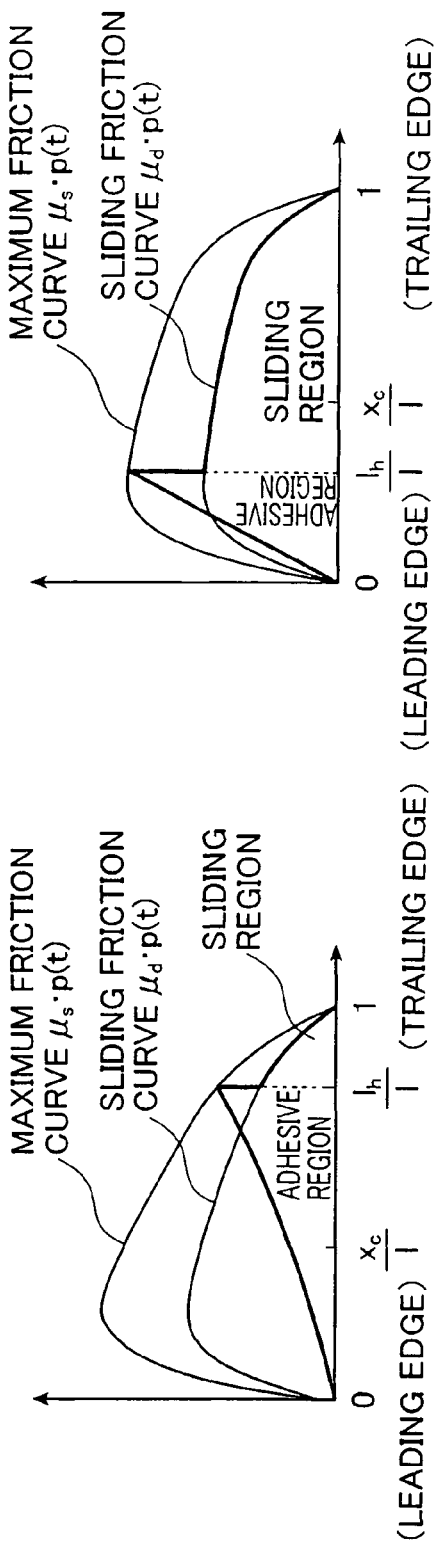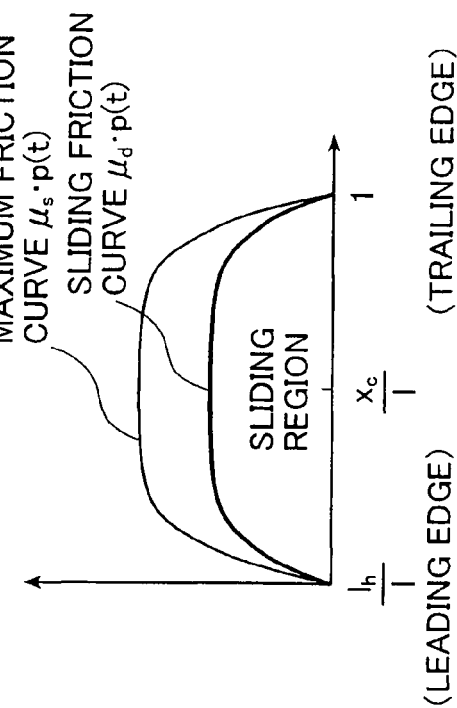

: α(t)

: ACTUALLY MEASURED $F_y(t)$

: ACTUALLY MEASURED $M_z(t)$

: α(t)

: $F_y(t)$

: $M_z(t)$

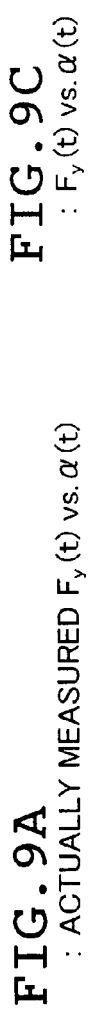
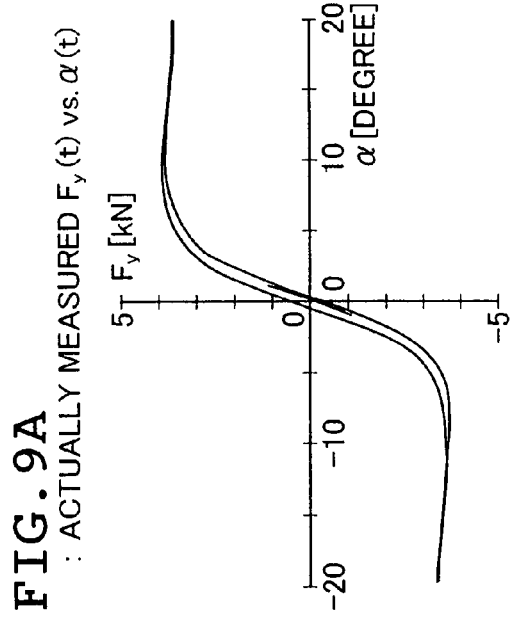
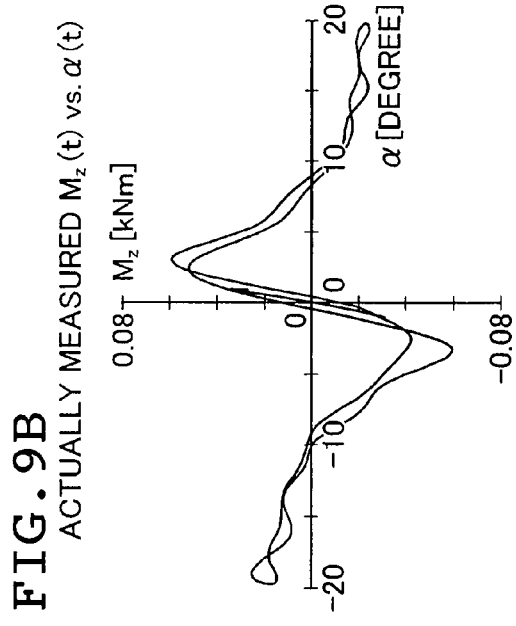
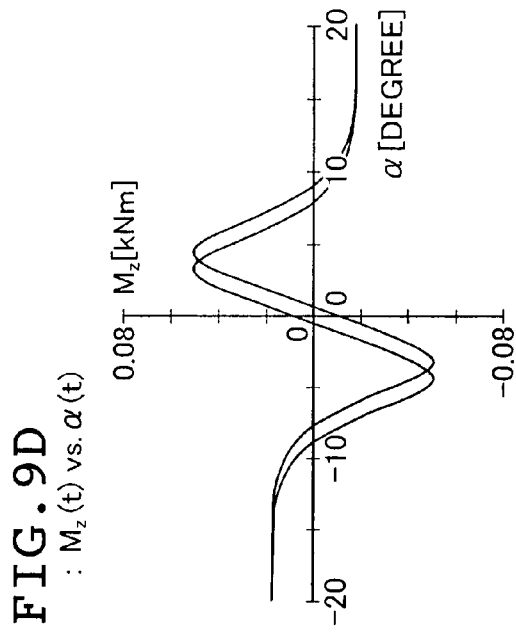

: SLIP RATIO S(t)

: $F_x(t)/F_z$ (0.5Hz)

: $F_x(t)/F_z$ (2Hz)

TIRE TRANSIENT RESPONSE DATA CALCULATING METHOD, DATA PROCESSING METHOD, TIRE DESIGNING METHOD, VEHICLE MOTION PREDICTING METHOD, AND TIRE CORNERING CHARACTERISTIC EVALUATION METHOD AND EVALUATION DEVICE THEREFOR

CROSS REFERENCE TO RELATED APPLICATION

This application claims the benefit and priority to Japanese Application Number 2006-098250 filed on Mar. 31, 2006, Japanese Application Number 2006-153748 filed on Jun. 1, 2006, and Japanese Application Number 2007-030314 filed on Feb. 9, 2007. The disclosures of the above-described applications are hereby incorporated by reference in their entirety.

BACKGROUND OF THE INVENTION

The present invention relates to a transient response data calculating method for calculating the transient response data of a tire during cornering or braking/driving based on a tire dynamic model that is built from at least one dynamic element parameter, a data processing method for calculating the value of a transient response parameter of a response function of the tire dynamic model that determines the behavior of transient response, and a tire designing method and vehicle motion predicting method that use the transient response calculating method. The present invention also relates to a tire cornering characteristic evaluating method and device for quantitatively evaluating the transient response characteristic of a tire's lateral force, which is generated in a tire rolling at a slip angle.

The recent increase in engine power has brought about the performance enhancement of passenger vehicle tires at a higher aspect ratio, with the intention of improving a vehicle's maximum cornering capability and responsiveness as well as traction performance. Despite such enhancement, it cannot be positively said that the steering stability in infinitesimal steering at high speed has been improved and, with the advancement of expressways, it is important to develop a tire that offers excellent infinitesimal steering stability at high speeds. A significant factor in the steering stability performance of a tire fit to a vehicle is the tire cornering characteristic, which is related to the response characteristic when the vehicle is subjected to quick steering movements.

The cornering characteristic of a tire is expressed as a response in the form of the tire's lateral force, cornering force, self-aligning torque (or the like) to an input to the tire such as load, slip angle, camber angle or slip ratio when the tire is subjected to quick steering movements. Lately, the demand for the development of a high-performance tire that exhibits good steering stability even with infinitesimal steering at high speed has created the need for a method and device that are capable of evaluating, quantitatively and precisely, the cornering characteristic of the tire alone.

Moreover, because a tire is the only thing between a vehicle and the road surface that transfers a force from the road surface to the vehicle, tires play an important role in today's automobile industry, which seeks advanced vehicle control for safe vehicle driving and the avoidance of danger. Therefore, it is necessary to analyze the tire's cornering characteristics.

The "actual ride feeling test," in which a test tire is fit to a vehicle and an evaluator steers the vehicle so as to obtain information about steering stability, as sensed by the evaluator, is one of the conventional test methods for the evaluation of steering stability. The actual ride feeling test has an advantage in that information is obtained about steering stability in actual steering; however, the evaluation based on senses of an evaluator is not quantitative.

As a means of analyzing the tire cornering characteristic, there is a known method described in JP 2005-88832 A. This publication discusses a calculation in which the cornering characteristic of a tire in a steady state when a slip angle is given as time-series data is calculated based on a tire dynamic model built from multiple tire dynamic-element parameters. According to that publication, a tire can be efficiently designed through such a method.

Considering the above-mentioned tire dynamic model, a cornering characteristic in a steady state can be obtained by giving a slip angle, but it is not possible to reproduce a transient response during cornering, which changes with the slip angle given to the tire dynamic model in time series. Particularly in quick emergency steering for the avoidance of danger, the lateral force and self-aligning torque that the quick steering generates in a tire exhibit transient characteristics that differ from those in a steady state, and consequently it is meaningless to analyze vehicle motion from a cornering characteristic while in a steady state.

Additionally, today's vehicles generally use the anti-lock brake system (ABS), which controls the slip ratio on the basis of a few Hz so that the maximum braking power is always obtained. The braking power thus generated is therefore based on a characteristic in the transient state, which differs from that in a steady state. Therefore, it is meaningless to analyze the motion of a vehicle that has ABS from a longitudinal force in a steady state, which is calculated through the use of the above-mentioned tire dynamic model.

The evaluation of a tire dynamic characteristic with the use of an indoor cornering testing machine is also conducted in order to quantitatively and precisely evaluate the cornering characteristic of the tire alone. Iida, "Influence of Tire Dynamic Characteristics on Vehicle Motion Performance," Automotive Engineering, 1984, No. 3, Vol. 38, p. 320 is given as an example. In an example of the conventional way of evaluating a cornering dynamic characteristic in order to evaluate a tire's dynamic characteristic through the use of an indoor cornering test machine, a tire is rolled on a contact patch at a constant speed. Slip-angle inputs are then applied to the tire at different frequencies in order to obtain a response characteristic in the form of a lateral force, cornering force, self-aligning torque or the like with respect to a distance frequency (distance frequency characteristic). The distance frequency characteristic is determined by the ratio of an angular speed ω of a slip angle input with respect to the tire's rolling speed.

SUMMARY OF THE INVENTION

It is a known fact that the distance frequency response characteristic of a tire's lateral force with respect to a given slip angle (hereinafter referred to as the distance frequency characteristic) does not match well with the result of the aforementioned actual ride feeling test. This is because the distance frequency characteristic changes in accordance with the tire's rolling speed. One of the possible reasons that a distance frequency characteristic changes in accordance with the tire's rolling speed is that the temperature of the tire changes in accordance with its rolling speed, which generally changes the tire's cornering characteristic. Moreover, indoor cornering testing machines measure output information such as a tire's lateral force by repeatedly applying a slip angle that changes continuously, in a sine-wave manner, in time series.

A tire rolling at a slip angle reaches an excessively high temperature and thereby degrades faster. Moreover, successive inputs of slip angles are very different from the time-series slip angles generated in a tire while the vehicle is being driven. It stands to reason that a response such as a tire's lateral force to a slip angle, which changes continuously in a sine-wave fashion in time series, will not reflect the result of an actual ride feeling test. In short, a tire's lateral force obtained as a response to a slip angle that changes continuously in a sine-wave fashion does not match the result of an actual ride feeling test. Furthermore, it is not clear how the lateral force data obtained as a tire response should be processed in order to make the lateral force data consistent with the result of an actual ride feeling test.

Additionally, nowadays it is possible to evaluate various conceptual tires, which are merely under consideration and not manufactured even experimentally, through simulation with the use of a finite-element method and finite-element models reproducing various conceptual tires. However, this poses a problem in that the cornering characteristic of a conceptual tire cannot be precisely evaluated in a manner that ensures consistency with the result of an actual ride feeling test, because it isn't clear how the tire's lateral force data obtained as a response to an input slip angle should be processed, as mentioned above.

The present invention has been created in order to solve the above-mentioned problems. Accordingly, a further objective of the present invention is to provide a method of calculating the transient-response data of a tire during cornering and braking/driving so as to calculate the tire's transient response through the use of a tire dynamic model; a data processing method for determining the value of a parameter that determines the transient response and is used in the tire model; a tire designing method and vehicle motion predicting method that use the transient response data calculating method; a tire cornering characteristic evaluating method and evaluating device that are capable of accurately evaluating and predicting a tire cornering characteristic equivalent to that obtained when a vehicle is actually steered on a test tire; or for a conceptual tire that is under consideration but yet to be manufactured experimentally.

The present invention provides a tire transient response data calculating method for the calculation of tire transient response data during cornering with a slip angle provided as time-series data based on a tire dynamic model constituted by using at least one tire dynamic-element parameter, comprising the following steps:
(1) acquiring a value of at least one tire dynamic-element parameter constituting the tire dynamic model, thereby making the tire dynamic model operable;
(2) calculating the time-series data of a transient response of the slip angle between a tread part and a road surface in the tire dynamic model by computing a convolution integral of a response function of a first-order-lag response of the tire dynamic model with a time gradient of the time-series data of the slip angle provided to the tire dynamic model, the first-order-lag response specifying a deformation response of the tread part during cornering; and
(3) calculating, as transient response data during cornering, output data of at least one of a lateral force and self-aligning torque by using the tire dynamic model based on the calculated time-series data of the transient response of the slip angle.

It is preferable, in this invention, that the time-series data of the slip angle provided to the tire dynamic model is modified by the torsional deformation of the tire dynamic model, which is caused by self-aligning torque during cornering, and the modified time-series data is used to calculate the time-series data of the transient response of the slip angle. The torsional deformation of the tire that is generated by self-aligning torque is preferably represented by dividing the convolution integral of the response function of the first-order lag response of the tire dynamic model, with a time gradient of previous time-series data of the self-aligning torque, by the value of the stiffness contained in the tire dynamic model, the first-order lag response thereby specifying the deformation response of a side part during cornering.

The output data calculated using the tire dynamic model may comprise the lateral force data corrected by the lateral bending deformation of a belt part generated by the lateral force. The lateral bending deformation of the belt part generated by the lateral force is preferably represented by computing the convolution integral of the response function of the first-order lag response of the tire dynamic model with the time gradient of the previous time-series data of the generated lateral force, the first-order lag response thereby specifying a deformation response of the belt part during cornering.

The invention also provides a method for calculating the tire's transient response data during cornering with a slip angle provided as time-series data based on a tire dynamic model, comprising the following steps:
(1) previously acquiring values of at least one of a lateral force and a self-aligning torque in a steady state from actual measurement of a tire by providing a tire with the time-series data of the slip angle varying across at least a range between 0 degrees and a predetermined angle as the slip angle in the steady state;
(2) calculating the time-series data of a transient response of the slip angle between a tread part and a road surface in the tire dynamic model by computing a convolution integral of a response function of a first-order-lag response of the tire dynamic model with a time gradient of the time-series data of the slip angle provided to the tire, the first-order-lag response specifying a deformation response of the tread part during cornering; and
(3) acquiring, as transient response data during cornering, the time-series data of at least one of the lateral force and self-aligning torque a in transient state by obtaining a value of at least one of the lateral force and self-aligning torque in the steady state corresponding to each value of the calculated time-series data of the transient response of the slip angle.

The invention also provides a data processing method in which the deformation response of the tread part, which specifies the transient response during cornering in a tire dynamic model, is set as a first-order-lag response in order to calculate the value of a transient response parameter that defines the first-order lag response, comprising the following steps:
(1) previously acquiring measurement data of the transient response of at least one of a lateral force and self-aligning force during cornering of a tire by providing the tire with the time-series data of a slip angle as a measurement condition;
(2) setting a value of the transient response parameter initially anddefining a response function of the first-order-lag response, thereby making the tire dynamic model operable, thereby making the tire dynamic model operable;
(3) performing simulating calculation including:
  (a) obtaining the time-series data of a transient response of the slip angle between the tread part and a road surface in the tire dynamic model by computing a convolution integral of the defined response function of the first-order-lag response with a time gradient of the time-series data of the slip angle provided to the tire as the measurement condition;

(b) calculating, as the time-series data of at least one of the lateral force and the self-aligning torque a in transient state during cornering, values of at least one of the lateral force and the self-aligning torque by using the tire dynamic model based on the obtained time-series data of the transient response of the slip angle; and (3) obtaining a sum of square residuals between the calculated time-series data of at least one of the lateral force and self-aligning torque and the measurement data of the tire, repeating the simulating calculation while correcting the set value of the transient response parameter until the sum of square residuals becomes minimum, and determining the value of the transient response parameter obtained when the sum of square residuals becomes minimum as the value of the transient response parameter that defines the first-order-lag response.

The invention provides a data processing method, in which a deformation response of a tread part which specifies a transient response during cornering in a tire dynamic model is set as a first-order-lag response to calculate a value of a transient response parameter that defines the first-order-lag response, comprising the steps of:

(1) previously acquiring measurement data of the transient response of at least one of a lateral force and a self-aligning torque during cornering of a tire by providing the tire with the time-series data of a slip angle, which varies across at least a range between 0 degrees and a predetermined angle while the slip angle reciprocates, as a measurement condition;

(2) setting the value of the transient response parameter initially and defining a response function of the first-order-lag response, thereby making the tire dynamic model operable;

(3) performing regression calculation including:

(a) obtaining the time-series data of a transient response of the slip angle between the tread part and a road surface in the tire dynamic model by computing a convolution integral of the response function of the first-order-lag response with a time gradient of the time-series data of the slip angle provided to the tire as the measurement condition;

(b) subjecting a characteristic curve, which represents a values of at least one of the lateral force and the self-aligning torque with respect to values of the obtained time-series data of the transient response of the slip angle, to least square regression into a single smooth curve by using a curve function; and (c) obtaining a sum of square residuals between the least square regression curve obtained by the least square regression and the characteristic curve; and (4) repeating the regression calculation while correcting the set value of the transient response parameter until the calculated sum of square residuals becomes minimum, and determining the value of the transient response parameter obtained when the sum of square residuals becomes minimum as the value of the transient response parameter that defines the first-order-lag response.

The invention provides a tire transient response data calculation method for calculating tire transient response data during braking/driving with a slip ratio in the longitudinal direction of the tire, provided as time-series data, based on a tire dynamic model constituted by using at least one tire dynamic-element parameter, such method comprising the following steps:

(1) acquiring a value of the tire dynamic element parameter constituting the tire dynamic model, thereby making the tire dynamic model operable;

(2) calculating the time-series data of a transient response of the slip ratio between a tread part and a road surface in the tire dynamic model by computing a convolution integral of a response function of a first-order-lag response of the tire dynamic model with a time gradient of the time-series data of the slip ratio provided to the tire dynamic model, the first-order-lag response specifying a deformation response of the tread part during braking/driving; and (3) calculating, as transient response data during braking/driving, output data of a longitudinal force by using the tire dynamic model based on the time-series data of the transient response of the slip ratio.

The invention provides a tire transient response data calculating method, for calculating tire transient response data during braking/driving with a slip ratio in a longitudinal direction of a tire provided as time-series data based on a tire dynamic model, comprising the steps of:

(1) previously acquiring values of a longitudinal force in a steady state from actual measurement of the tire when the time-series data of the slip ratio varying across at least a range between 0 degrees and a predetermined slip ratio is provided as the slip ratio in the steady state;

(2) calculating the time-series data of a transient response of the slip ratio between a a tread part and road surface in the tire dynamic model by computing a convolution integral of a response function of a first-order-lag response of the tire dynamic model with a time gradient of the time-series data of the slip ratio, the first-order-lag response specifying a deformation response of the tread part during braking/driving; and (3) acquiring, as transient response data during braking/driving, the time-series data of the longitudinal force in a transient state by obtaining a value of the longitudinal force in the steady state corresponding to each value of the calculated time-series data of the transient response of the slip ratio.

The invention also provides a data processing method whereby the deformation response of the tread part, which specifies the transient response during the braking/driving of a tire in a tire dynamic model, is set as a first-order lag response in order to calculate the value of the transient response parameter that defines the first-order lag response, comprising the following steps:

(1) previously acquiring measurement data of the transient response of a longitudinal force during braking/driving of a tire by providing the tire with the time-series data of a slip ratio, which varies across at least a range between 0 degrees and a predetermined slip ratio while the slip ratio reciprocates, as a measurement condition;

(2) setting the value of the transient response parameter initially and defining a response function of the first-order-lag response, thereby making the tire dynamic model operable;

(3) performing regression calculation including:

(a) obtaining the time-series data of a transient response of the slip ratio between the tread part and a road surface in the tire dynamic model by computing a convolution integral of the response function of the first-order-lag response with a time gradient of the time-series data of the slip ratio provided to the tire as the measurement condition;

(b) subjecting a characteristic curve, which represents values of the longitudinal force with respect to values of the obtained time-series data of the transient response of the slip ratio, to least square regression into a single smooth curve by using a curve function; and (c) obtaining a sum of square residuals between the least square regression curve obtained by the least square regression and the characteristic curve; and (4) repeating the regression calculation while correcting the set value of the transient response parameter until the calculated sum of square residuals becomes minimum, and determining the value of the transient response parameter obtained when the sum of square residuals becomes minimum as the value of the transient response parameter that defines the first-order-lag response.

The invention provides a data processing method, in which a deformation response of a tread part which specifies a transient response during braking/driving in a tire dynamic model constituted by using at least one tire dynamic element parameter is set as a first-order-lag response to calculate a value of a transient response parameter that defines the first-order-lag response, comprising the steps of:

(1) previously acquiring measurement data of the transient response of a longitudinal force during braking/driving of a tire by providing the tire with the time-series data of a slip ratio in a longitudinal direction of the tire as a measurement condition;

(2) setting the value of the transient response parameter initially and defining a response function of the first-order-lag response, thereby making the tire dynamic model operable;

(3) performing simulating calculation including:

(a) obtaining the time-series data of a transient response of the slip ratio between the tread part and a road surface in the tire dynamic model by computing a convolution integral of the defined response function of the first-order-lag response with a time gradient of the time-series data of the slip ratio provided to the tire as the measurement condition;

(b) calculating a longitudinal force by using the tire dynamic model based on a value of the obtained time-series data of the transient response of the slip ratio, to obtain the time-series data of the longitudinal force in a transient state during braking/driving; and (c) calculating a sum of square residuals of the calculated time-series data of the longitudinal force and the measurement data of the tire, repeating the simulating calculation while correcting the set value of the transient response parameter until the sum of square residuals becomes minimum, and determining the value of the transient response parameter obtained when the sum of square residuals becomes minimum as the value of the transient response parameter that defines the first-order-lag response.

The above inventions can be adapted to a tire designing method or a vehicle motion predicting method.

For example, the tire transient response data calculated by the tire transient response data calculating method is repeatedly calculated and output while correcting the value of the tire dynamic element parameter or the value of a transient response parameter that defines the first-order-lag response by adjusting the tire component member that defines the tire dynamic element parameter or the first-order-lag response until the output transient response data satisfies a preset target condition; and the tire component member is determined as a target tire component member when the output data satisfies the target condition.

The transient response data calculated by the tire transient response data calculating method is used to predict a vehicle motion based on a vehicle model in which the transient response data is provided to an axle portion of the vehicle model.

The invention also provides a method of evaluating the cornering characteristic of a tire when the slip angle is provided as time-series data, comprising the following steps:

(1) acquiring time-series lateral force data with respect to the time-series data of the slip angle, regarding the tire which generates a tire lateral force by being brought into contact with a ground in a contact patch and rolling at a predetermined rolling speed; and (2) deriving a value of a tire dynamic element parameter representing the cornering characteristic of the tire by using: a transient response calculation model that is constituted by using at least one tire dynamic element parameter and is used to calculate output data corresponding to the lateral force data of a transient response generated in the tire with respect to the time-series data of the slip angle; and the acquired lateral force data.

In the above invention, it is preferable that the step of deriving the value of the tire dynamic element parameter is performed by using the time-series data of the transient response of the slip angle obtained by computing the convolution integral of the response function of the first-order-lag response of the transient response calculation model calculation model, which specifies the deformation response of the tread part of the tire during cornering, with the time gradient of the time-series data of the slip angle provided to the transient response calculation model.

Preferably, the step of acquiring the lateral force data is performed by reproducing an evaluation target tire with a tire finite-element model, which is obtained by dividing the evaluation target tire into a finite number of elements and using a finite-element method to acquire, as the lateral force data, the simulation data of the lateral force acting on the tire finite-element model, which is brought into contact with the ground in the contact patch and caused to roll at the predetermined speed, and to which a time-series slip angle is input.

More preferably, the tire finite-element model is coupled with a rim model for use in reproducing a rim, and reproduces the tire brought into contact with the ground in the contact patch and rolling at the predetermined speed by bringing the tire finite-element model into contact with a flat virtual road surface in the contact patch and moving the tire finite-element model at the predetermined rolling speed relative to the virtual road surface.

The tire finite-element model preferably includes a reinforcement material portion corresponding to a cord reinforcing material of the tire, the reinforcement material portion having such a material characteristic that the stiffness along the tensile direction differs from the stiffness along the compression direction.

It is more preferable that the tire finite-element model is subjected to an inflation process to simulate tire inflation, and that the inflation process is performed after one of an initial stress and an initial strain is applied to at least one portion of the tire finite-element model.

Alternatively, in the invention the step of acquiring the lateral force data is performed by providing a time-series slip angle to the tire while bringing the tire into contact with the ground in the contact patch and rolling the tire at the predetermined speed, and by acquiring, as lateral force data, the measurement data of the time-series tire lateral force corresponding to the slip angle.

It is also preferable that the transient response calculation model is represented by setting the transient response of the tire lateral force with respect to the slip angle as the first-order-lag response, and the slip angle to be input ranges within such a linear range that the slip angle and the response of the tire lateral force with respect to the slip angle are in a substantially linear relationship.

It is preferable that the step of deriving the value of the tire dynamic element parameter is performed by using the time-series data of the input slip angle and the time-series lateral force data corresponding to the time-series data of the slip angle in such a manner that the output data of the transient response calculation model matches the time-series lateral force data within an allowable range.

The slip angle may range from −2.0 degrees to 2.0 degrees. Then, it is preferable that when the output data is represented by F(t), the transient response calculation model contains a formula represented by Formula (A) described below; and the step of deriving the value of the tire dynamic element parameter includes obtaining a value of a cornering stiffness $K_y$ and a value of a time constant $t_3$, which are dynamic element parameters of Formula (A) described below, by using the input time-series slip angle $\alpha(t)$ in such a manner that the F(t) within Formula (A) described below matches the time-series lateral force data $F_y(t)$ corresponding to the slip angle $\alpha(t)$ within the allowable range.

[Mathematical Formula 1]

$$F(t) = K_y \cdot \tan\left\{\int_0^t \left[1 - \exp\left(-\frac{t-t'}{t_3}\right)\right]\frac{d\alpha(t')}{dt'}dt'\right\} \quad (A)$$

It is preferable that the output data calculated by the transient response calculation model comprises the data of the tire lateral force transmitting to the wheel side via an equivalent stiffness $K_L$ of the entirety of the tire with respect to the input of the slip angle; and when the predetermined rolling speed at the time of acquiring the lateral force data is assumed to be V, the step of deriving the value of the tire dynamic element parameter includes deriving a value of the equivalent stiffness $K_L$, representing a transmission characteristic of the tire lateral force by substituting the value of the cornering stiffness $K_y$ and the value of the time constant $t_3$, which are obtained by using the above-mentioned Formula (A), and the rolling speed V, into Formula (B) described below:

[Mathematical Formula 2]

$$t_3 = \frac{K_y}{K_L V} \quad (B)$$

The invention also provides an apparatus for evaluating the cornering characteristic of a tire under a condition in which the slip angle is provided as time-series data, comprising:
(1) a data acquiring section for acquiring time-series lateral force data with respect to a time-series slip angle, regarding the tire being brought into contact with a ground in a contact patch and rolling at a predetermined rolling speed; and
(2) a deriving section for deriving a value of a tire dynamic element parameter representing the cornering characteristic of the tire by using: a transient response calculation model that is constituted by using at least one tire dynamic element parameter and is used to calculate output data corresponding to the lateral force data of a transient response generated in the tire with respect to the slip angle; and the lateral force data.

It is preferable that the deriving section derives the value of the tire dynamic element parameter by using the time-series data of a transient response of the slip angle obtained by computing a convolution integral of a response function of a first-order-lag response, which specifies a deformation response of a tread part of the tire during cornering, with a time gradient of the time-series data of the slip angle provided to the transient response calculation model.

In the present invention, the time-series data of transient response to the slip angle or the slip ratio of the tread part with respect to the road surface in a tire dynamic model is calculated through the convolution of the response function of first-order lag response, which defines the deformation response of the tread part during cornering, and the time gradient of time-series data of the slip angle applied to the tire dynamic model; and, based on the time-series data of the transient response to the slip angle, the time-series data of lateral force, self-aligning torque or longitudinal force is calculated. Accordingly, time-series data in the transient state can readily be calculated through the use of a tire dynamic model.

The deformation response of the tread part that defines the transient response during cornering or braking/driving in a tire dynamic model is set as the first-order lag response in the tire dynamic model. In calculating the value of the transient response parameter that determines the first-order lag response, the value of the transient response parameter is initially set in order to fix the response function of the first-order-lag response, and the response function of the first-order lag and the time gradient of time-series data of the slip angle or slip ratio are integrated in a convolution integral so as to obtain the time-series data of transient response to the slip angle of the tread part with respect to the road surface in the tire dynamic model. Accordingly, the time-series data of a lateral force, self-aligning torque or longitudinal force in the transient state during cornering or braking/driving can readily be calculated, and the value of the transient response parameter can be searched for and determined with relative ease.

Furthermore, an actual constituent member of a tire is associated with the value of the dynamics element parameter of a tire dynamic model, or the value of the transient response parameter, which makes it possible to design a tire that satisfies a desired condition in regard to the time-series data of a lateral force, self-aligning torque or longitudinal force. Time-series data of a lateral force, self-aligning torque or longitudinal force that is calculated by the tire transient-response calculating method can be entered into a vehicle model in order to predict the motion of the vehicle during cornering or braking/driving.

A tire cornering characteristic evaluating method and evaluating device of the present invention obtains, as tire lateral force data, time-series measurement data equivalent to that of when a time-series slip angle is applied to an actual tire and, in addition, obtaining, as lateral force data, the simulation data of a lateral force acting on the finite element model of a tire.

In obtaining the measurement data of the lateral force of a tire, the rate of change of the slip angle input to the tire is set as the rate of change at which a slip angle changes in actual vehicle steering. The cornering characteristic evaluation result thus obtained is close to that of when the vehicle is actually steered. This also makes quantitative evaluation of a tire's cornering characteristic possible while setting the range of slip angle input to the tire to a relatively narrow range. Accordingly, it is possible to suppress the tire degradation caused by the test, and the same tire can be evaluated multiple times in terms of its cornering dynamic characteristic under different speed conditions.

When obtaining, as lateral force data, the simulation data of lateral force acting on the finite element model of a tire, an evaluation result equivalent to that of when a vehicle is actually steered can be obtained through a simulation that uses the finite element model without actually manufacturing a test tire.

The range of slip angle input is set within a linear range where the slip angle input and the tire's lateral force generated in response to the slip angle input have a substantially linear relationship. This makes it possible to use a relatively simplified tire dynamic model (i.e., a transient response calculation model) in which the cornering characteristic response to a slip angle input is represented by a first-order lag system. With such a relatively simplified transient response calculation model, the value of the tire dynamic element parameter indicating the tire's cornering characteristic can be derived through relatively simple processing alone. Such information on a tire's cornering characteristic, as obtained according to the present invention, can be used favorably in, for example, the development of a tire that improves the steering stability in high-speed driving.

BRIEF DESCRIPTION OF THE DRAWINGS

In the accompanying drawings:

FIG. 3 is a diagram for illustrating the tire dynamic model during cornering used in the methods of tire transient response data calculation and data processing, according to the present invention.

FIGS. 4A to 4C are diagrams that illustrate the tire dynamic model used in the methods of tire transient response data calculation and data processing, according to the present invention.

FIGS. 5A to 5C are diagrams that illustrate the tire dynamic model used in the methods of tire transient response data calculation and data processing, according to the present invention.

FIGS. 6A to 6C are diagrams that illustrate the tire dynamic model used in the methods of tire transient response data calculation and data processing, according to the present invention.

FIGS. 9A and 9B are examples of the time-series data acquired by actually measuring a tire, and FIGS. 9C and 9D are diagrams that show the time-series data corresponding to FIGS. 9A and 9B, respectively, which are acquired by the tire transient response data calculating method according to the present invention.

DETAILED DESCRIPTION OF THE PREFERRED EMBODIMENT

A detailed description will be given below, with reference to the accompanying drawings and through a preferred embodiment of the present invention, of a tire transient response data calculating method, a data processing method, a tire designing method and a vehicle motion predicting method that use the tire transient response data calculating method, as well as a tire cornering characteristic evaluating method and device.

Figure 1:
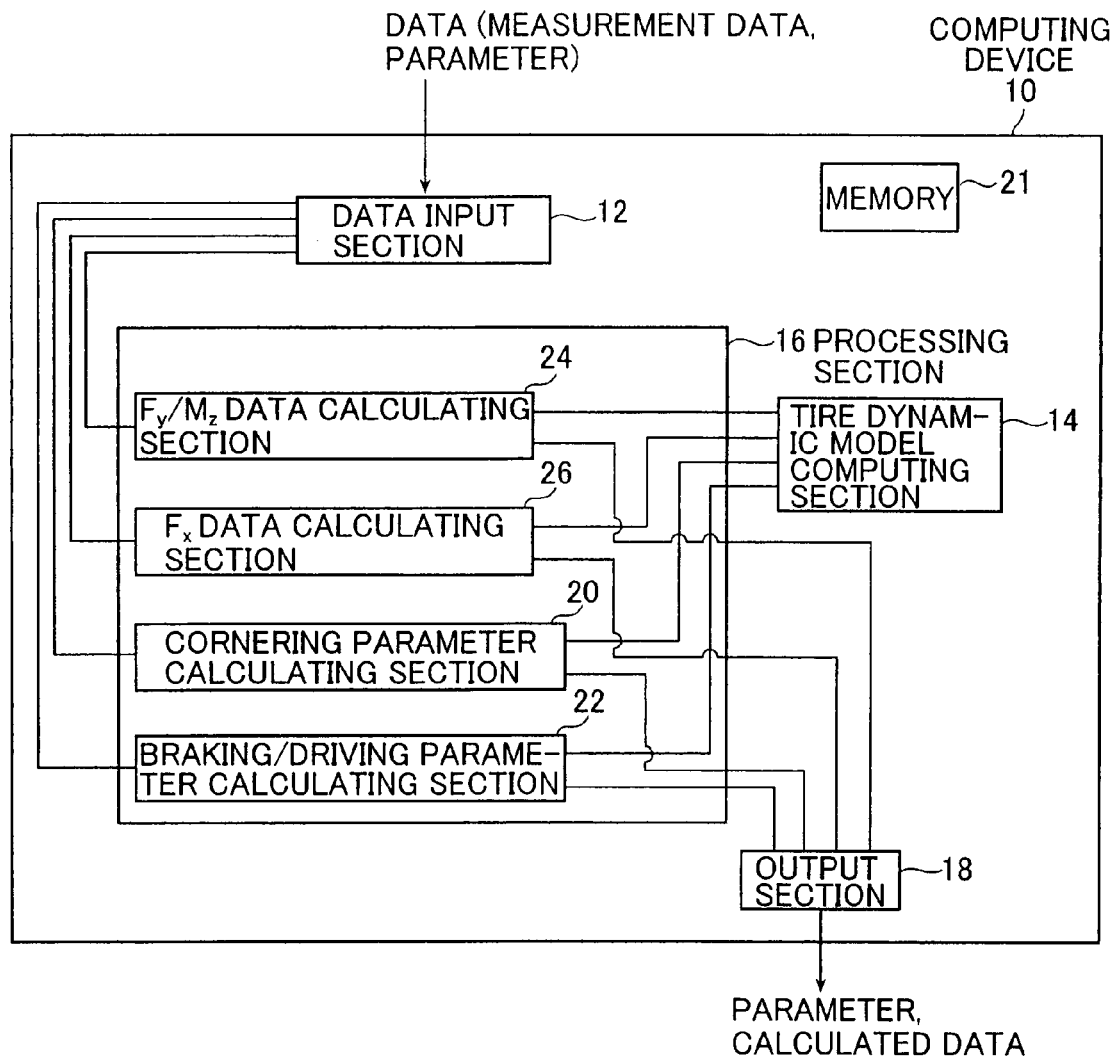
FIG. 1 is a block diagram showing a computing device of an example for executing the methods of tire transient response data calculation and data processing, according to the present invention.

FIG. 1 is a block diagram of a computing device 10 that carries out the methods of tire transient response data calculation and data processing according to the present invention.

The computing device 10 is a device that receives the input of measurement data of a lateral force $F_y$, self-aligning torque (hereinafter referred to as torque) $M_z$ and a longitudinal force $F_x$ in the transient state when a slip angle or a slip ratio is given as time-series data in order to calculate the value of a lag-time constant (transient response parameter), which characterizes the tire's transient response characteristic based on a tire dynamic model (described later). The computing device 10 also calculates the time-series data of the lateral force $F_y$, the torque $M_z$ and the longitudinal force $F_x$ in the transient state by using the lag time constant and the values of the tire's dynamic element parameters that constitute the tire dynamic model. The term "transient response characteristic" refers to the output characteristic of the lateral force $F_y$, the torque $M_z$ and the longitudinal force $F_x$, which change over time in accordance with the changes (over time) in slip angle or slip ratio during cornering. The term "transient response data" refers to data on the lateral force $F_y$, torque $M_z$ and longitudinal force $F_x$ in the transient state, which change over time in accordance with the changes (over time) of the slip angle or slip ratio during cornering.

The computing device 10 comprises the following: a data input section 12, which accepts various types of data including measurement data and parameters; a tire dynamic model computing section 14, which expresses a tire dynamic model (described below) in an analytical formula and calculates a lateral force and a torque, or a longitudinal force, from set parameter values; a processing section 16, which has the tire dynamic model computing section 14 perform computation in a given sequence so as to determine the values of tire's dynamic element parameters and various parameters of the time lag constants (transient response parameters) described below, or that uses the tire dynamic model to calculate the time-series data of lateral force and torque, or longitudinal force, in the transient state; and an output section 18, which compiles the determined values of the lag time constants, or the calculated time-series data of the lateral force and torque, or the calculated time-series data of the longitudinal force to output the result as output data to a monitor or printer (not shown).

The following are examples of the tire's dynamic element parameters calculated based on the tire dynamic model, which will be described later with reference to FIGS. 2, 3 and 10:

(a) The lateral stiffness $K_{y0}$ defined by the lateral shear stiffness of a tire;

(b) The sliding friction coefficient $\mu_d$ between the tire and the road surface;

(c) The lateral stiffness coefficient $(K_{y0}/\mu_s)$ obtained by dividing the lateral stiffness $K_{y0}$ by an adhesive friction coefficient $\mu_s$ between the road surface and the tire;

(d) The lateral bending compliance $\epsilon$ of a belt part;

(e) The torsional compliance $(1/G_{mz})$ corresponding to the reciprocal of a torsional stiffness around the tire's center axis;

(f) The coefficient n for defining the contact pressure distribution on a contact patch when lateral force is generated;

(g) The coefficient $C_q$ indicating the degree of bias in the contact pressure distribution;

(h) The shift coefficient $C_{xc}$ indicating the degree of longitudinal shift of the center position of the tire on the contact patch;

(i) The effective contact length $l_e$ when the lateral force is generated;

(j) The longitudinal stiffness $A_x$ (a parameter for defining a longitudinal torque component) in the contact patch; and the like.

Examples of transient response parameters that characterize the transient response characteristic include:

(k) A lag time constant $t_s$ of a first-order-lag response, which defines the deformation response resulting from the shear deformation of the tread part;

(l) A lag time constant $t_r$ of a first-order-lag response, which defines the deformation response resulting from the torsional deformation of the side part; and (m) The lag time constant $t_d$ of a first-order-lag response, which defines the deformation response resulting from the bending deformation of the belt part.

Herein, the lateral stiffness $K_{y0}$, the lateral bending compliance $\epsilon$ and $G_{mz}$ of the torsional compliance $(1/G_{mz})$ are respectively a stiffness parameter against the shear deformation of the tire, the stiffness parameter against lateral bending deformation and the stiffness parameter against the torsional deformation of the tire. The lag time constants of the above-mentioned items (k) to (m) represent time constants in the response functions of the respective first-order-lag responses. A lateral direction in which the lateral force is generated designates the axial direction of the tire's rotational axis. Therefore, in the case where the tire rolls in a straight-forward direction of travel, the lateral direction is identical to the right-left direction with respect to the direction of travel. On the other hand, in the case where the tire rolls at a slip angle the lateral direction shifts with respect to the travel direction of the tire by the slip angle. The longitudinal direction designates a direction, which is parallel to the road surface with which the tire comes into contact and crosses the axial direction of the tire's rotational axis in a perpendicular manner. The tire's central axis (an axis CL of FIGS. 5A and 5B) is vertical to the road surface, perpendicularly crossing the rotational axis about which the tire rolls and passing on a central plane of the tire in the width-wise direction.

The data input section 12 receives various data such as the measurement data of lateral force and torque or the measurement data of longitudinal force, as well as the above-mentioned parameters. It then rewrites that data in a predetermined format and supplies it to the processing section 16. At the same time, various data thus input are stored in a memory 21.

The processing section 16 has the tire dynamic model computing section 14 compute a lateral force and torque in accordance with the sequence described below, in order to determine the values of various parameters, or it calculates the data of lateral force, torque and longitudinal force in a transient response state in the tire dynamic model.

The processing section 16 has four different sequences, and it has components corresponding to the respective sequences. The components are: a cornering parameter calculating section 20, which determines the values of the above-mentioned lag time constants from the measurement data of lateral force and torque; a braking/driving parameter calculating section 22, which determines the values of the above-mentioned lag time constants from the measurement data of longitudinal force; an $F_y/M_z$ data calculating section 24, which obtains the time-series data of lateral force and torque in the transient state by using the tire dynamic model; and an $F_x$ data calculating section 26, which obtains the time-series data of a longitudinal force in the transient state by using the tire dynamic model.

The functions of the cornering parameter calculating section 20, the braking/driving parameter calculating section 22, the $F_y/M_z$ data calculating section 24 and the $F_x$ data calculating section 26 will be described later.

The tire dynamic model computing section 14 uses the various data supplied from the processing section 16 to obtain the results of lateral force and torque computation, and in response it sends the obtained computation results to the processing section 16.

FIGS. 2, 3, 4A to 4C, 5A to 5D and 6A to 6C are diagrams that illustrate the tire dynamic model.

Figure 2:
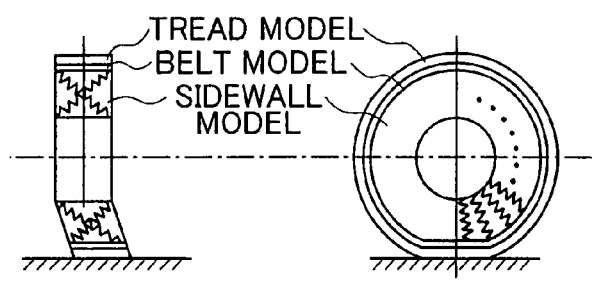
FIG. 2 is a diagram for illustrating a tire dynamic model used in the methods of tire transient response data calculation and data processing, according to the present invention.

The tire dynamic model is constructed to include, as shown in FIG. 2, a sidewall model that comprises a plurality of spring elements representing the spring characteristic of a sidewall on an assumed rigid cylindrical member; a belt model made of an elastic ring body connected to the spring elements; and a tread model composed of an elastic element representing the tread model connected to the surface of the elastic ring body.

The tire dynamic model provided in the tire dynamic model computing section 14 calculates the lateral force and torque in the transient state during cornering, or it calculates the longitudinal force in the transient state during braking/driving, in accordance with instructions from the cornering parameter calculating section 20, the braking/driving parameter calculating section 22, the $F_y/M_z$ data calculating section 24, and the $F_x$ data calculating section 26.

The case of calculating lateral force and torque in the transient state during cornering is described first. As shown in FIG. 3, numerical values are set for the tire's dynamic element parameters composed of various linear parameters and non-linear parameters, which are constructed by employing the various spring elements of a tire and are then processed through the formulae (1) to (8) of FIG. 3 with the use of time-series data $\alpha(t)$ of a slip angle given as input data. The lateral force $F_y(t)$ and torque $M_z(t)$, which are time-series data in formulae (6) and (7), are thus calculated as data.

The term "linear parameter" refers to a parameter represented in a linear format in formulae (6) and (7), and the term non-linear parameter refers to a parameter represented explicitly or implicitly in a non-linear format in formulae (6) and (7).

$[1-\exp(-(t-t')/t_r)]$ in Formula (1) of FIG. 3 represents the response function of a first-order-lag response of torsional deformation occurring in the side part due to torque $M_z(t)$. The phrase $[1-\exp(-(t-t')/t_s)]$ in Formula (4) represents the response function of a first-order-lag response of shear deformation caused in the tread part by the given slip angle $\alpha(t)$. The phrase $[1-\exp(-(t-t')/t_d)]$ in Formula (8) represents the response function of a first-order-lag response of lateral bending deformation caused by lateral force in the belt part.

The tire dynamic model computing section 14 calculates, through Formula (1) containing the response function $[1-\exp(-(t-t')/t_d)]$ of a first-order lag response, the recoil angle obtained from the torque $M_z(t)$ and torsional compliance $(1/G_{mz})$. The tire dynamic model computing section 14 subtracts the recoil angle from the given slip angle $\alpha(t)$, thereby calculating the effective slip angle $\alpha_e(t)$. A recoil angle caused by the torque $M_z(t)$ is due to the first-order lag response of the torsional deformation of the side part. This recoil angle is calculated by multiplying the torsional compliance $(1/G_{mz})$ by the result of the convolution integral of the reference function of the first-order lag response, which defines the torsional deformation and time gradient (time differential coefficient) of the past time-series data of torque $M_z(t)$. In other words, the recoil angle is calculated by dividing the convolution integral result by the torsional stiffness.

The effective slip angle $\alpha_e(t)$ is calculated in this way because the torque $M_z(t)$ generated through the introduction of a slip angle works on the tire itself in a manner whereby the torque reduces the given slip angle. Accordingly, when the instruction of a slip angle generates torque $M_z(t)$, the effective slip angle $\alpha_e(t)$ and the corrected slip angle $\alpha_f(t)$, as described below, have smaller values than that of the actually given slip angle $\alpha(t)$ shown in FIG. 4A. The torque $M_z(t)$ in Formula (1) is the data of the torque $M_z(t)$ in Formula (7), which is obtained in one preceding time step.

Furthermore, according to Formula (2) a bias coefficient q used to define the profile of distribution of contact pressure is calculated from the torque M. The bias coefficient q is a parameter indicating a distribution profile of the contact pressure that is generated when the distribution of contact pressure during the straight-forward travel of the tire at the slip angle $\alpha=0$ (see FIG. 5A) is biased by the generation of the lateral force $F_y$ in a forward travel direction (toward the leading edge on the contact patch), as shown in FIG. 5B. Assuming that the distribution of contact pressure is p(x) (x is a position on the coordinates obtained by normalization with a contact length when an x-axis is defined in a backward travel direction in FIGS. 5A and 5B), the distribution profile of contact pressure p(x) is defined by the function $D_{gsp}$ (x;n, q), as expressed by Formula (9) of FIG. 5B.

Herein, a coefficient n in the function $D_{gsp}$ (x;n, q) defines the distribution of contact pressure on the contact patch while the lateral force is being generated, and defines the distribution of contact pressure so that the distribution becomes more angular (the curvature becomes larger) in the vicinity of the leading edge and the trailing edge of the distribution of contact pressure, as shown in FIG. 5C. Moreover, as shown in FIG. 5D, as the coefficient q increases from 0 to 1, the peak position of contact pressure distribution is set so as to shift toward the leading edge side. As described above, the coefficients q and n are profile-defining coefficients that also define the distribution profile of contact pressure.

Furthermore, according to Formula (3) a value $(x_c/l)$ indicating the degree of shift of the tire's center position toward the leading edge when the lateral force $F_y$ is generated is calculated in association with the torque $M_z$. This value $(X_c/l)$ is used in Formula (7), wherein l is the contact length. The reason a shift of the tire's center position O is defined in Formula (3) is because the center position O, which serves as the center of rotation of the torque $M_z$, shifts toward the leading edge of the contact patch due to the generation of the lateral force $F_y$, as shown in FIG. 5B.

In Formula (4), a slip angle in the transient state is defined with respect to the effective slip angle $\alpha_e(t)$ while taking into consideration the first-order-lag response of the shear deformation of the tread part. Specifically, on the premise that the compliance to the road surface upon the deformation of the tread part is based on the first-order-lag response, the result of a convolution integral of the reference function of the first-order-lag response that defines the deformation of the tread part and the time gradient of the effective slip angle $\alpha_e(t)$ is defined as the corrected slip angle $\alpha_f(t)$ in the transient state. The formulae (5) to (7) use the corrected slip angle $\alpha_f(t)$.

Furthermore, according to Formula (5) a boundary position $(l_h/l)$ between sliding friction and adhesive friction in the contact patch, which occur at the large corrected slip angle $\alpha_f(t)$, is calculated. The boundary position $(l_h/l)$ is defined in the following manner:

The maximum friction curves shown in FIGS. 6A to 6C are obtained by multiplying the adhesive friction coefficient $\mu_s$ by the contact pressure distribution p(x). The tire tread part, the leading edge of which comes into contact with the road surface, is gradually sheared by the road surface due to the corrected slip angle $\alpha_f(t)$ as it moves toward the trailing edge. As a result, a shear force (adhesive frictional force) is generated from the tire tread part. If the shear force gradually increases to reach the maximum friction curve, the tire tread part, which is adhered to the road surface, begins to slide and generates a sliding frictional force in accordance with the sliding friction curve obtained by multiplying the sliding friction coefficient $\mu_d$ by the contact pressure distribution p(x). In FIG. 6A, the region on the leading edge side forward from the boundary position ($l_h/l$) is an adhesive region in which the tire tread part is adhered to the road surface, whereas the region on the trailing edge side is a tire sliding region in which the tire tread part slides on the road surface. FIG. 6B shows the state where the corrected slip angle $\alpha_f(t)$ is greater than that shown in FIG. 6A. The boundary position ($l_h/l$) moves toward the leading edge side as compared with FIG. 6A. If the corrected slip angle $\alpha_f(t)$ increases further, sliding friction is generated at the position of the leading edge on the contact patch as shown in FIG. 6C.

As can be seen from FIGS. 6A to 6C, the ratio of the adhesive region and the sliding region varies significantly, depending on the corrected slip angle $\alpha_f(t)$. A frictional force occurs in the adhesive region and the sliding region as described above, meaning that a lateral force component is integrated along the tire in the width-wise direction, whereby the lateral force $F_y(t)$ can be calculated. Furthermore, by calculating the moment about the tire center O, the torque $M_z(t)$ can be calculated.

In the formulae (6) and (7), the lateral force $F_y(t)$ and the torque $M_z(t)$ are calculated separately for the adhesive region and the sliding region described above by using the corrected slip angle $\alpha_f(t)$.

Formula (6) calculates the lateral force $F_y(t)$ by obtaining the sum of two terms (two lateral force components). The first term corresponds to the integration within the integral range of 0 to ($l_h/l$), representing an adhesive lateral force component generated in the adhesive region. The second term corresponds to the integration within the integral range of ($l_h/l$) to 1, representing a sliding lateral force component generated in the sliding region.

The adhesive lateral force component of the first term in Formula (6) is a lateral force in the adhesive region. Formula (6) represents a state in which a lateral displacement of the tread part due to the corrected slip angle $\alpha_f(t)$ is delayed by the lateral bending deformation of the belt, to thereby calculate the adhesive lateral force component. The sliding lateral force component of the second term in Formula (6) is a lateral force in the sliding region. Formula (6) expresses the profile of the contact pressure distribution p(x) caused by the corrected slip angle $\alpha_f(t)$ by the function $D_{gsp}(x;n, q)$ in order to calculate the sliding lateral force component.

In Formula (7), the first term corresponds to the integration within the integral range of 0 to ($l_h/l$), representing a torque component generated by the adhesive lateral force component generated in the adhesive region. The second term corresponds to the integration within the integral range of ($l_h/l$) to 1, representing a torque component generated by the sliding lateral force component generated in the sliding region. In Formula (7), in addition to the above-mentioned two torque components, another torque component, meaning a third term, is provided. The third term, $A_x \cdot (l_h/l) \cdot \tan \alpha_f(t)$, represents a torque component about the tire center O, which is generated by the amount of shift in the contact patch of the tire and the longitudinal force of the tire when the contact patch of the tire has a lateral shift due to the presence of the slip angle $\alpha$, as described below. More specifically, the torque $M_z(t)$ is calculated by the sum of three torque components, i.e., the torque component generated by the adhesive lateral force, the torque component generated by the sliding lateral force and the torque component generated by the longitudinal force.

Formula (8) is a formula that defines $F_{ye}(t)$, which represents a corrected lateral force as a result of the belt part receiving a lateral bending deformation from the lateral force $F_y(t)$. The lateral force correction in Formula (8) employs the convolution integral of the response function of a first-order-lag response of the lateral bending deformation in the belt part as well as the time gradient of past time-series data of the lateral force $F_y(t)$.

The tire dynamic model computing section 14 sequentially calculates, through the formulae (1) to (8), the time-series data of the lateral force $F_y(t)$ and the torque $M_z(t)$ while increasing the time in increments of infinitesimal time $\Delta t$ from t=0. Accordingly, the lateral force $F_{ye}(t)$ that is obtained through Formula (8) in a time step at a time t is used as $F_{ye}(t)$ in the formulae (5) and (6) in the next time step, i.e., a time (t+$\alpha$t). Similarly, the torque $M_z(t)$ that is obtained through Formula (7) at the time t is used as $M_z(t)$ in the formulae (1), (2), (3) and (4) in the next time step (time t+$\alpha$t).

FIGS. 4A to 4C are schematic representations of the contact patch showing the relationship between the delayed adhesive lateral force component and longitudinal component and the torque component, which is caused by the corrected slip angle $\alpha_f(t)$ and the deformation of the belt.

FIG. 4A shows a state in which, when the time-series data of the slip angle $\alpha(t)$ is given, the slip angle $\alpha(t)$ works on the tire itself so that the torque generated by the slip angle $\alpha(t)$ reduces the slip angle $\alpha(t)$ and becomes the corrected slip angle $\alpha_f(t)$ in the transient state due to first-order lag deformation. FIG. 4B shows the relationship between the lateral displacement, which is caused by this corrected slip angle $\alpha_f(t)$, and the lateral displacement caused by the lateral bending deformation of the belt. FIG. 4C shows a mechanism of how the distribution of a longitudinal force, as generated by a lateral shift of the contact patch of the tire due to a lateral force, contributes to the torque $M_z(t)$. In FIG. 4C, $M_{z1}$ and $M_{z2}$ indicate the torque component that is generated by the adhesive lateral force component and the torque component generated by the sliding lateral force component, respectively, whereas $M_{z3}$ indicates the torque component that is generated by the longitudinal force acting on the contact patch.

Figure 7:
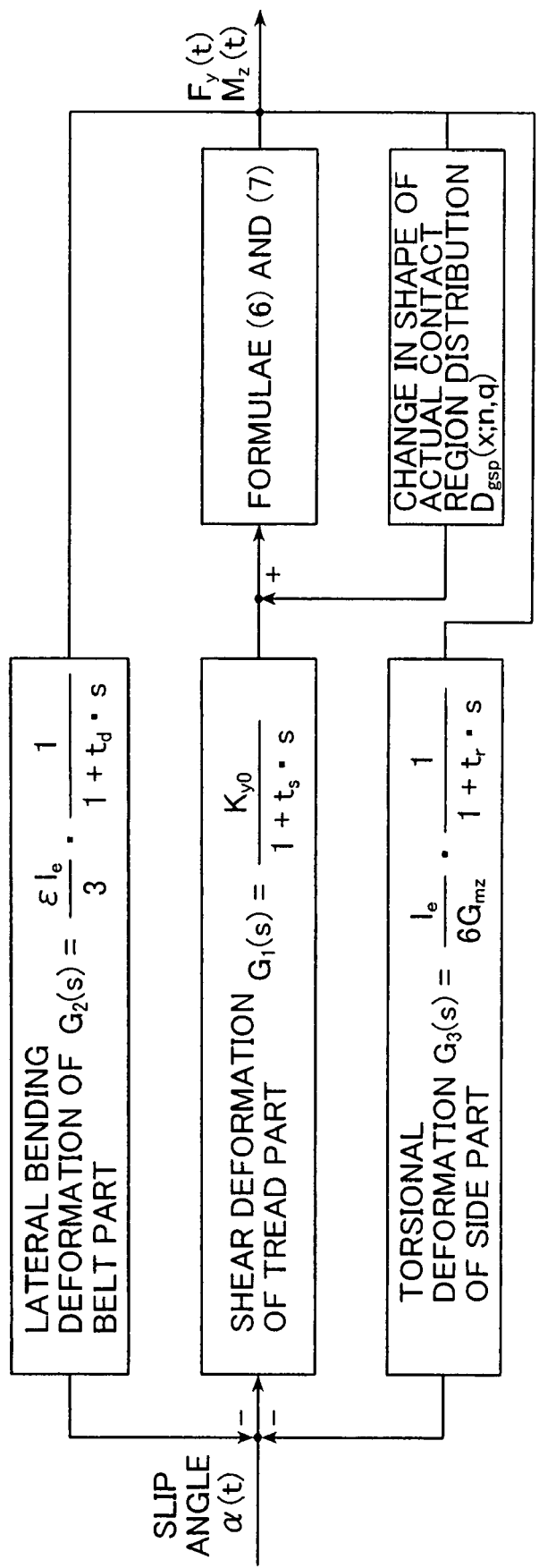
FIG. 7 is a diagram for illustrating a relationship between the deformation of respective parts of the tire dynamic model used in the methods of tire transient response data calculation and data processing, according to the present invention, as well as torque and lateral force.

FIG. 7 is a processing block diagram that shows the steps from the introduction of the slip angle $\alpha(t)$ up through the calculation of lateral force $F_y(t)$ and torque $M_z(t)$. When the lateral force $F_y(t)$ and the torque $M_z(t)$ are calculated through the formulae (6) and (7), as can be seen in FIG. 7, in the tire dynamic model according to the present invention, the lateral bending deformation of the belt part, a change in the profile of contact pressure distribution and the torsional deformation of the side part affect the calculation of lateral force $F_y(t)$ and torque $M_z(t)$. Additionally, the lateral bending deformation of the belt part, torsional deformation of the side part and shear deformation of the tread part are expressed by first-order lag responses. $G_1(s)$, $G_2(s)$, and $G_3(s)$ of FIG. 7 constitute the Laplace transform representation of transfer functions of the above-mentioned first-order lag responses, and s denotes a Laplace operator.

Generally, when a lag time constant related to the transient responsiveness of a tire is given as $t_x$, the lag time constant $t_x$ is handled in the form of a relaxation length $\sigma_x$ by taking into account the dependency on travel speed V. The relaxation length $\sigma_x$ means "a travel distance necessary for a tire to output a steady-state lateral force when a slip angle is input in a step-wise manner". The lag time constant $t_x$ of a transient response at the travel speed V is expressed as follows:

$$t_x = \sigma_x(\text{relaxation length})/V(\text{travel speed})$$

The relaxation lengths $\sigma_s$, $\sigma_d$, and $\sigma_r$ are defined for the lag time constants $t_s$, $t_r$, and $t_d$, respectively. With the relaxation length and a distance frequency $S_v = s/V$, the transfer function in the block diagram of FIG. 7 can be expressed in the following format, from which the dependency on the travel speed is eliminated:

[Mathematical Formula 5]

$$G_1(s_v) = \frac{K_{yo}}{1 + \sigma_s \cdot s_v}$$

$$G_2(s_v) = \frac{\varepsilon l_e}{3} \cdot \frac{1}{1 + \sigma_d \cdot s_v}$$

$$G_3(s_v) = \frac{l_e}{6 G_{mz}} \cdot \frac{1}{1 + \sigma_r \cdot s_v}$$

Other formulae in the model according to the present invention can also be converted through a descriptive format conversion similar to the above-mentioned conversion ($t_x \rightarrow \sigma x$).

The lateral force $F_{ye}(t)$, as calculated in the tire dynamic model computing section 14, does not always match the lateral force $F_y(t)$. However, because the time step of the lateral force $F_{ye}(t)$ and the time step of the lateral force $F_y(t)$ are one step ahead of and a step behind each other, the difference between the lateral force $F_{ye}(t)$ and the lateral force $F_y(t)$ is small enough to deem their values substantially equivalent.

While this embodiment uses the shear deformation of the tread part, the lateral bending deformation of the belt part and the torsional deformation of the side part as separate first-order lag responses, in the present invention the shear deformation of the tread part may at least be used as a first-order lag response. The lag-time constant in the shear deformation of the tread part is longer than that which exists in the lateral bending deformation of the belt part and the torsional deformation of the side part, serving as the major factor in a tire's cornering transient response.

The values of linear and nonlinear parameters, including the dynamic-element parameters that are used in the tire dynamic model, are pre-stored in the memory 21. The values of these parameters are obtained by, for example, a method of deriving parameter values as disclosed in JP 2005-88832 A.

Figure 8A:
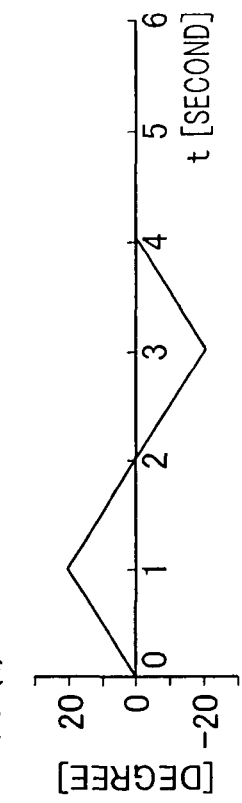
FIGS. 8A to 8C are examples of time-series data acquired by actually measuring a tire.
Figure 8B:
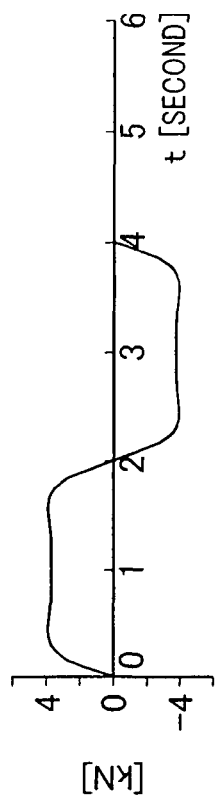
Figure 8C:
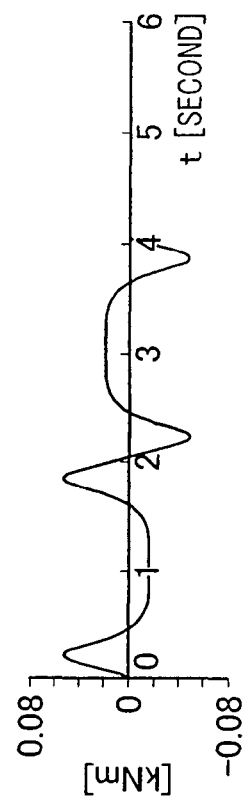
Figure 8D:
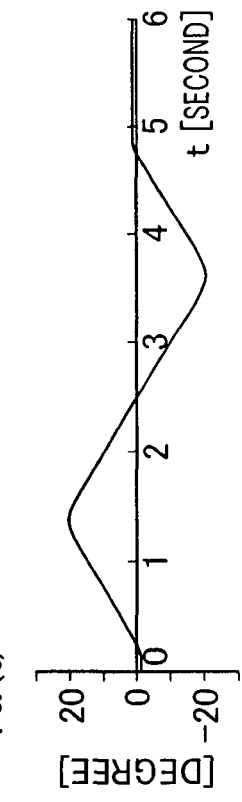
FIGS. 8D to 8F are diagrams that show the time-series data corresponding to FIGS. 8A to 8C, respectively, which is acquired by a tire transient response data calculating method according to the present invention.
Figure 8E:
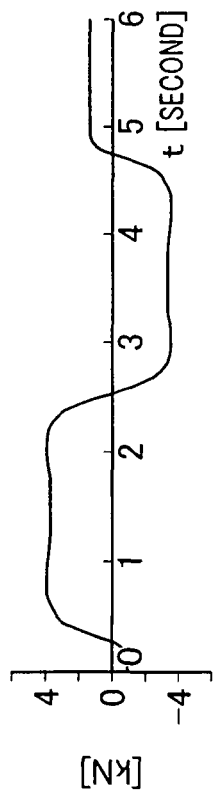
Figure 8F:
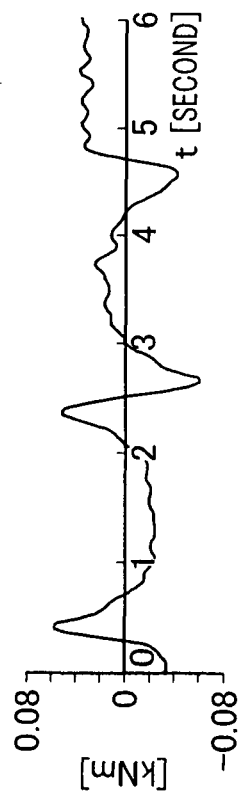

FIGS. 8A to 8F show a comparison between the lateral force $F_y(t)$ and the torque $M_z(t)$ that are obtained through the actual measurement of a tire and the lateral force $F_y(t)$ and torque $M_z(t)$ calculated in the tire dynamic model. In an example of FIGS. 8A to 8C, the slip angle $\alpha(t)$ is given as time-series data for a tire (with a size of 205/55R16 89V) under such conditions that set the travel speed to 80 (km/hour) and the load to 3.9 (kN), and the measurement data shown in FIGS. 8B and 8C are obtained for the lateral force $F_y(t)$ and torque $M_z(t)$. The corresponding time-series data of the lateral force $F_y(t)$ and the torque $M_z(t)$ that are calculated with the use of the tire dynamic model are shown in FIGS. 8E and 8F. FIG. 8D shows the time-series data of the slip angle $\alpha(t)$ given to the tire dynamic model.

FIGS. 9A and 9B are graphs having the slip angle $\alpha(t)$ as the axis of abscissa to show the measurement data of FIGS. 8A to 8C. The tire dynamic model uses only the lag time constant $t_s$ in the shear deformation of the tread part as a transient response ($t_s = 0.03$ second), but it does not use the lag time constants in the lateral bending deformation of the belt part and torsional deformation of the side part. The graphs of the corresponding lateral force $F_y(t)$ and torque $M_z(t)$, which are calculated through the tire dynamic model, are shown in FIGS. 9C and 9D.

Comparing the graphs corresponding to FIGS. 8A to 8F and FIGS. 9A to 9D, it is found that the lateral force $F_y(t)$ and the torque $M_z(t)$ that are calculated using the tire dynamic model are extremely close to the actual measurement data, and the time-series data of the lateral force $F_y(t)$ and the torque $M_z(t)$ of transient response during cornering can be calculated using the tire dynamic model so as to correspond to the actual measurement. The examples of FIGS. 8D to 8F and FIGS. 9C and 9D use the dynamic element parameter values obtained in advance based on the measurement data of lateral force $F_y$ and torque $M_z$ in a steady state. The dynamic element parameter values were obtained through the method of deriving numerical values of parameters disclosed in JP 2005-88832 A.

Next, a tire dynamic model in a case, whereby a longitudinal force in a transitional state during braking/driving is calculated, will be described.

Figure 10:
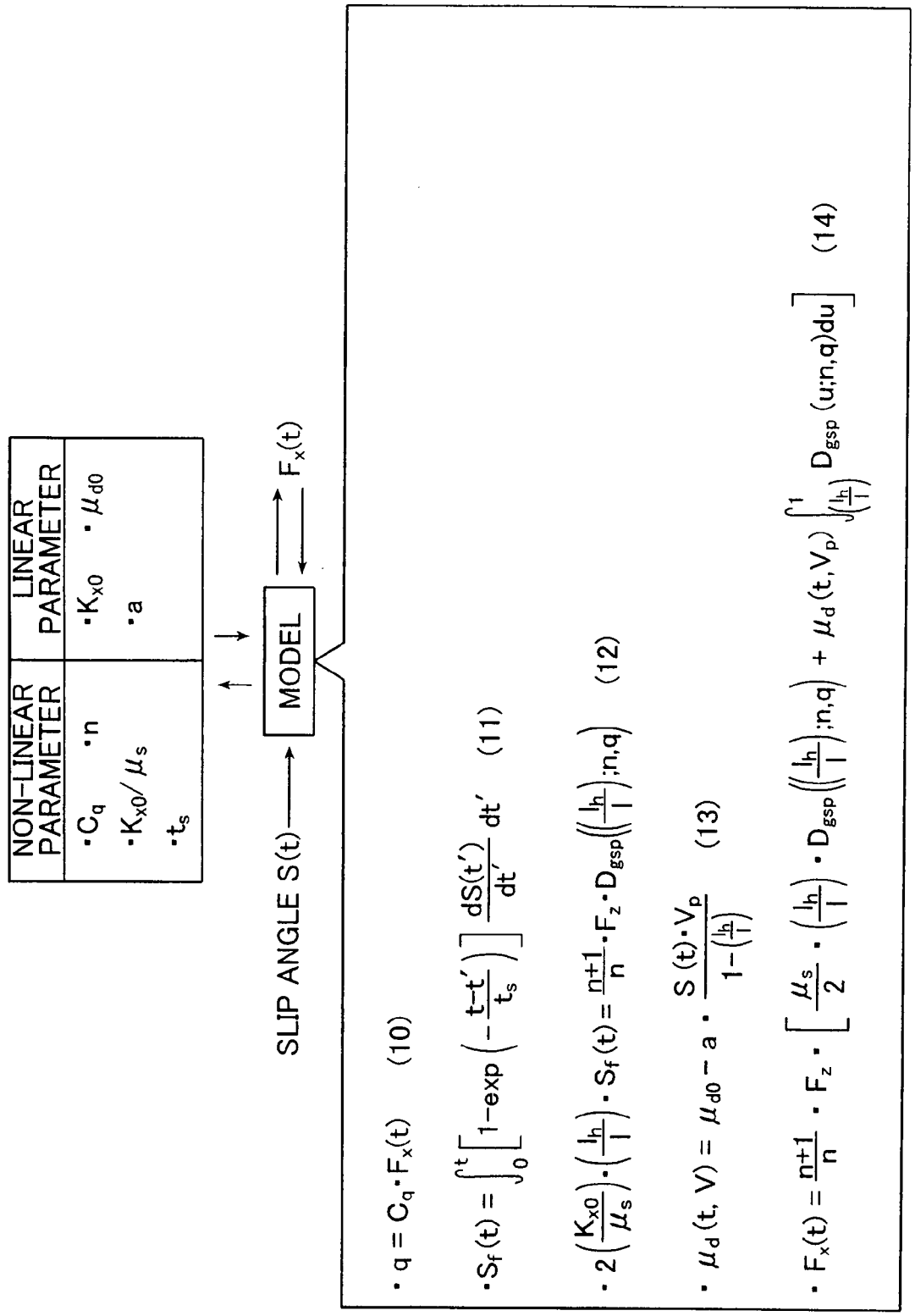
FIG. 10 is a diagram that illustrates the tire dynamic model during braking/driving used in the methods of tire transient response data calculation and data processing, according to the present invention.

As shown in FIG. 10, tire dynamic element parameter values containing various linear parameters and non-linear parameters combined by the various spring elements of a tire are set, and the time-series data S(t) of a slip ratio given as input data is used to calculate the longitudinal force $F_x(t)$, which is the time-series data in Formula (14) processed according to the formulae (10) to (14) of FIG. 10.

The time-series data of longitudinal force is sequentially calculated by increments of infinitesimal time $\Delta t$ from $t=0$. Here, $[1-\exp(-(t-t_r)/t_r)]$ in Formula (11) represents a response function of a first-order-lag response of shear deformation of the tread part, which is caused at the given slip ratio S(t).

The linear parameter of FIG. 10 indicates a parameter represented in Formula (14) in a linear form, and the non-linear parameter indicates a parameter represented explicitly or implicitly in Formula (14) in a non-linear form.

The tire dynamic model computing section 14 calculates a corrected slip ratio $S_f(t)$ based on Formula (11) represented using the response function $[1-\exp(-(t-t')/t_s)]$ of the first-order-lag response.

Specifically, the first-order-lag response is caused by a first-order lag of the shear deformation of the tread part in the longitudinal direction. It is assumed that the result obtained by computing the convolution integral of the response function of the first-order lag response specifying the deformation response at that time through the time gradient of the past time-series data of the slip ratio S(t) is set as the corrected slip ratio $S_f(t)$. The corrected slip ratio $S_f(t)$ acts on the belt part.

Furthermore, according to Formula (10), a bias coefficient q specifying the shape of a contact pressure distribution is calculated from the torque $M_z$. The bias coefficient q is, like the tire dynamic model during cornering shown in FIG. 3, a parameter that represents the contact pressure distribution generated when the contact pressure distribution (see FIG. 5A) in a state of straight-ahead travel at the slip ratio $S=0$, is biased by the generated longitudinal force $F_x$ toward the front in the direction of travel (the leading edge on a contact patch), as shown in FIG. 5B. Assuming that the contact pressure distribution is p(x) (where x is a position on the coordinates normalized by the contact length in a case where an x-axis is obtained toward the backward direction in the travel direction in FIGS. 5A and 5B), the shape of the contact distribution p(x) is specified as a function $D_{gsp}(x; n, q)$ represented by Formula (9) of FIG. 5B.

In this case, a coefficient n in the function $D_{gsp}(x; n, q)$ specifies the contact pressure distribution in the contact patch while the lateral force is generated, and specifies the contact pressure distribution such that the contact pressure distribution becomes more angular (the curvature becomes larger) in the vicinities of the leading edge and trailing edge, as shown in FIG. 5C. As shown in FIG. 5D, the peak position of the contact pressure distribution is set so as to move toward the leading edge side as the coefficient q varies from 0 to 1. Thus the coefficients q and n are profile-defining coefficients that define the profile of contact pressure distribution.

Figure 11A:
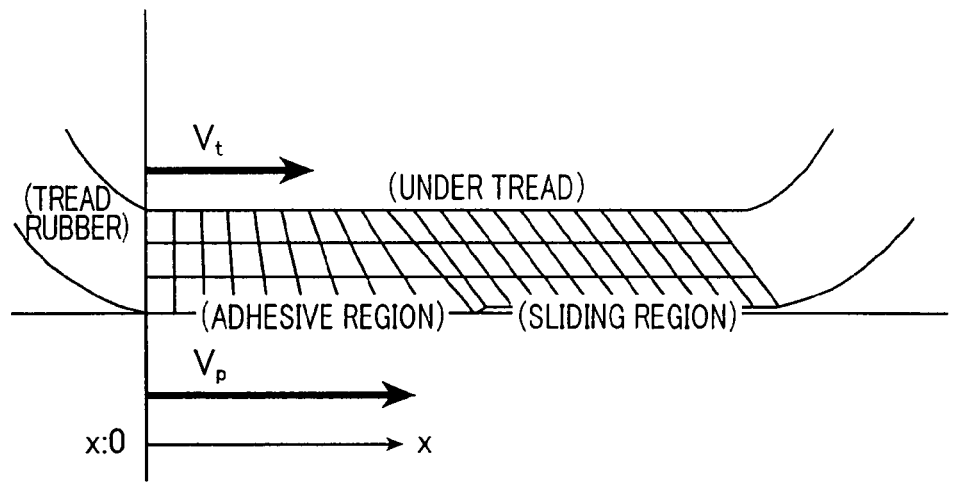
FIGS. 11A and 11B are diagrams that illustrate how a longitudinal force is generated during the braking/driving of a tire.
Figure 11B:
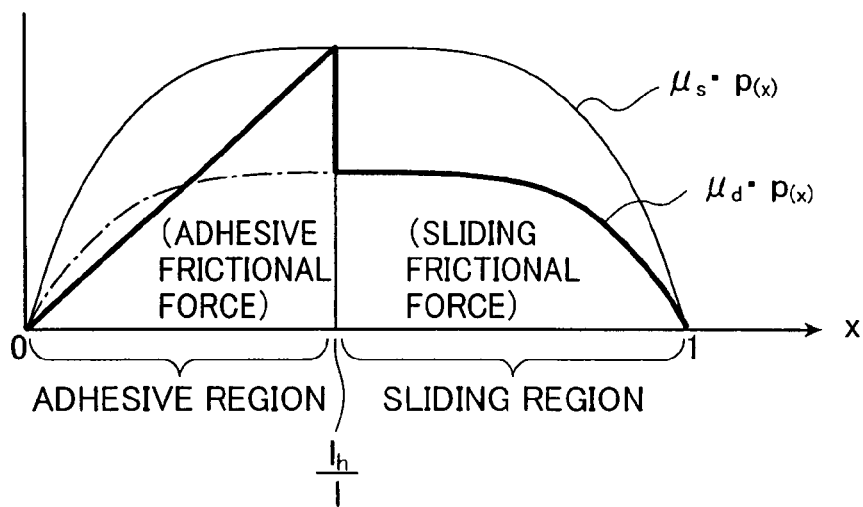

Further, according to Formula (12), a boundary position $(l_h/l)$ between sliding friction and adhesive friction in the contact patch, which occurs at the large slip ratio $S_f(t)$, is calculated. The boundary position $(l_h/l)$ is defined in the following manner:

FIGS. 11A and 11B are explanatory diagrams of the longitudinal force that is generated in a tire.

As shown in FIG. 11A, the tread part, which comes into contact with the road surface on the leading edge of its contact patch, moves toward the trailing edge of the contact patch at a tread rolling speed $V_r$, while the road surface that comes into contact with the tire upon braking moves backward at a tire travel speed $V_p$, which is higher than the tread rolling speed $V_r$. Because the tread rolling speed $V_r$ is lower than the tire travelling speed $V_p$, the tread part receives a greater shear force in the backward travel direction due to the speed difference $V_p - V_t$ as the tread part moves toward the backward direction from the leading edge of the contact patch. When the shear force is smaller than the maximum adhesive frictional force between the tread and the ground, relative movements of the tread and the ground do not occur, and the tread part is in a state of adhesive friction. If the shear force exceeds the maximum adhesive frictional force, the tread part starts moving in a relative manner with respect to the ground and is in a sliding frictional state. The braking force is represented by the frictional force obtained by summing up the frictional forces in the adhesive region and the frictional forces in the sliding region, which are generated in the contact patch. The entire braking force obtained by summing up the frictional forces is divided by the load applied to the tire, thus obtaining the braking force coefficient μ.

The maximum adhesive frictional force specifies the boundary between adhesive friction and sliding friction, and becomes an important factor characterizing the p-S curve. As shown in FIG. 11B, the maximum adhesive frictional force can be schematically represented by a product of the contact pressure distribution p(x), which is a distribution of contact pressures in the rotational direction of the tire (the direction in which a braking force is received), and the adhesive frictional coefficient $μ_s$. The contact pressure distribution p(x) is the same as the contact pressure distribution p(x) shown in FIG. 5B.

Consequently, when the shear force acting on the tread part gradually increases to reach the maximum frictional curve, the tread part, which has adhered to the road surface, begins to slide and generates a sliding frictional force in accordance with the sliding frictional curve, as obtained by multiplying the sliding friction coefficient $μ_d$ by the contact pressure distribution p(x). In FIG. 11B, the region on the leading edge side ranging from the boundary position $(l_h/l)$ to the leading edge is an adhesive region in which the tire tread member adheres to the road surface, while the region on the trailing edge side is a sliding region in which the tread part slides on the road surface.

As is apparent in FIG. 11B, the ratio between the adhesive region and the sliding region varies significantly, according to the corrected slip ratio $S_f(t)$. The longitudinal force $F_x(t)$ can be calculated by integrating the frictional forces in the adhesive region and the sliding region (in other words, the longitudinal force components) along the longitudinal direction of the tire.

According to Formula (14), the longitudinal force $F_x(t)$ is calculated using the corrected slip ratio $S_f(t)$ for the above-mentioned adhesive region and sliding region.

According to Formula (12), the boundary position $(l_h/l)$ between the sliding frictional force and the adhesive frictional force in the contact patch, which occurs at the large slip ratio $S_f(t)$, is calculated.

Formula (13) defines a sliding frictional coefficient $μ_d$ and specifies the sliding frictional coefficient $μ_d$, depending on the travelling speed $V_P$.

According to Formula (14), the longitudinal force $F_x(t)$ is represented by the sum of the adhesive frictional force and sliding frictional force.

The linear or non-linear parameter values, including the dynamic element parameters used for the tire dynamic model, are pre-stored in a memory 21. These parameter values can be obtained through a method of deriving the numerical values of parameters disclosed in, for example, JP 2003-57134 A.

Figure 12A:
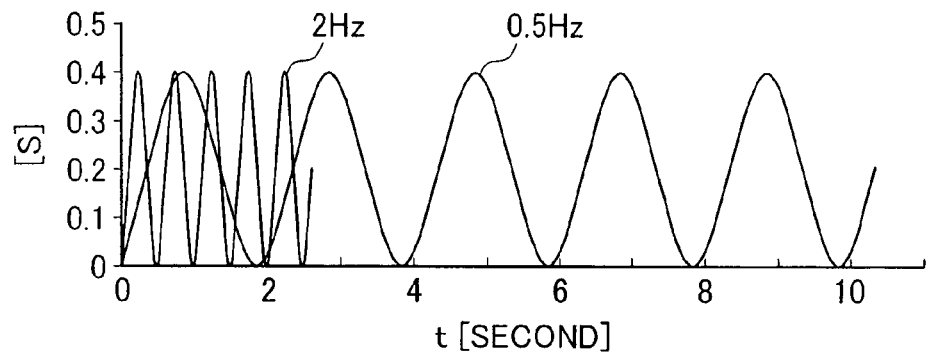
FIGS. 12A to 12C are diagrams that show the results acquired by the tire transient response data calculating method.
Figure 12B:
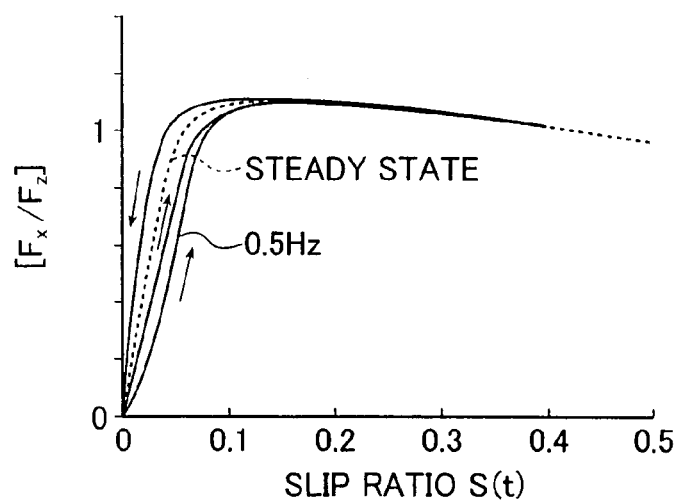
Figure 12C:
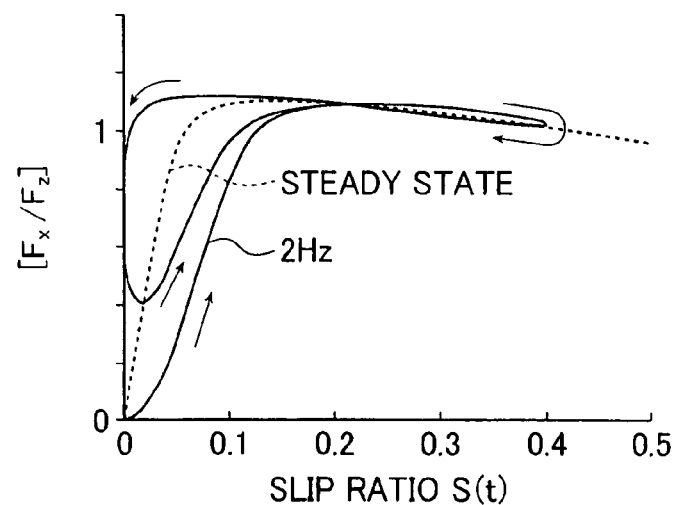

FIGS. 12A to 12C show the calculation results of the longitudinal force $F_x(t)$ obtained through the tire dynamic model. In the examples of FIGS. 12A to 12C, when a tire of the 205/55R16 94V size is given with the slip ratio S(t) as time-series data under the conditions of 80 (km/h) in travel speed and a load of 3.9 (kN), the longitudinal forces $F_x(t)$ shown in FIGS. 12B and 12C are calculated. In this case the lag time constant $t_s$ is set to 0.035 seconds.

FIG. 12A shows two types of slip ratios S(t) given to the tire dynamic model, one having a sine wave of 0.5 Hz and the other having a sine wave of 2 Hz. FIG. 12B is a graph showing the locus obtained in a case where the longitudinal force $F_x(t)$, being equivalent to 1.5 cycles of the slip ratio S(t) with the sine wave of 0.5 Hz, is divided by a load $F_z$ (=3.9 kN). FIG. 12B also shows the longitudinal force $F_x$ in a steady state for the purpose of comparison. Therefore, at the slip ratio S(t) with the sine wave of 0.5 Hz, the longitudinal force $F_x(t)$ changes from the longitudinal force $F_x$ in the steady state. FIG. 12C is a graph showing the locus obtained in a case where the longitudinal force $F_x(t)$, being equivalent to 1.5 cycles of the slip ratio S(t) with the sine wave of 2 Hz, is divided by the load $F_z$ (=3.9 kN). FIG. 12C also shows the longitudinal force $F_x$ in the steady state for the purpose of comparison. Therefore, at the slip ratio S(t) with the sine wave of 2 Hz, the longitudinal force $F_x(t)$ changes from the longitudinal force $F_x$ in the steady state and changes to a large extent as compared to the longitudinal force at the slip ratio S(t) with a sine wave of 0.5 Hz. Consequently, in the tire dynamic model it is found that the longitudinal force $F_x(t)$ also changes according to the frequency of the slip ratio S(t). The dynamic element parameter values of the tire dynamic model are obtained by using the method of deriving the numerical values of parameters disclosed in JP 2003-57134 A.

Accordingly, as shown in FIG. 3, the tire dynamic model computing section 14 calculates the time-series data of the lateral force $F_y(t)$ and the torque $M_z(t)$ by applying the time-series data of the slip angle α(t). On the other hand, as shown in FIG. 10, the tire dynamic model computing section 14 calculates the time-series data of the longitudinal force $F_x(t)$ by applying the time-series data of the slip ratio S(t). The time-series data of the lateral force $F_y(t)$ and torque $M_z(t)$, or the time-series data of the longitudinal force $F_x(t)$, is output to the cornering-parameter calculating section 20, the braking/driving parameter calculating section 22, the $F_y/M_z$ data calculating section 24, and the $F_x$ data calculating section 26, and all the processing is performed.

Next, the functions of the cornering parameter calculating section 20, the braking/driving parameter calculating section 22, $F_y/M_z$ data calculating section 24 and $F_x$ data calculating section 26 will be described.

The cornering parameter calculating section 20 supplies the tire dynamic model computing section 14 with the given time-series data of the slip angle $\alpha(t)$ and the initialized values of lag time constants $t_s$, $t_r$ and $t_d$. The tire dynamic model computing section 14 calculates the time-series data of the lateral force $F_y(t)$ and the torque $M_z(t)$ according to formulae (1) to (8) as shown in FIG. 3, using the supplied slip angle $\alpha(t)$, the initialized values of the lag time constants $t_s$, $t_r$ and $t_d$, and the parameter values loaded from the memory 21, and returns the time-series data to the cornering parameter calculating section 20. In a case where the time-series data of the lateral force $F_y(t)$ and torque $M_z(t)$ calculated by the tire dynamic model computing section 14 is compared to the measurement data of the lateral force $F_y(t)$ and torque $M_z(t)$ that are separately measured and stored in the memory 21, in other words, a case where a sum-of-square residual between the calculated lateral force $F_y(t)$ and torque $M_z(t)$, and where the actual measured lateral force $F_y(t)$ and torque $M_z(t)$ is obtained, and when the sum-of-square residual is not smaller than a predetermined value, the cornering parameter calculating section 20 corrects the initialized values of the lag time constants $t_s$, $t_r$ and $t_d$. The corrected values and the slip angle $\alpha(t)$ are again supplied to the tire dynamic model computing section 14, and the calculation of the lateral force $F_y(t)$ and torque $M_z(t)$ is repeated. Therefore, until the sum-of-square residual becomes smaller than the predetermined value and reaches the minimum, the values of the lag time constants $t_s$, $t_r$ and $t_d$ are repeatedly corrected. Subsequently, the value of the lag time constant obtained when the sum-of-square residual reaches the minimum is determined as the value of a lag-time constant for use in defining the first-order lag response.

Thus the cornering parameter calculating section 20 determines the value of the lag time constant.

The sum-of-square residual calculated for the value of the lag time constant may be calculated using only the lateral force $F_y(t)$, may be calculated using only the torque $M_z(t)$ or may be calculated using both the lateral force $F_y(t)$ and torque $M_z(t)$.

The parameter calculating braking/drivingsection 22 supplies the tire dynamic model computing section 14 with the given slip ratio $S(t)$ and the value initialized as the lag time constant $t_s$. The tire dynamic model computing section 14 calculates the time-series data of the longitudinal force $F_x(t)$ according to the formulae (10) to (14) shown in FIG. 10, using the supplied slip ratio $S(t)$, the lag time constant $t_s$ and the parameter values loaded from the memory 21, and returns the time-series data to the parameter calculating braking/drivingsection 22. In a case where the time-series data of the longitudinal force $F_x(t)$ calculated by the tire dynamic model computing section 14 is compared to the measurement data of the longitudinal force $F_x(t)$ obtained through a separate measurement of the tire and stored in the memory 21, in other words, a case where a sum-of-square residual between the calculated longitudinal force $F_x(t)$ and the actual measured longitudinal force $F_x(t)$ is obtained, and when the sum-of-square residual is not smaller than a predetermined value, the parameter calculating braking/drivingsection 22 corrects the initialized value of lag time constant $t_s$. The corrected value and the slip ratio $S(t)$ are again supplied to the tire dynamic model computing section 14 again, and the calculation of the longitudinal force $F_x(t)$ is repeated. Thus, until the sum-of-square residual becomes smaller than the predetermined value and reaches the minimum, the value of the lag time constant $t_s$ is repeatedly corrected. Subsequently, the value of the lag time constant $t_s$ obtained when the sum-of-square residual reaches the minimum is determined as the value of a lag time constant for use in defining the first-order-lag response.

Thus, the braking/driving parameter calculating section 22 determines the value of the lag time constant.

The cornering parameter calculating section 20 and the braking/driving parameter calculating section 22 calculate, in the tire dynamic model, the lateral force $F_y(t)$, the torque $M_z(t)$ and the longitudinal force $F_x(t)$ by using the known values of the linear parameter and the non-linear parameter in the steady state, thereby determining the value of the lag-time constant. According to the present invention, at least a part of the linear parameter and the non-linear parameter may be set as unknown values to thereby determine the unknown values as well as the value of the lag time constant.

The $F_y/M_z$ data calculating section 24 supplies the time-series data of the slip angle $\alpha(t)$ to the tire dynamic model computing section 14, causing the tire dynamic model computing section 14 to calculate the lateral force $F_y(t)$ and torque $M_z(t)$ by using the parameter values and the values of the lag time constants $t_s$, $t_r$ and $t_d$ that are stored in the memory 21, thereby obtaining the information as time-series data of the lateral force $F_y(t)$ and the torque $M_z(t)$ in the transient state during cornering.

The $F_x$ data calculating section 26 supplies the time-series data of the slip ratio $S(t)$ to the tire dynamic model computing section 14, causing the tire dynamic model computing section 14 to calculate the longitudinal force $F_x(t)$ by using the parameter values and the value of the lag time constant $t_s$ that are stored in the memory 21, thereby obtaining the time-series data as the longitudinal force $F_x(t)$ in the transient state during braking/driving.

The computing device 10 has the configuration described above.

Figure 13:
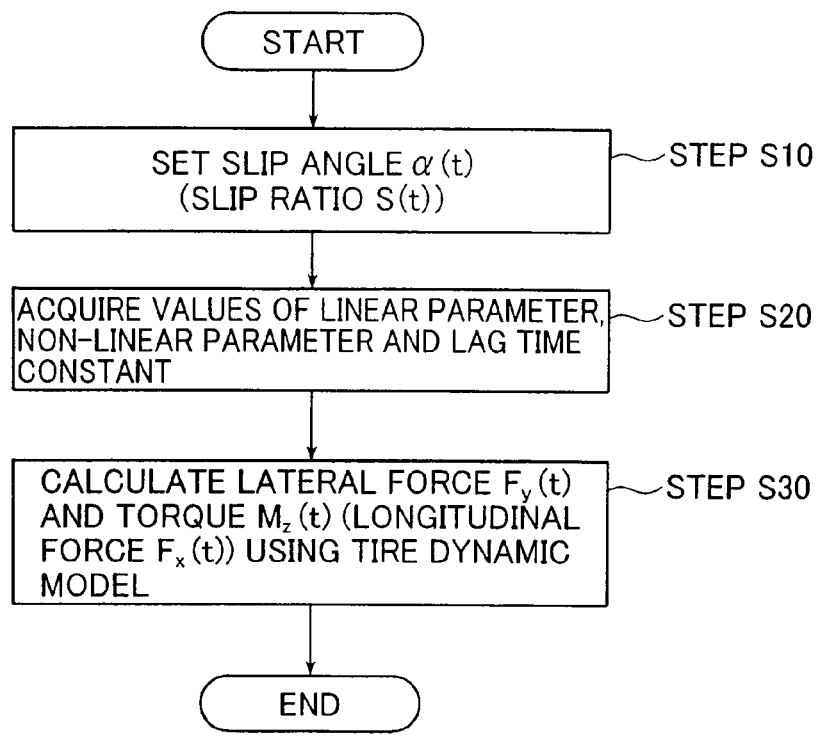
FIG. 13 is a flowchart that shows the flow of an example of the tire transient response data calculation method according to the present invention.

FIG. 13 shows a tire transient response data calculating method, that is, a flowchart showing a flow of calculating time-series data of the lateral force $F_y(t)$ and the torque $M_z(t)$ during cornering, or the time-series data of longitudinal force $F_x(t)$ during braking/driving. The calculation of the time-series data of lateral force $F_y(t)$ and torque $M_z(t)$ during cornering is mainly described below, and the calculation of time-series data of longitudinal force $F_x(t)$ during braking/driving is enclosed in parentheses.

First, in the $F_y/M_z$ data calculating section 24 ($F_x$ data calculating section 26), the slip angle $\alpha(t)$ (slip ratio $S(t)$) is set (Step S10). The settings of the slip angle $\alpha(t)$ (slip ratio $S(t)$) may be input by an input operation system such as a mouse or a keyboard connected to the computing device 10, or they may be created by the computing device 10. Alternatively, the settings may be input from an external device connected to the computing device 10. For example, the time-series data of the slip angle $\alpha(t)$, as shown in FIG. 8D, is set. The time-series data is supplied to the tire dynamic model computing section 14.

In the tire dynamic model computing section 14, the linear parameter values used for the tire dynamic model and the non-linear parameter values (including the value of the lag time constant), which are stored in the memory 21, are loaded and thus obtained as the parameter values of the tire dynamic model (Step S20).

In the tire dynamic model computing section 14, these parameter values are used together with the supplied slip angle $\alpha(t)$ (slip ratio $S(t)$) to calculate the time-series data of lateral force $F_y(t)$ and torque $M_z(t)$ (longitudinal force $F_x(t)$) according to the formulae (1) to (8) (formulae (10) to (14)) (Step S30). The time-series data of lateral force $F_y(t)$ and torque $M_z(t)$ (longitudinal force $F_x(t)$), as calculated in the tire dynamic model computing section 14, is returned to the $F_y/M_z$ data calculating section 24 ($F_x$ data calculating section 26) and set as the time-series data during cornering (braking/driving).

Figure 14A:
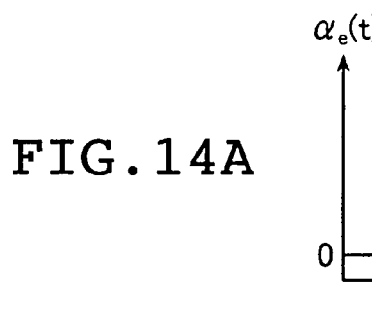
FIGS. 14A and 14B are diagrams that illustrate the transient response of a slip angle used in the tire transient response data calculation method.
Figure 14B:
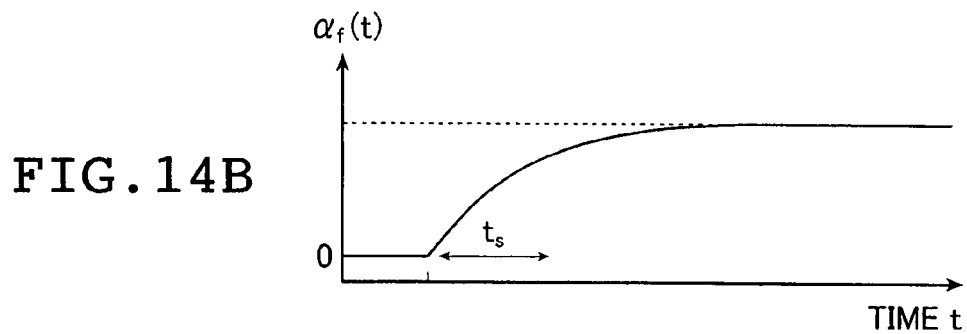

The present invention is characterized in that the response functions of a first-order-lag response used for the tire dynamic model are represented by $[1-\exp(-(t-t')/t_r)]$, $[1-\exp(-(t-t')/t_s)]$ and $[1-\exp(-(t-t')/t_d)]$, the computation of the convolution integral of these response functions with a time gradient of the time-series data of the torque $M_z(t)$, an effective slip angle $\alpha_e(t)$ and a lateral force $F_y(t)$ is performed, and the obtained value is used for the tire dynamic model. Through the convolution integration, the slip angle (slip ratio) during cornering (braking/driving) forms a curve that changes gradually, and the time-series data substantially equivalent to the actual measured measurement data can be calculated as shown in FIG. 8. FIG. 14A shows an example in which the effective slip angle $\alpha_e(t)$ is a step function. In this case, through the computation of the convolution integral of the response function with the time gradient of the time-series data, the corrected slip angle $\alpha_c(t)$ represents a curve that gradually changes as shown in FIG. 14B.

Figure 15:
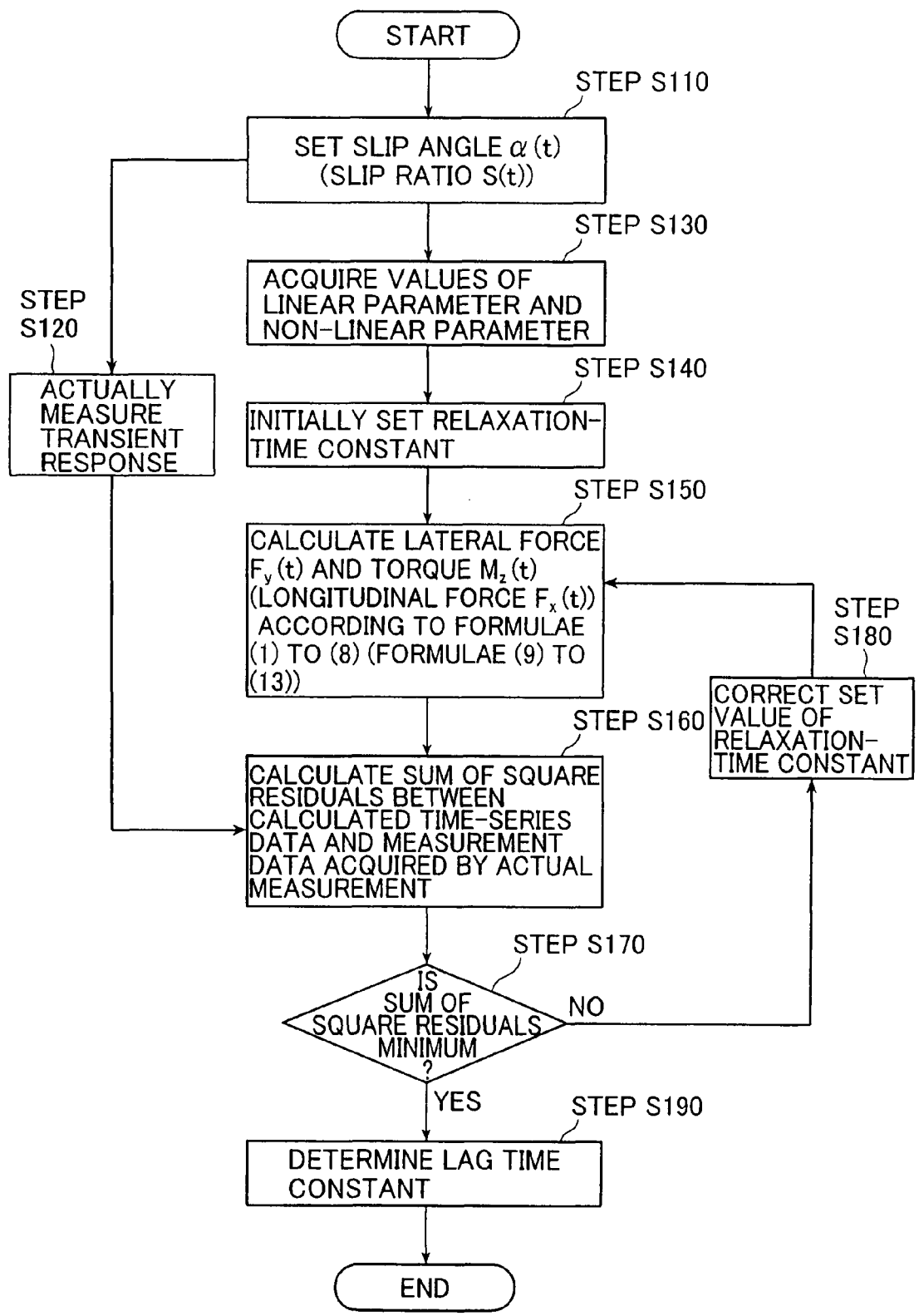
FIG. 15 is a flowchart that shows the flow of an example of the data processing method according to the present invention.

FIG. 15 is a flowchart showing an example of the data processing method according to the present invention. The data processing method is used in the computing device 10 for determining the value of the lag time constant (relaxation time constant) of the response function for the purpose of defining transient response during cornering or braking/driving. The following mainly describes the determination of the lag time constant in a first-order-lag response during cornering, and the determination of the lag time constant in a first-order-lag response during braking/driving is enclosed in parentheses.

First, in the cornering parameter calculating section 20 (braking/driving parameter calculating section 22) the time-series data of the slip angle $\alpha(t)$ (slip ratio $S(t)$) is set (step S110). The settings of the slip angle $\alpha(t)$ (slip ratio $S(t)$) may be input through an input operation system such as a mouse or a keyboard connected to the computing device 10, or they may be created by the computing device 10. Alternatively, the settings may be input from an external device connected to the computing device 10. For example, the time-series data of the slip angle $\alpha(t)$, as shown in FIG. 8D, is set. The time-series data is supplied to the tire dynamic model computing section 14.

The set series-data of the slip angle $\alpha(t)$ (slip ratio $S(t)$) is supplied to a tire-behavior test machine such as a cornering-characteristic measuring device (FIG. 19) in order to test the tire based on the time-series data of the supplied slip angle $\alpha(t)$ (slip ratio $S(t)$). Thus the actual measurement of the tire is performed, the measurement data of the lateral force $F_y(t)$ and torque $M_z(t)$ (longitudinal force $F_x(t)$) in the transient state is obtained (Step S120). This measurement data is supplied to the computing device 10 and stored in the memory 21.

Subsequently, in the cornering parameter calculating section 20 (braking/driving parameter calculating section 22), the values of the linear parameter and the non-linear parameter, as stored in the memory 21, are loaded and then obtained as parameters for use by the tire dynamic model (step S130).

Then, in the cornering parameter calculating section 20 (braking/driving parameter calculating section 22), lag time constants (relaxation time constant) $t_r$, $t_s$, and $t_d$ (lag time constant $t_s$) for specifying the response function of the first-order-lag response of the tire are initialized to a predetermined value, such as 0.02 seconds (Step S140).

After that, the initialized values of the lag time constants $t_r$, $t_s$, and $t_d$ (lag time constant $t_s$), as set in the cornering parameter calculating section 20 (braking/driving parameter calculating section 22), and the set time-series data of the slip angle $\alpha(t)$ (slip ratio $S(t)$) are supplied to the tire dynamic model computing section 14.

In the tire dynamic model computing section 14, the linear parameter value and the non-linear parameter values (other than the lag time constant), which are stored in the memory 21, are loaded, and the parameter values and the values of the lag time constant are used together with the supplied time-series data of the slip angle $\alpha(t)$ (slip ratio $S(t)$) to thereby calculate the time-series data of lateral force $F_y(t)$ and torque $M_z(t)$ (longitudinal force $F_x(t)$) according to the formulae (1) to (8) (formulae (10) to (14)) (Step S150).

The calculated lateral force $F_y(t)$ and the torque $M_z(t)$ (longitudinal force $F_x(t)$) are returned to the cornering parameter calculating section 20 (braking/driving parameter calculating section 22), and the measurement data of lateral force $F_y(t)$ and torque $M_z(t)$ (longitudinal force $F_x(t)$), as actually measured in Step S120 and stored in the memory 21, are loaded in order to calculate the sum-of-square residual between the calculated time-series data of lateral force $F_y(t)$ and the calculated time-series data of torque $M_z(t)$ (longitudinal force $F_x(t)$) (Step S160). The sum-of-square residual are calculated by obtaining the difference between lateral forces $F_y(t)$ and torque $M_z(t)$ at the same time of the time-series data, and then making each difference squared and summing it up. Thus, when the sum-of-square residual is smaller than a predetermined value that is approximate to 0, the calculated time-series data of the lateral force $F_y(t)$ and torque $M_z(t)$ is assumed to be substantially equivalent to the actual measurement data.

Consequently, it is judged whether or not the sum-of-square residual is smaller than the predetermined value and is a minimum value (Step S170).

When the judgment result shows that the sum-of-square residual is not smaller than the predetermined value or is not a minimum value, the set values of the lag time constants $t_r$, $t_s$, and $t_d$ (lag time constant $t_s$) are corrected (Step S180). When the judgment result shows that the sum-of-square residual is smaller than the predetermined value and is a minimum value, the set values of the lag time constants are determined as the lag time constants of the response function representing the first-order-lag response (Step S190). The method of minimizing the sum-of-square residual is not particularly limited, and a non-linear least-square regression algorithm of the Newton-Raphson method may be adopted.

Thus the measurement data in the transient state during the cornering (braking/driving) of the tire is acquired in advance by providing the tire with the time-series data of the slip angle (slip ratio) as measurement conditions, and once the lag time constant is initialized the lateral force $F_y(t)$ and torque $M_z(t)$ (longitudinal force $F_x(t)$) are calculated using the tire dynamic model. Then, the sum-of-square residual between the measurement data of the tire and the calculated time-series data is calculated. When the sum-of-square residual is not acceptable, the value of the lag time constant is corrected and the calculation is repeated until the sum-of-square residual reaches the minimum, thereby determining the set value of the lag time constant obtained when the sum-of-square residual is the minimum as a value of the lag time constant for use in defining the first-order-lag response. At this time, the linear parameter value and the non-linear parameter values (other than the lag time constant), which are used for the tire dynamic model, are calculation results originating from the lateral force $F_y$ and torque $M_z$ (longitudinal force $F_x$) in the steady state. The lag time constant in the transient response can be determined by using tire dynamic-element parameter values in the steady state, thereby making it possible to efficiently determine the lag time constant.

Figure 16:
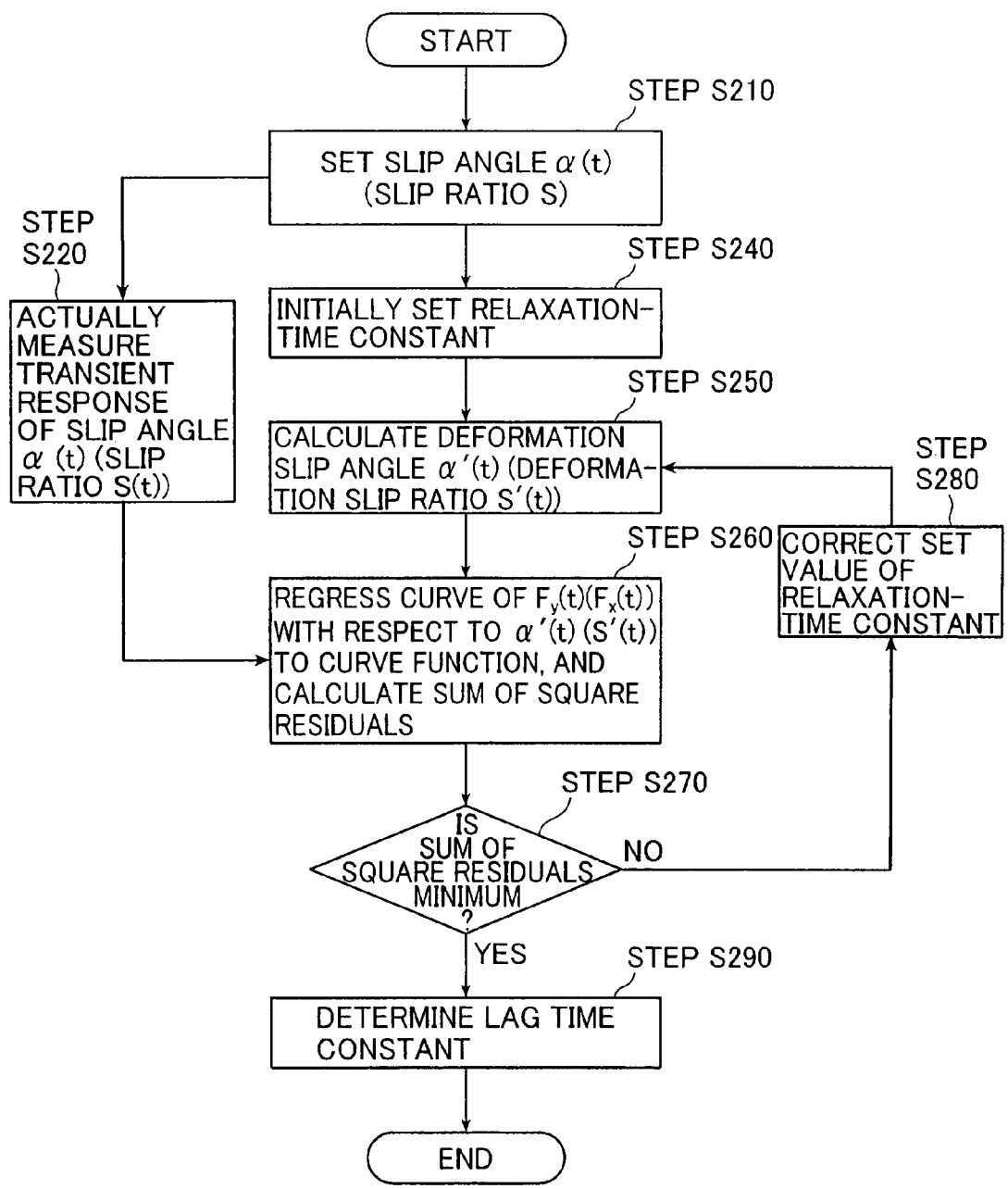
FIG. 16 is a flowchart that shows the flow of another example of the data processing method according to the present invention.

According to the present invention, the value of the lag time constant can be determined not only in the flow of FIG. 15, but also by the following method. FIG. 16 is a flowchart of determining the value of the lag time constant (relaxation time constant) by a method that differs from the one shown in FIG. 15. FIGS. 17A to 17D show graphs that explain the data processing method.

The following description pertains to the transient-response data during cornering when the time-series data of the slip angle is applied to the tire dynamic model, but the transient response during braking/driving when the time-series data of the slip ratio is given can also be described in the same manner. Hereinafter, the transient response during cornering is mainly described, and the transient response during braking/driving is enclosed in parentheses. Specifically, in the data processing method to be described below, the deformation response of the tread part for specifying the transient response during cornering (braking/driving) in the tire dynamic model constituted by using a tire dynamic-element parameter (a lag time constant) is set as the first-order-lag response to calculate the value of a transient response parameter (a lag time constant) for use in defining the first-order-lag response.

Figure 17A:
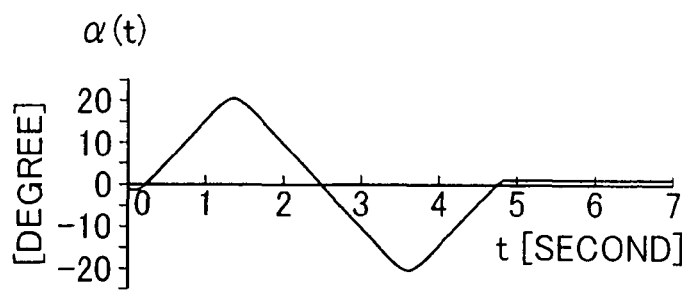
FIGS. 17A to 17D are graphs acquired through the method shown in FIG. 16.
Figure 17B:
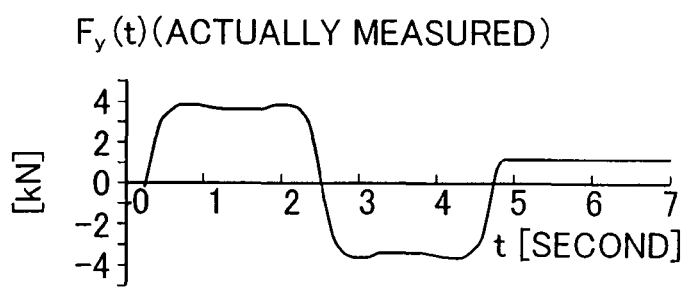

First, in the cornering parameter calculating section 20 (braking/driving parameter calculating section 22), the time-series data of the slip angle (slip ratio), which varies across at least a range between 0 degrees and a predetermined angle (the slip ratio between 0 and the predetermined value) while the slip angle (slip ratio) reciprocates, is set (step S210). For example, as shown in FIG. 17A, the time-series data of a slip angle that varies while reciprocating between −20 degrees and +20 degrees is set.

Next, by applying the set time-series data of the slip angle α(t) (slip ratio S(t)) to the tire as a measurement condition, the transient response data during the cornering (braking/driving) of the tire is actually measured to thereby obtain, in advance, the measurement data of the lateral force $F_y(t)$ or torque $M_z(t)$ (longitudinal force $F_x(t)$) at that time (step S220). For example, the measurement data of the actually measured lateral force $F_y(t)$, as shown in FIG. 17, is obtained. The measurement of the tire was conducted under the measurement conditions of a tire size of 205/55R16 89V, a load of 3.9 (kN) and a travel speed of 80 (km/h).

While the transient response data during cornering (braking/driving) is actually measured, the lag time constant (relaxation time constant) of the deformation response of the first-order lag over the whole tire, which is used for the tire dynamic model, is set as $t_1$, and the value of $t_1$ is initialized to define the response function of the first-order-lag response (Step S240).

Then, the tire dynamic model computing section 14 computes the convolution integral of the defined response function of the first-order lag with the time gradient of the slip angle (slip ratio) in order to calculate the corrected slip angle α'(t) (corrected slip ratio S'(t)), which is the time-series data for the transient response of a slip angle (slip ratio) in the tread part with respect to the road surface in the tire dynamic model according to Formula (20) (where C=t'), as described below (Step S250).

Figure 17C:
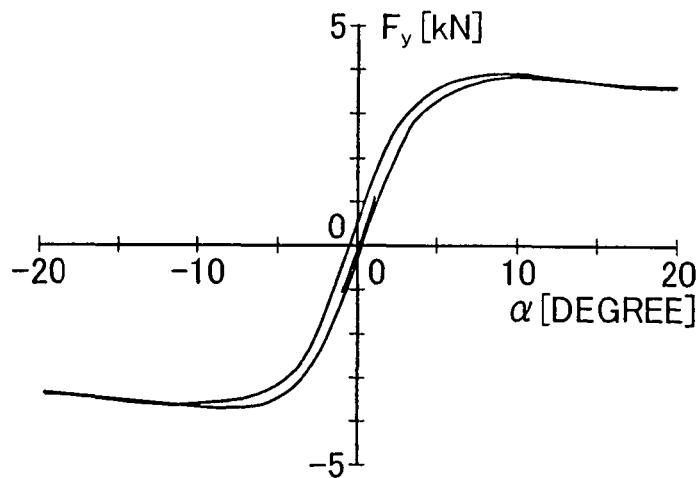

The calculated value of the time-series data of the transient response of the corrected slip angle α'(t) (corrected slip ratio S'(t)) is returned to the cornering parameter calculating section 20 (braking/driving parameter calculating section 22) to be set as the value of the time-series data of transient response, and then a characteristic curve represented by the value of the time-series data of the transient response of the corrected slip angle α'(t) (corrected slip ratio S'(t)) and the value of the actual measured lateral force $F_y(t)$ or torque $M_z(t)$ (longitudinal force $F_x(t)$), as obtained in Step S120, is formed. The characteristic curve is obtained when the slip angle (slip ratio) is represented on the horizontal axis and the lateral force or torque (longitudinal force) is represented on the vertical axis. The graph of FIG. 17C shows a characteristic curve that is formed using the values of the measurement data of the actual measured lateral force $F_y(t)$ shown in FIG. 17B and the values of the time-series data of the transient response of the slip angle. In this case, the symbol C of Formula (20) represents the above-mentioned lag time constant $t_1$ of the first-order-lag deformation response over the whole tire.

[Mathematical Formula 6]

$$\begin{matrix} \alpha'(t) \\ (S'(t)) \end{matrix} = \int_0^t \left[1 - \exp\left(-\frac{t-t'}{C}\right)\right] \begin{matrix} \frac{d\alpha(t')}{dt'} \\ \left(\frac{dS(t')}{dt}\right) \end{matrix} dt' \quad (20)$$

Next, the characteristic curve is subjected to least-square regression to obtain a smooth curve by using smooth curve functions, such as spline functions. Regression calculation is then performed in order to obtain a sum-of-square residual between the least-square regression curve obtained through least-square regression and the characteristic curve at that time (Step S260).

Next, it is judged whether or not the calculated sum-of-square residual is smaller than the predetermined value and is minimal (Step S270). When the calculated sum-of-square residual is not minimal, the set value of the lag-time constant $t_1$ is corrected in order to correct the first-order lag response function (Step S280), and the steps S250 and S260 are repeated. The value of the lag-time constant $t_1$ obtained when the sum-of-square residual is minimal is determined as the value of the lag-time constant $t_1$ for use in defining the first-order-lag response (Step S290).

Figure 17D:
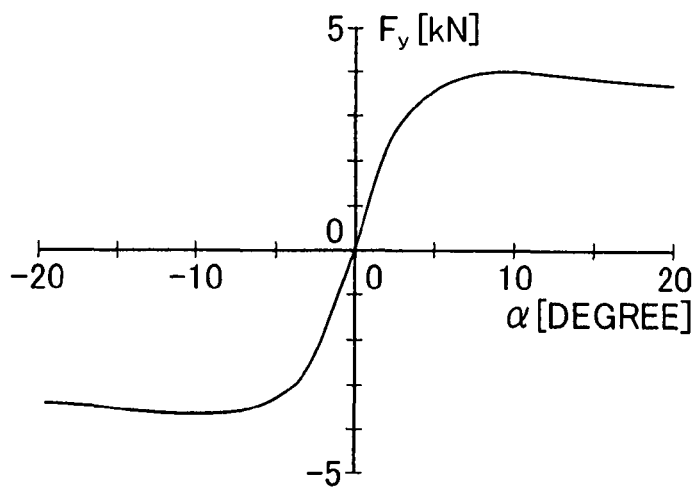

Thus the value of the lag time constant $t_1$ is determined so that the sum-of-square residual reaches the minimum, based on the following reason: As shown in FIG. 7C, in the transient state the value of the lateral force varies according to whether the slip angle is increased or decreased. This is because, with respect to the given slip angle (slip ratio), the actual slip angle (slip ratio) at the transient response time varies due to the first-order-lag deformation of the tread part, the belt part and the side part according to the past. Accordingly, the characteristic curve is formed by replacing the given slip angle (slip ratio) with the slip angle (slip ratio) at the transient response time, thereby obtaining a curve that represents the same lateral force (longitudinal force) between the case where the slip angle is increased and the case where the slip angle is decreased, meaning a characteristic curve that represents the lateral force (longitudinal force) or the like with respect to the slip angle in the steady state. As a result, when the characteristic curve in the transient state in which the value varies depending on whether the slip angle (slip ratio) is increased or decreased, the value of the set lag time constant $t_1$ is searched for while being corrected so that the sum-of-square residual reaches the minimum. The correction of the value of the lag time constant $t_1$ at that time can be performed through the use of a non-linear least-square regression algorithm of the Newton-Raphson method. FIG. 17D shows an example of a smooth characteristic curve formed by using the value of the lag time constant thus determined. The characteristic curve corresponds to a characteristic curve of the lateral force in the steady state.

As described above, the lag time constant obtained when the sum-of-square residual is minimal is searched for and determined.

Further, according to the present invention, in place of the calculation method for the tire transient response data shown in FIG. 13, which calculates the time-series data of lateral force $F_y(t)$ and torque $M_z(t)$ during cornering, or the time-series data of longitudinal force $F_x(t)$ during braking/driving, the following method can be used to calculate the time-series data of lateral force $F_y(t)$ and torque $M_z(t)$ during cornering or to obtain the time-series data of longitudinal force $F_x(t)$ during braking/driving.

Figure 18:
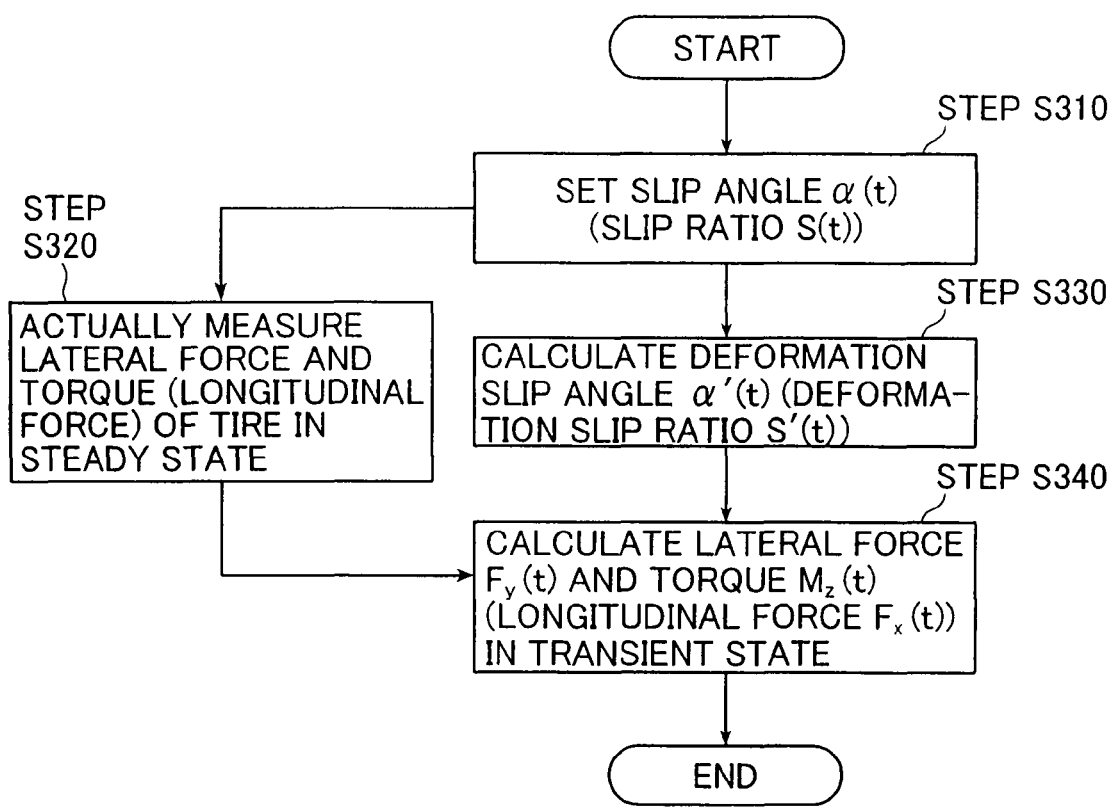
FIG. 18 is a flowchart that shows the flow of another example of the tire transient response data calculating method according to the present invention.

FIG. 18 is a flowchart depicting the calculation method for the tire transient-response data, which is different from the method shown in FIG. 13. Specifically, FIG. 18 is the flowchart depicting the flow of calculating the tire transient response data during cornering (baking/driving) when the slip angle (slip ratio) is given as the time-series data based on the tire dynamic model, which is constituted by using a plurality of tire dynamic element parameters.

First, the time-series data of the slip angle $\alpha(t)$ (slip ratio $S(t)$), in which the slip angle changes at least within the range between 0 degrees and the predetermined angle, is set (S310). Next, a value of the lateral force $F_y$ or torque $M_z$ (longitudinal force $F_x$) in the steady state, when the set slip angle $\alpha(t)$ (slip ratio $S(t)$) is given to the tire as the slip angle $\alpha$(slip ratio S) in the steady state, is acquired in advance (Step S320). The measurement data obtained through the actual measurement is stored in the memory 21 of the computing device through the data input section 12.

Subsequently, the value of the lag time constant is loaded from the memory 21, and a response function of the first-order-lag response for specifying the deformation response of the tread part during cornering (braking/driving) is set. The value of the first-order-lag response loaded from the memory 21 contains the lag time constant $t_1$ of the response function for use in specifying the deformation response of the first-order lag over the whole tire. The computation of the convolution integral of the set response function with the time gradient of the time-series data of the set slip angle $\alpha(t)$ (slip ratio $S(t)$) is performed according to the above-mentioned Formula (20), in which the lag time constant C is $t_1$, thereby calculating the time-series data of the transient response of the corrected slip angle $\alpha'(t)$ (corrected slip ratio $S'(t)$) in the tread part with respect to the road surface (Step S330).

Then, by calculating the value of the time-series data of the lateral force or self-aligning torque in the steady state corresponding to the calculated value of the time-series data of the corrected slip angle $\alpha'(t)$ (corrected slip ratio $S'(t)$) in the transient state, the lateral force or the torque (longitudinal force) in the transient state is calculated (Step S340).

This is because it is assumed that, in the method of calculating the transient response, the value of the lateral force or torque (longitudinal force) in the transient state is not based on the slip angle (slip ratio) actually given but is instead based on the corrected slip angle (corrected slip ratio), which is a correction result of the given slip angle (slip ratio) due to the first-order-lag deformation of the tread part. With this method, by using the data of the lateral force and the torque (longitudinal force) in the steady state as well as the corrected slip angle (corrected slip ratio), the time-series data of the torque (longitudinal force) in the transient state can be calculated simply and quickly.

As described above, at least one of the linear parameter value and the non-linear parameter value containing the lag time constant in the tire dynamic model is calculated, and the value is related to each type of tire component member of the tire. In other words, according to each type of tire component member a table is created in advance so that at least one of the linear parameter value and the non-linear value containing the lag time constant is loaded. Thus a tire design method can be executed as described below.

Specifically, by using the calculation method for the tire transient-response data, the tire transient-response data (the data of lateral force, torque and longitudinal force) is output. When the output data does not satisfy the set target condition, such as when the output data does not match the target data within the allowable margin of error, the tire component member that defines the linear parameter value and the non-linear parameter value containing the lag time constant is changed for the selection of another tire component member. Therefore, at least one of the linear parameter value and the non-linear parameter value containing the lag time constant is changed according to the selected tire component member, thus repeatedly calculating and outputting the tire transient response data. When the output data satisfies the target condition, the tire component member selected at that time is determined as the target tire component member. As a result, it is possible to design a desired tire that satisfies the target condition.

Further, by using the calculation method for the tire transient response data, the tire transient response data is calculated and output, the tire transient response data is applied to a vehicle model to which the tire is mounted, and a vehicle motion by the vehicle model is predicted, thereby making it possible to perform a simulation calculation of the vehicle's motion behavior.

In the data processing method, the lag time constant of the first-order lag during cornering and the lag time constant of the first-order lag during braking/driving are determined separately. However, the lag time constant of the first-order lag can be determined simultaneously in a state where the values obtained during cornering and the values obtained during braking/driving are mixed, and in addition, the lag time constant values of $t_r$, $t_s$ and $t_d$, which are defined both in the cornering state and in the braking/driving state, can be determined.

In the same manner described above, the time-series data of the lateral force, torque and longitudinal force obtained when the slip angle and slip ratio are given simultaneously can be calculated at the same time.

In the data processing method, by using the measurement data in the tire transient state, the lag time constant value of the first-order lag during cornering or the lag time constant value of the first-order lag during braking/driving is determined. Alternatively, by enlarging the parameter whose value is to be determined, a part of the linear parameter value or the non-linear parameter value shown in FIGS. 3 and 10 may be determined through the use of the above-mentioned lag time constant.

Next, a method and apparatus for evaluating a cornering characteristic of a tire according to the present invention will be described.

Figure 19:
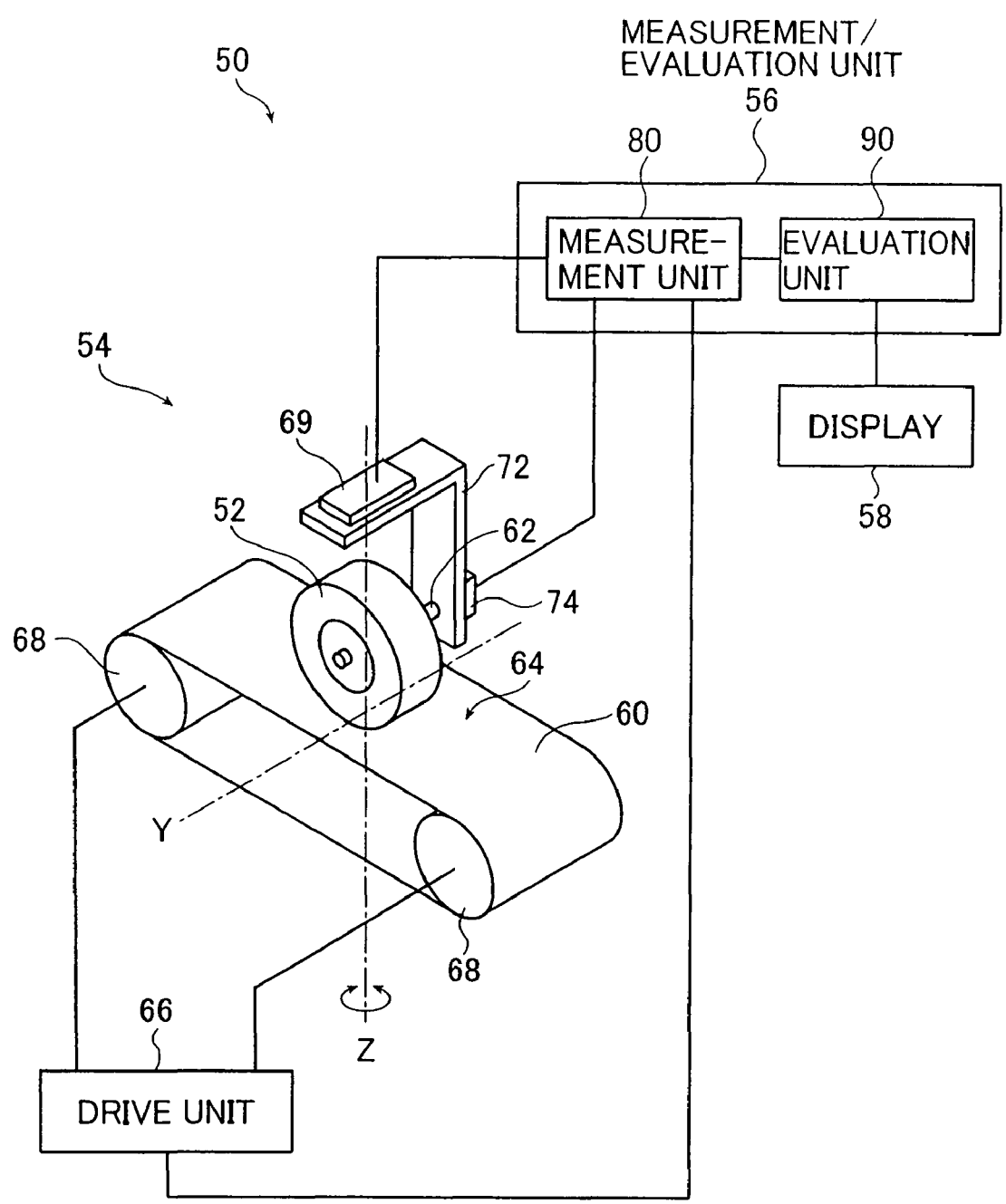
FIG. 19 is a schematic structural diagram that explains a tire cornering characteristic evaluation device according to the present invention.

FIG. 19 is a schematic structural diagram that illustrates a cornering characteristic measuring device 50 (hereinafter, referred to as "device 50"), which is an example of a device for evaluating a cornering characteristic of a tire according to the present invention. FIG. 19 illustrates an embodiment where, by using the apparatus 50, a tire 52, as the target tire to be measured, is rolled at a plurality of different speeds, a tire dynamic element parameter value representing the cornering characteristic of the tire is derived, and further, a plot diagram representing a rolling-speed dependency is displayed for each parameter value. The device 50 includes a cornering testing machine 54 and a measurement/evaluation unit 56. The measurement/evaluation unit 56 is connected to a display 58.

The cornering testing machine 54 is a known flat-belt indoor testing machine that causes the tire 52, which is rotationally supported by the tire axis 62, to come into contact with the substitute road surface 64, which is the surface of the belt 60, to rotationally drive the belt 60, thereby causing the tire 52 to travel (roll) on the substitute road surface 64 of the belt 60. In the cornering testing machine 54 of this embodiment, a slip angle that changes step-wise in time series is sequentially applied to the tire 52 traveling on the substitute road surface 64, and the tire's lateral force (lateral force) generated in the tire 52 in accordance with the slip angle is measured in time series to obtain lateral force data. In the case where the slip angle (SA) of the tire has significantly changed due to a significant change in the steering angle or disturbance, the lateral force (SF) or self-aligning torque (SAT) with respect to the slip angle is generated with a time lag. In the specification, the tire characteristics at this time are referred to as "cornering characteristics."

In this embodiment, the slip angle is input within a relatively small range whereby the maximum value of the slip angle is 2.0 degrees or less. In other words, the tire's lateral force generated in the tire 52 in accordance with the slip angle of the tire 52 as the measurement target in the vicinity of the steering neutral position at which the slip angle is relatively small, is measured. In the vicinity of the steering neutral position, the input slip angle and the response of the tire's lateral force with respect to the slip angle have a substantially linear relationship. In this embodiment, the slip angle is input in the linear region having a substantially linear relationship.

The belt 60 is wound around a roller pair 68. The roller pair 68 is connected to a drive unit 66, which includes a motor (not shown). The substitute road surface 64 of the belt 60 moves due to the rotation of the roller pair 68 owing to the motor of the drive unit 66. The drive unit 66 is connected to the measurement unit 80 of the measurement/evaluation unit 56, which will be described later.

The tire axis 62 is applied to the axial tire support member 72. The axial tire support member 72 is rotationally driven about the Z-axis of FIG. 19 by the slip-angle adjusting actuator 69 (hereinafter referred to as the actuator) as the slip-angle adjusting means. The Z-axis of FIG. 19 is positioned on the equational plane of the tire 52, which is perpendicular to the rotational center axis of the tire 52 (that is, the center of the tire axis 62). By rotationally driving the axial tire support member 72 about the Z-axis of FIG. 19, the slip angle of the rolling tire 52 (the angle formed between the rolling direction of the tire 52, or the moving direction of the substitute road surface 64, and the equational plane of the tire 52) is varied. The actuator 69 is connected to the measurement unit 80 of the measurement/evaluation unit 56, which will be described later.

A sensor 74 capable of measuring the force applied to the tire axis 62 is applied to the axial tire support member 72 The sensor 74 measures the force applied to the tire axis 62 in the direction perpendicular to the tire equational plane (the force in the Y-axis direction in FIG. 19), meaning the tire lateral force. It should be noted that the sensor 74 is not particularly limited as long as it is a device capable of measuring at least the tire lateral force applied to the tire axis 62, such as one using piezoelectric elements or strain gauges. The axial tire support member 72 is connected to a load applying device (not shown). When a predetermined load is applied by the load applying device during the rolling of the tire 52, the tire 52, being supported by the tire axis 62, is brought into contact with the substitute road surface 64 of the belt 60 by the predetermined contact load The sensor 74 is connected to the measurement unit 80 of the measurement/evaluation unit 56, which will be described later.

Figure 20:
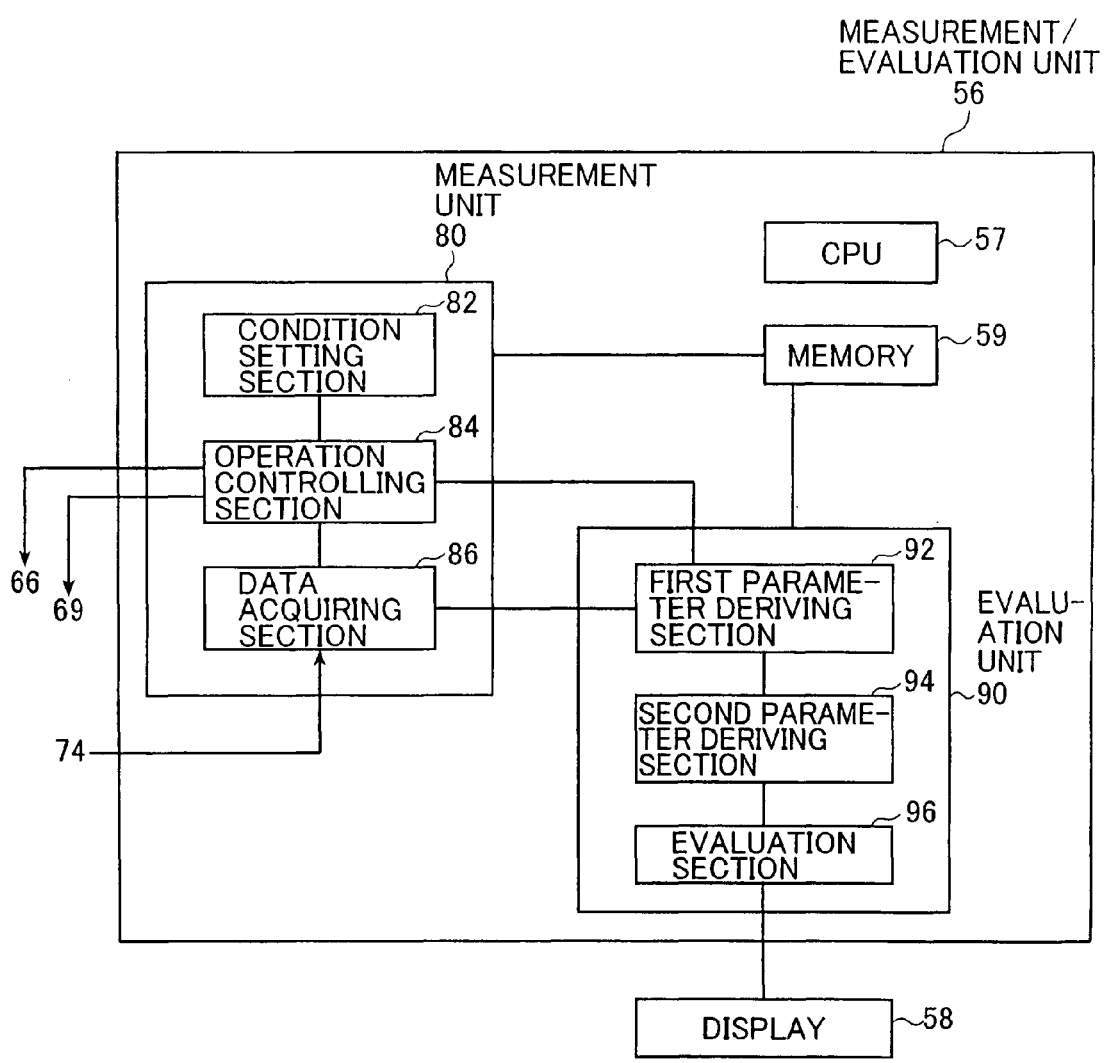
FIG. 20 is a schematic structural diagram that explains a measurement/evaluation unit of the tire cornering characteristic evaluation device shown in FIG. 20.

The measurement/evaluation unit 56 is comprised of the measurement unit 80 and the evaluation unit 90. FIG. 20 is a schematic structural diagram illustrating the measurement/evaluation unit 56. The measurement/evaluation unit 56 includes the measurement unit 80, the evaluation unit 90, a CPU 57 and a memory 59. The measurement/evaluation unit 56 is a computer in which the respective sections of the measurement unit 80 and evaluation unit 90 function when a program stored in the memory 59 is executed by the CPU 57.

It should be noted that a calculation and output program (hereinafter referred to as the transient response calculation model program") of a tire transient response calculation model, which is a tire dynamic model of the invention, is pre-stored in the memory 59. The transient response calculation model is obtained by simplifying the tire dynamic model, as constituted by the plurality of tire dynamic element parameters, by setting the condition of the slip angle within the linear region in which the maximum value thereof is 2.0 degrees or less, and by simplifying the transient response of the tire lateral force. As described above, the tire dynamic model of this case is expressed by the formulae (1) to (8) shown in FIG. 3.

The formulae (1) to (8) representing the tire dynamic model are associated with the deformation (and delayed deformation) of individual tire members. By using the formulae (1) to (8), the cornering characteristics of the tire can be evaluated for cases in which the characteristics of the respective components of the tire are changed individually. The above-mentioned tire dynamic model can be applied to (or used in) the design of the tire. The tire dynamic model with the slip angle in the linear region, in which the maximum value is 2.0 degrees or less, is simply expressed by the formulae (C) to (E) described below. The model expressed by those formulae is the transient response calculation model described above.

[Mathematical Formula 7]

$$\alpha'(t) = \int_0^t \left[1 - \exp\left(-\frac{t-t'}{t_3}\right)\right]\frac{d\alpha(t')}{dt'}dt' \quad (C)$$

$$F(t) = F_{ys}(\alpha'(t)) \quad (D)$$

$$M(t) = M_{zs}(\alpha'(t)) \quad (E)$$

In the formulae (C) to (E), $F_{ys}(\alpha)$, and $M_{zs}(\alpha)$ form a known steady slip-angle dependency curve of the lateral force $F_y$ and self-aligning torque M. These can be obtained through testing with angular, infinitesimal steering at speed. Constant $t_3$ represents a time constant of the delayed response of the overall tire and is a value reflecting $t_s$, $t_d$ and $t_r$ in the above-mentioned tire dynamic model. In the transient response calculation model described above, the time constant $t_3$ becomes an important element in producing a difference between the steady response and the transient response.

The time constant $t_3$ can be calculated through two methods:

In the first method, when the lateral force is to be measured, as described above, a slip angle $\alpha(t)$ of the time series is applied to an actual tire, and the data $F_y(t)$ of the lateral force generated in the tire at this time is measured. Subsequently, the following processing (a) and (b) is performed. The slip angle is set so that the slip angle increases from 0 and decreases after that.

(a) Regarding the measurement data group $(\alpha(t), F_y(t))$ including the input slip angle $\alpha(t)$ and lateral force data $F_y(t)$, which is the measurement data obtained at this time, a conversion according to Formula (11) (conversion of $\alpha(t)$ into $\alpha'(t)$) is performed using an adequate value as the time constant $t_3$, thereby obtaining the conversion data group $(\alpha'(t), F_y(t))$.

(b) The conversion data group $(\alpha'(t), F_y(t))$ thus obtained is subjected to least-square regression to produce a smooth curve function (with the use of a spline function and the like), and the regression curve obtained at this time is calculated, whereby the sum-of-square residual between the regression curve and the conversion data group $(\alpha'(t), F_y(t))$ is calculated. By repeating the processing (a) and (b) as described above and using, for example, the non-linear least regression algorithm of a Newton-Raphson method, the value of $t_3$ is determined so that the above-mentioned sum-of-square residual reaches the minimum. The regression curve expressed by using the value of $t_3$ thus determined, with which the sum-of-square residual reaches the minimum (a smooth curve function expressed by using the spline function and the like) corresponds to a slip-angle dependency curve $F_{ys}(\alpha)$ of a steady lateral force.

The other method uses a linear tire model obtained by further simplifying the tire dynamic model by limiting the range of the slip angle to be input to the tire to the linear region of a low slip angle (absolute value of the slip angle $\alpha \leq 2.0°$. In other words, $F_{ys}(\alpha)$ is represented as $K_y \cdot \tan(\alpha)$, and the time constant $t_3$ at which output data of the $K_y \cdot \tan(\alpha)$ matches the lateral force data $F_y(t)$ in an allowable range is calculated.

In the linear region described above, the output data F(t) corresponding to the lateral force is expressed by Formula (A), as described below. In other words, it uses the time-series data of the transient response of the slip angle obtained by computing the convolution integral of the response function of a first-order-lag response specifying the deformation response of the tread part during the cornering of the tire with a time gradient of the time-series data of the given slip angle.

[Mathematical Formula 8]

$$F(t) = K_y \cdot \tan\left\{\int_0^t \left[1 - \exp\left(-\frac{t-t'}{t_3}\right)\right] \frac{d\alpha(t')}{dt'} dt'\right\} \quad (A)$$

Here, $K_y$ represents the cornering stiffness of the overall tire, which indicates a gradient at the rise of the lateral force when the slip angle is 0°. In the linear region, the relationship contained in Formula (A) is established approximately. Furthermore, assuming that the lateral force generated between the contact patch and the tire is simply transferred to the wheel side via the equivalent lateral stiffness $K_L$ and the time constant $t_3$ of the formula described above is approximately expressed by Formula (B) described below, with the rolling speed of the tire being represented by V. In this case, $K_L$ is the equivalent lateral stiffness set according to the relative stiffnesses of the plurality of components of the tire. $K_L$ and $t_3$ are important indices that represent the respective transfer characteristics and cornering characteristics of the overall tire. In this embodiment, the program of the output data by the linear tire model represented by the first-order lag system as described above, meaning the program that calculates the output data F(t) according to the formulae (A) and (B), is pre-stored in the memory 59.

[Mathematical Formula 9]

$$t_3 = \frac{K_y}{K_L V} \quad (B)$$

The measurement unit 80 includes a condition setting section 82, an operation controlling section 84 and a data-acquisition section 86. The evaluation unit 90 includes a first parameter deriving section 92, a second parameter deriving section 94 and an evaluation section 96.

By controlling the operation of the respective sections of the cornering testing machine 54, the measurement unit 80 inputs the slip angle that changes in time series to the rolling tire 52 and acquires the tire's lateral force data while causing the tire 52 to roll at a predetermined rolling speed and with a predetermined contact load.

The condition setting section 82 of the measurement unit 80 sets the conditions of the slip angle, which changes stepwise in time-series, the rolling speed of the tire 52 and the contact load of the tire, which are to be sequentially given to the tire 52 traveling on the substitute road surface 64.

The condition setting section 82 sets, when acquiring an output signal of the tire lateral force, the conditions of the rolling speed or the contact load of the tire 52, and the slip angle that is to be input to the tire 52 and changes in time series. In this embodiment, the condition setting section 82 sets the plurality of rolling speed conditions in advance. It should be noted that when there is a request to create a plot diagram that will show the load dependency in the evaluation section 96 (to be described later) with respect to the value of the tire's dynamic element parameters representing the cornering characteristics, the condition setting section 82 only needs to set a plurality of magnitudes of the load to be applied to the tire, such magnitudes being applied by the above-described load applying device (not shown).

Figure 21A:
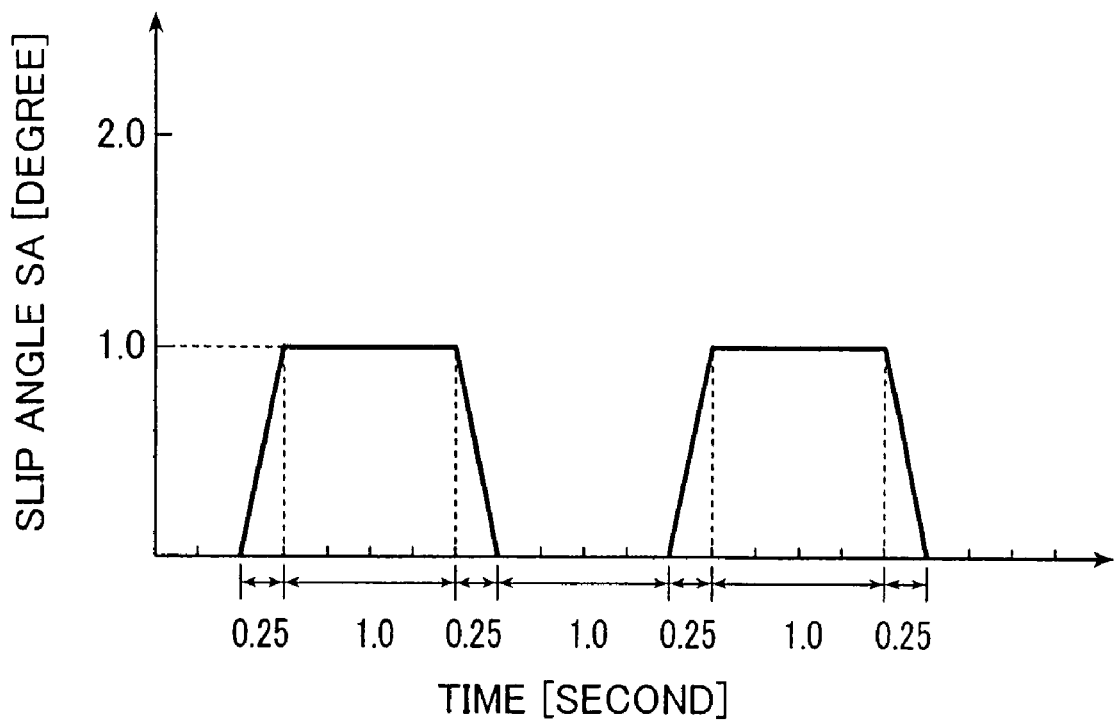
FIGS. 21A and 21B are graphs, each of which shows a time-series variation of the slip angle applied to a tire by a tire cornering characteristic measuring device, as shown in FIG. 20.
Figure 21B:
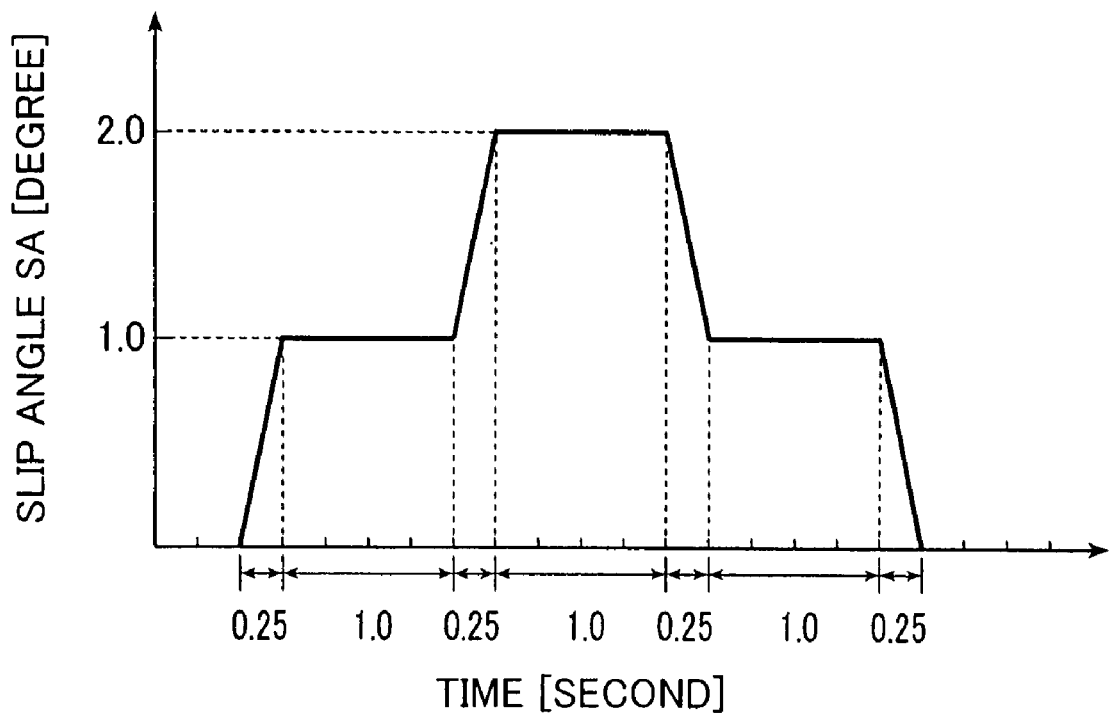

Furthermore, in the condition setting section 82 a time-series slip angle that changes step-wise as shown in FIG. 21A or 21B, for example, is set. By setting the slip angle that changes step-wise as described above, it is possible to have a relatively high-frequency component contained in the time-series data of the slip angle that is input to the tire 52. In the present invention, the slip angle to be input should preferably have a change rate of 0.1 to 0.5 (sec/degree) (0.25 (sec/degree) in the examples of FIGS. 21A and 21B). The reason for setting the slip angle within this range is because the change rate of the slip angle accompanying the actual steering of the vehicle while traveling at a high speed is in the range of approximately 0.1 to 0.5 (sec/degree). As described above, by setting the change rate of the slip angle to be the change rate of the slip angle accompanying the actual steering of the vehicle, one can obtain cornering-characteristic measurement results that are closer to the actual steering state of the vehicle. Furthermore, the maximum value of the absolute value of the slip angle according to the present invention is preferably 2.0 degrees or less. The reason for setting the maximum value of the slip angle in this range is because the range in which the lateral force data of the tire can be accurately expressed by the linear tire model expressed by the above-mentioned Formula (A) is within the range of the linear region having a relatively small slip angle to be input to the tire. Moreover, by setting the slip angle to be input to the tire within a relatively small range, one can obtain the effect of suppressing the tire's ablation of the measurement target due to measurement.

In the present invention, the upper-limit value of the maximum value of the change rate of the slip angle to be input, or the slip angle, is set within a range corresponding to the vehicle's actual state of travel. Accordingly, in the indoor cornering testing the variation of the slip angle during actual vehicle travel can be reproduced, and the cornering characteristics of the vehicle during actual travel can be reproduced with high accuracy. It should be noted that, in order for the slip angle to be input in time-series, it is preferable that a similar step-wise change in the slip angle is repeated. By repeating the similar step-wise change and repeatedly obtaining similar pieces of dynamic characteristics information, one can obtain information that is highly reliable and accurate.

The operation controlling section 84 controls the operation of each section of the cornering testing machine 54 based on the conditions of the rolling speed of the tire 52 and the time-series slip angle set in the condition setting section 82. The operation controlling section 84 is connected to the drive unit 66 and the actuator 69. The operation controlling section 84 controls the operation of the drive unit 66 (e.g., the rotational speed of the motor) so that the tire 52 rolls at the speed set in the condition setting section 82. Further, the operation controlling section 84 controls the operation of the actuator 69 so that the slip angle of the tire 52 changes under the condition of the time-series slip angle set in the condition setting section 82. Specifically, the set slip angle is sequentially input to the tire 52 in a state where the tire 52 rolls at a single speed set in the condition setting section 82. It should be noted that the time-series data of the slip angle to be input is also sequentially transmitted to the first parameter deriving section 92 of the evaluation unit 90.

The data acquiring section 86 obtains the time-series output signals (lateral force data) of the tire lateral force corresponding to the slip angle when the slip angle is applied to the rolling tire 52. The data acquiring section 86 is connected to the sensor 74 and acquires the output signal of the tire lateral force generated in the tire, as output from the sensor 74, in time series. The acquired time-series lateral force data of the tire lateral force is transmitted to the first parameter deriving section 92 of the evaluation unit 90.

The first parameter deriving section 92 of the evaluation unit 90 acquires the time-series data of the slip angle transmitted from the operation controlling section 84 and the time-series lateral force data acquired by the data acquiring section 86. Further, the first parameter deriving section 92 reads out the transient-response calculation program (a program of the linear tire model) from the memory 59 and derives a part of the tire dynamic element parameter representing the tire cornering characteristics using the linear tire model and the data thus received. Specifically, the first parameter deriving section 92 derives the value of the cornering stiffness $K_y$ and the value of the lag time constant $t_3$ in Formula (A) by using the time-series data $\alpha(t)$ of the slip angle, so that the output data F(t) calculated by the program of the linear tire model is approximated to the lateral force data $F_y(t)$ obtained through measurement. The value of the tire dynamic element parameter derived by the first parameter deriving section 92 is transmitted to the second parameter deriving section 94 and is stored in the memory 59. In the first parameter deriving section 92, the values of the cornering stiffness $K_y$ and time constant $t_3$ can be derived by, for example, least square regression. For example, the nonlinear least regression algorithm of the Newton-Raphson method can be used.

The second parameter deriving section 94 of the evaluation unit 90 derives a part of the values of the tire dynamic element parameters representing the tire cornering characteristics using the value of the tire dynamic element parameters received from the first parameter deriving section 92, information on the tire rolling speed and the linear tire model described above. Specifically, the value of the tire's equivalent lateral stiffness $K_L$ is obtained by substituting the values of the cornering stiffness $K_y$, the lag time constant $t_3$ and the tire rolling speed V in the above-mentioned Formula (B) specified by the linear tire model, and is stored in the memory 59.

When the value of the tire dynamic element parameters at a certain rolling speed is derived and stored in the memory 59, the device 50 causes the tire to roll at another rolling speed set in the condition setting section 82, and acquires the time-series tire lateral force data $F_y(t)$ and slip angle $\alpha(t)$ at the new rolling speed. With respect to the new rolling speed, as described above, the values of the tire dynamic element parameters representing the tire cornering characteristics are respectively derived and stored in the memory 59. In the device 50, by repeating the procedure described above under the control of the CPU 57, the values of the tire dynamic element parameters representing the tire cornering characteristics under the conditions of the plurality of rolling speeds and loads, which have been set in the condition setting section 82, are derived and stored in the memory 59.

The evaluation unit 90 reads out the plurality of values of the tire dynamic element parameters that are stored as described above, and creates a plot diagram showing the correlation between the rolling speed and the values of the respective tire dynamic element parameters at the respective rolling speeds in order to output the diagram to the display 58, for example. The plot diagram shows the rolling-speed dependency in the values of the respective dynamic element parameters. When a plurality of conditions of loads to be applied to the tire are set in the condition setting section 82, the evaluation unit 90 creates a plot diagram showing the correlation between the loads and the values of the respective dynamic element parameters at the respective loads, and outputs the diagram to the display 58. The plot diagram shows the load dependency of the respective dynamic element parameters. As the tire's rolling speed increases, the shape of the tire changes due to the expansion of the tread part in the radial direction due to centrifugal force, which affects the cornering characteristics. By displaying the plot diagram representing the rolling-speed dependency in the values of the respective dynamic element parameters, the evaluation section 96 provides detailed information on the tire cornering characteristics containing the change in the tire shape. In the actual evaluation of a vehicle, the loads applied to the tires are not constant and change according to the operation of the steering wheel and brakes, etc. Accordingly, the evaluation of load dependency is important.

Figure 22:
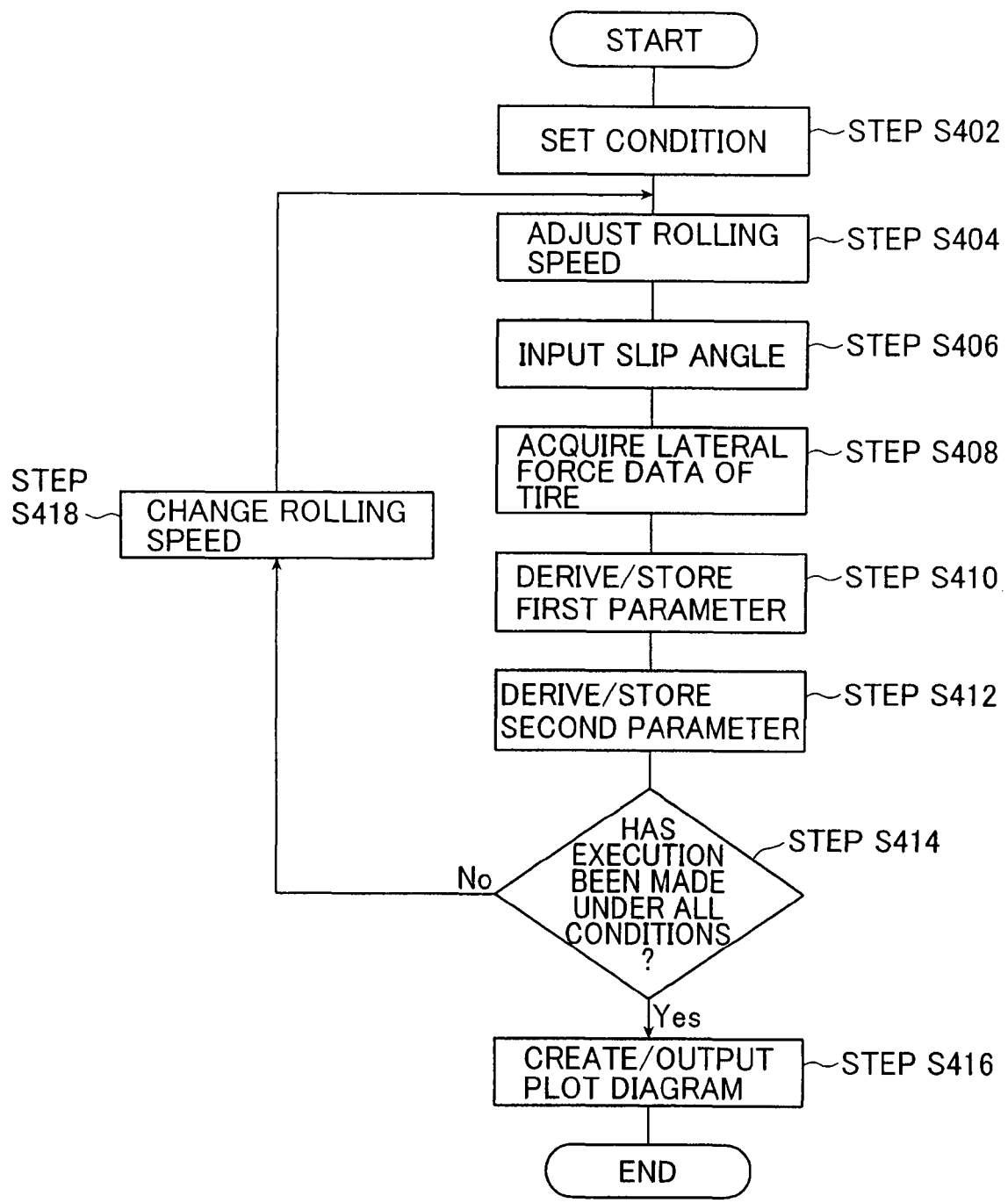
FIG. 22 is a flowchart of an example of a tire cornering characteristic evaluation method according to the present invention.

FIG. 22 is a flowchart showing an example of a measurement method of tire cornering characteristics, such method being carried out in the device 50. In the flowchart of FIG. 22, a case where the tire 52 is rolled at a plurality of different speeds, the values ($t_3$, $K_y$ and $K_L$) of the tire dynamic element parameters representing the tire cornering characteristics at the respective rolling speeds are derived, and a plot diagram representing the rolling-speed dependency of the respective parameters is shown. First, the condition setting section 82 sets the conditions of the rolling speed of the tire 52, the load to be applied to the tire 52, and the time-series slip angle to be input to the tire 52 upon the acquisition of tire lateral force data (Step S402). As described above, for use in defining the slip angle to be applied to the tire, the condition setting section 82 sets the slip angle that changes step-wise in time series. In the present invention, as described above, the range of the change rate of the slip angle to be input is set within the range of 0.1 to 0.5 (sec/degree), and the maximum value of the slip angle to be input is set to 2.0 degrees or less. Thus the condition of the slip angle is set so that it corresponds to the variation of the slip angle accompanying the actual steering of the vehicle while traveling at a high speed.

Next, the operation controlling section 84 controls the operation (e.g., the rotational speed of the motor) of the drive unit 66 and causes the tire 52 to roll at one of the plurality of speeds set in the condition setting section 82 (Step S404). While the tire 52 is rolling at the set speed, the operation controlling section 84 controls the operation of the actuator 69 and inputs the slip angle set in the condition setting section 82 to the tire 52. This changes step-wise in time series (Step S406). In a state where the tire 52 is rolling at the set speed, the data acquiring section 86 acquires, in time series, a signal of the lateral force data generated in the tire, which is output from the sensor 74 when the slip angle that changes in time series is applied to the tire 52 (Step S408).

Next, the first parameter deriving section 92 of the evaluation unit 90 derives the values of the part of the tire dynamic element parameters representing the tire cornering characteristics by using the time-series data of the slip angle transmitted from the operation controlling section 84, the tire lateral force data acquired by the data acquiring section 86, and the program of the linear tire model read out from the memory 59, and stores the values in the memory 59 (Step S410). Specifically, by subjecting the time-series data $\alpha(t)$ of the slip angle and the time-series tire lateral force data $F_y(t)$ to least-square regression so as to regress to the above-mentioned Formula (A) (by making the output data F(t) in Formula (A) match the lateral force data $F_y(t)$ in an allowable range), the values of cornering stiffness $K_y$ and the time constant $t_3$ of Formula (A) are derived. The value of the tire dynamic element parameter derived by the first parameter deriving section 92 is transmitted to the second parameter deriving section 94 and is stored in the memory 59.

Next, the second parameter deriving section 94 of the evaluation unit 90 derives the values of the part of the tire dynamic element parameters representing the tire cornering characteristics by using the results obtained from the first parameter deriving section 92 and the information on the tire rolling speed, and stores the values in the memory 59 (Step S412). Specifically, the value of the tire's equivalent lateral stiffness $K_L$ is derived by substituting the values of the cornering stiffness $K_y$, the time constant $t_3$ and the tire rolling speed V in the above-mentioned Formula (B), and is stored in the memory 59.

When the values of the cornering stiffness $K_y$, the time constant $t_3$ and the equivalent lateral stiffness $K_L$ of the tire dynamic element parameters are derived and stored with respect to a certain rolling speed (condition), a judgment is made as to whether the values of the tire dynamic element parameters have been calculated and stored with respect to all of the plurality of conditions of the rolling speeds that have been set (Step S414). When it is judged "No," that is, when there is a rolling speed at which the values of the tire dynamic element parameters have not been calculated and stored among the plurality of set rolling speeds, the processing of steps S404 to S414 is repeated after the rolling speed is changed (Step S418). The processing of steps S404 to S414, as described above, is repeated until it is judged "Yes" in Step S414, that is, until the values of the tire dynamic element parameters are derived for all of the plurality of set rolling speeds and are stored in the memory 59.

When it is judged "Yes" in Step S414, the evaluation section 96 reads out the plurality of stored values of the tire dynamic element parameters and creates, for example, a plot diagram showing the correlation between the rolling speed and the values of the respective tire dynamic element parameters at the respective rolling speeds, and outputs the diagram to the display 58 (Step S416). When a plurality of conditions of the load to be applied to the tire is set in the condition setting section 82, the evaluation section 96 can create a plot diagram showing the load dependency of the respective dynamic element parameters as well as a correlation between the loads and the values of the respective dynamic element parameters at the respective loads, and will output the diagram to the display 58. The measurement method of the cornering characteristics, which exemplifies the evaluation method of the tire cornering characteristics of the present invention, is thus carried out.

Evaluation results of the tire cornering characteristics are shown below with respect to two tires A and B, which have different evaluation results in the actual ride feeling test, using the exemplary evaluation method of the tire cornering characteristics of the present invention.

The two tires A and B each have a size of 205/55R16. The cornering power CP and stiffness (spring) in the lateral direction, longitudinal direction and circumferential direction of the tire obtained as indoor characteristics (and showing the characteristics in the steady state) are substantially the same. The evaluation results of the actual ride feeling test show that the tire A has good steering stability and tire B has poor steering stability.

In this embodiment, a plurality of conditions were set on a load to be applied to the tires, and the respective tire dynamic element parameters obtained at different loads under the plurality of conditions were derived. Subsequently, a plot diagram was created to show the load dependency of each of the tire dynamic element parameters, meaning the correlation between the load values and the tire dynamic element parameter values at different loads.

Figure 23:
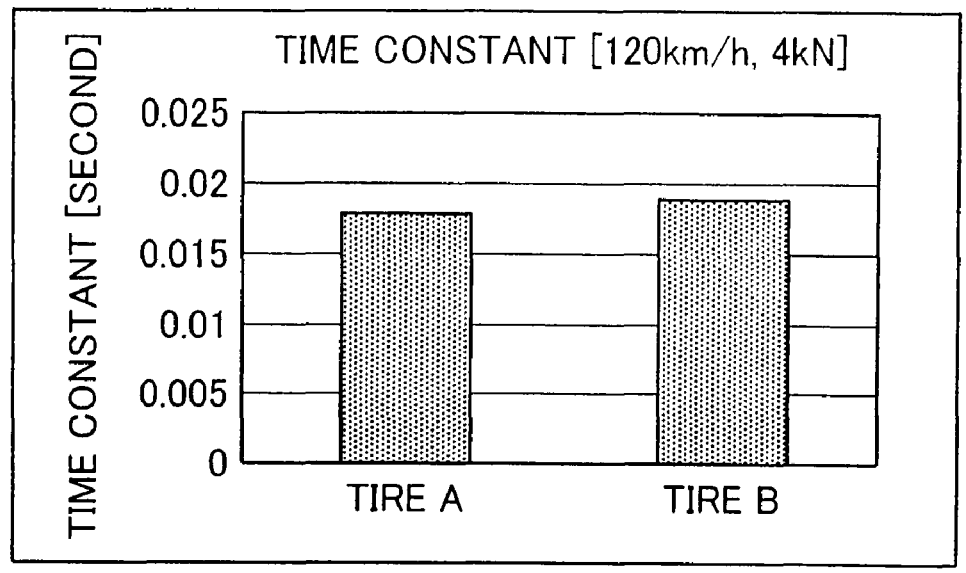
FIG. 23 is an example of the results obtained by executing the tire cornering characteristic evaluation method according to the present invention, which is a graph showing the results obtained by calculating the respective time constants of two tires.
Figure 24:
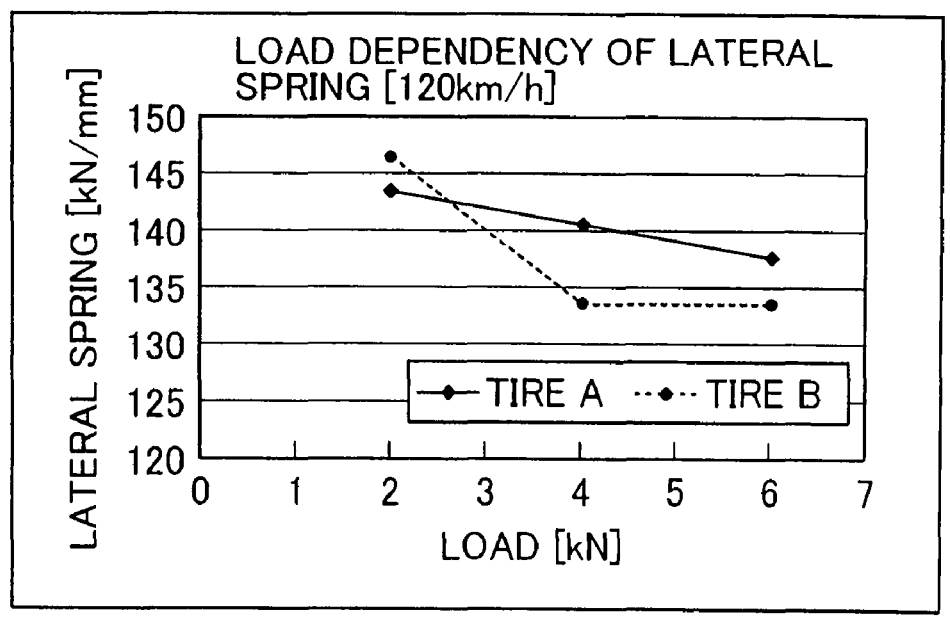
FIG. 24 is an example of the results obtained by executing the tire cornering characteristic evaluation method according to the present invention, which is a plot diagram showing the respective load dependencies of the equivalent lateral stiffness of two tires.

According to the first example, in regard to the time-series slip angle to be applied to the tire, conditions were set such that the slip angle changes as shown in FIG. 21A. FIG. 23 is a graph showing a result of the first example performed under the above-mentioned conditions, in which the time constants (the above-mentioned time constant $t_3$) of tire A and tire B at a specific rolling speed (120 km/h) and specific load (4 kN) are respectively shown. Also, FIG. 24 is a graph showing the result of the first example performed under the above-mentioned conditions, in which the values of the load dependencies of the lateral springs (the above-mentioned equivalent lateral stiffness $K_1$) of tire A and tire B are respectively shown. As can be determined based on FIGS. 23 and 24, tire B has a time constant $t_3$ greater than that of the tire A, which means that tire B is less responsive than tire A. Additionally, the load dependency of the lateral spring of tire B is weak in linearity, which indicates that tire B is ill-balanced so that the cornering characteristic greatly changes along with the deformation of the tire due to the load. Furthermore, the value of the lateral spring of tire B remains low in most of the regions (across the different values set for the load), meaning that tire B is low in stiffness. Based on the above-mentioned information, it can be evaluated that tire B has a poor cornering characteristic, or that tire B is inferior to tire A in terms of steering stability. This evaluation result matches the evaluation result obtained in the in-vehicle feeling test. By using the cornering characteristic evaluation method of the present invention, it is possible to acquire an evaluation result of the cornering characteristic that accurately matches the result acquired on the on-vehicle ride feeling test.

Figure 25:
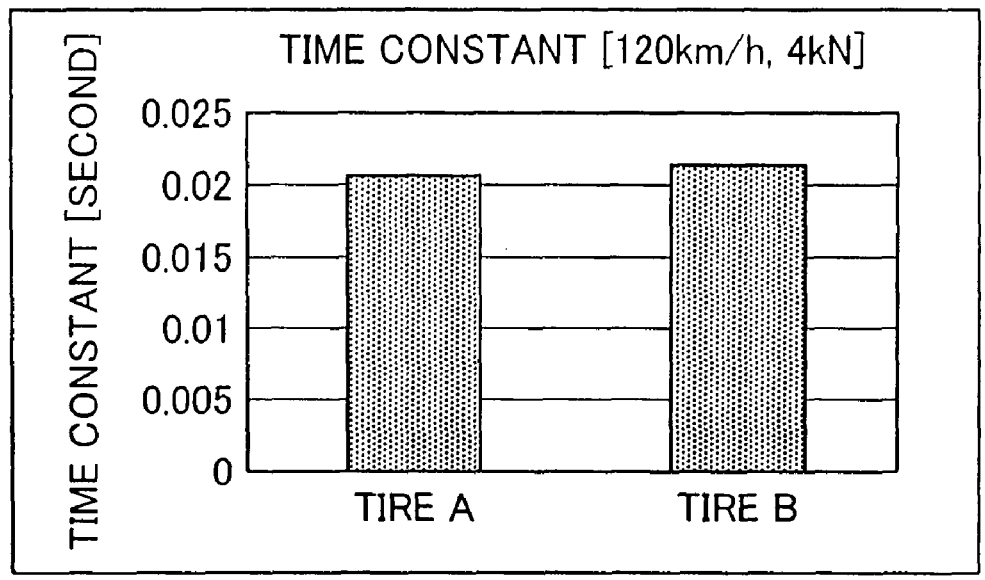
FIG. 25 is another example of the results obtained by executing the tire cornering characteristic evaluation method according to the present invention, which is a graph showing the results obtained by calculating the respective time constants of two tires.
Figure 26:
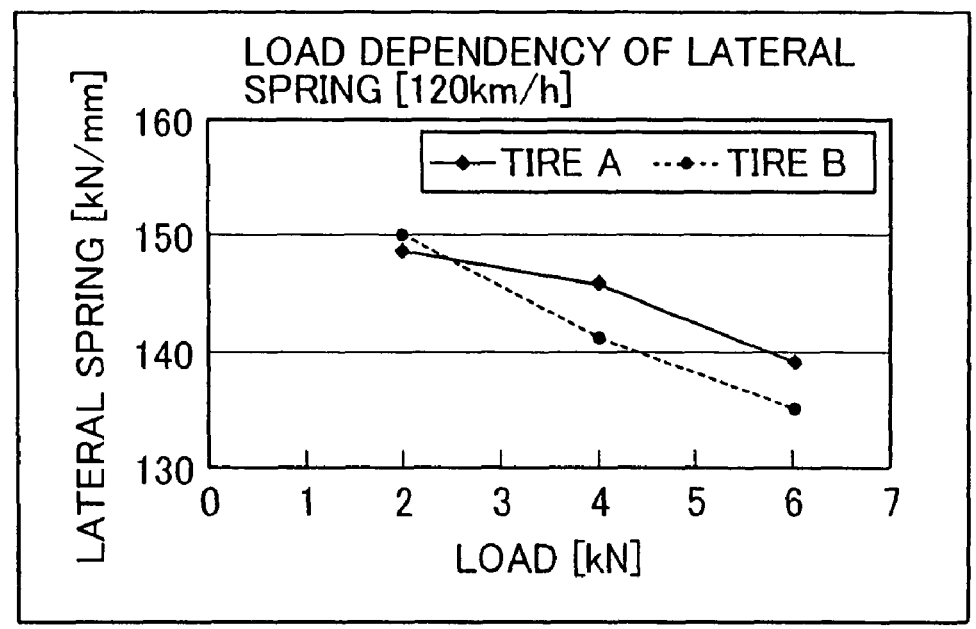
FIG. 26 is another example of the results obtained by executing the tire cornering characteristic evaluation method according to the present invention, which is a plot diagram showing the respective load dependencies of the equivalent lateral stiffness of two tires.

As a second example, conditions were set for a time-series slip angle to be applied to a tire such that the slip angle formed a sine curve of 1 Hz in frequency and ±1° in amplitude. FIG. 25 is a graph showing the result of the second example performed under the above-mentioned conditions, in which the time constants (the above-mentioned time constant $t_3$) of tire A and tire B at a specific rolling speed (120 km/h) and specific load (4 kN) are respectively shown. Also, FIG. 26 is a graph showing the result of the second example performed under the above-mentioned conditions, in which the values of the load dependencies of the lateral springs (the above-mentioned equivalent lateral stiffness $K_L$) of tire A and tire B are respectively shown. As can be determined based on FIGS. 25 and 26, even in the second example in which the slip angle to be applied to a tire forms a sine curve, tire B has a larger time constant $t_3$ than tire A, meaning that tire B is less responsive than tire A. Moreover, the value of the cross spring of tire B remains low in most of the regions (across the different values set for the load), which means that tire B is low in stiffness. In the second example, it is also evaluated that tire B has a low cornering characteristic, meaning that tire B is inferior to tire A in terms of steering stability. This evaluation result matches the evaluation result obtained in the on-vehicle ride feeling test. However, according to the second example it is difficult to determine that tire B is ill-balanced in which a load dependency of the lateral spring is weak in linearity and thus the cornering characteristic greatly changes along with the deformation of the tire due to the load. On the other hand, according to the first example, in which the slip angle is set such that the slip angle changes stepwise in chronological order, it is possible to include a relatively high-frequency component in the time-series data of the slip angle to be applied to a tire 12, thus making it possible to more accurately determine the load dependency of the lateral spring. According to the tire cornering characteristic evaluation method of the present invention, it is preferable to set, as the slip angle to be applied to a tire, a slip angle that changes stepwise.

Next, another embodiment of the tire cornering characteristic evaluation method is described.

In the aforementioned embodiment, the cornering characteristic measuring device 50 is used to obtain the lateral force data $F_y(t)$ on a tire that is actually manufactured as a test tire. However, according to this embodiment, in place of the actual manufactured tire, the tire to be evaluated is approximated by a tire finite element model comprising a limited number of elements so as to create a tire model, and the simulation data generated through the rolling of the tire model, the data corresponding to a lateral force, is acquired as the lateral force data $F_y(t)$.

Figure 27:
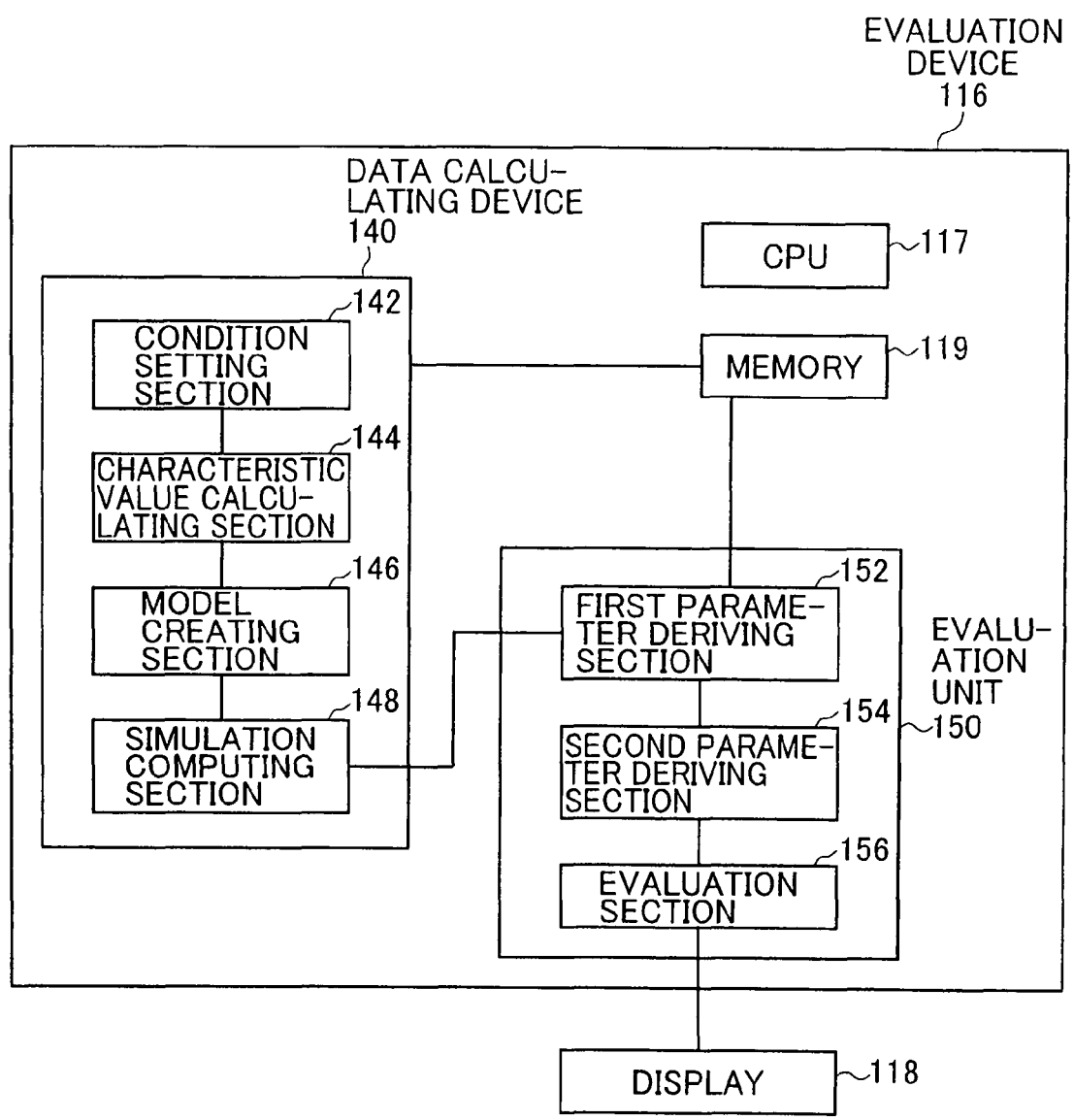
FIG. 27 is a schematic structural diagram that explains another embodiment of the tire cornering characteristic evaluation device according to the present invention.

FIG. 27 is a schematic structural diagram of an evaluation device 116 that reproduces a simulation in which a slip angle is applied to the tire finite element model which is in the rolling state, and evaluates the cornering characteristic of the tire based on the lateral force data acquired through the simulation.

The evaluation device 116 includes a data calculating unit 140 and the evaluation unit 150. The data calculating unit 140 includes a condition setting section 142, a characteristic value calculating section 144, a model creating section 146 and a simulation computing section 54 and an evaluation section 156. 148. The evaluation unit 150 includes a first parameter deriving section 152, a second parameter deriving section 1

Those sections are each structured as a module performing a sub-routine. In addition to those sections, the evaluation device 116 includes a CPU 117 that performs the processing for each of the above-mentioned sections, a memory 119 for storing the processing results acquired in each of the sections and a program of the above-mentioned linear tire model.

The first parameter deriving section 152, the second parameter deriving section 154 and the evaluation section 156 of the evaluation unit 150 each have a structure similar to the respective structures of the first parameter deriving section 92, the second parameter deriving section 94 and the evaluation section 96 of the measurement/evaluation unit 56 shown in FIG. 20. Therefore, a description thereof is omitted from this section.

The condition setting section 142 of the data calculating unit 140 sets various conditions such as those for use in creating a tire finite element model, the conditions for simulation computing and the conditions of a predicted performance, based on the conditions input through a keyboard or a mouse (not shown). For example, the values set as the conditions for creating a tire finite element model to be used in a tire behavior simulation include the values of a shape parameter of each of the component members of a product tire and of a feature/quantity parameter indicating the shape of each component member, a property value of each component member, and the value of a feature quantity indicating the property value of each component member in the product tire.

The characteristic value calculating section 144 uploads, in advance, the tire product information stored in the memory 119. The tire product information includes a strain distribution, a stress distribution and a strain energy distribution of a specific component member of the product tire. Based on the tire product information, the characteristic value calculating section 144 calculates a property value of a specific component member, such as a carcass cord, in the product tire. In calculating the property value, information on the stress/strain curve, which indicates a correlation between stress and the strain in a constituent material of the tire, is stored in advance as a database. This is used together with information on the strain distribution, which is stored in the memory 119 in advance, in order to calculate the characteristic value such as the viscoelasticity and the modulus of a component member of the product tire.

Figure 28:
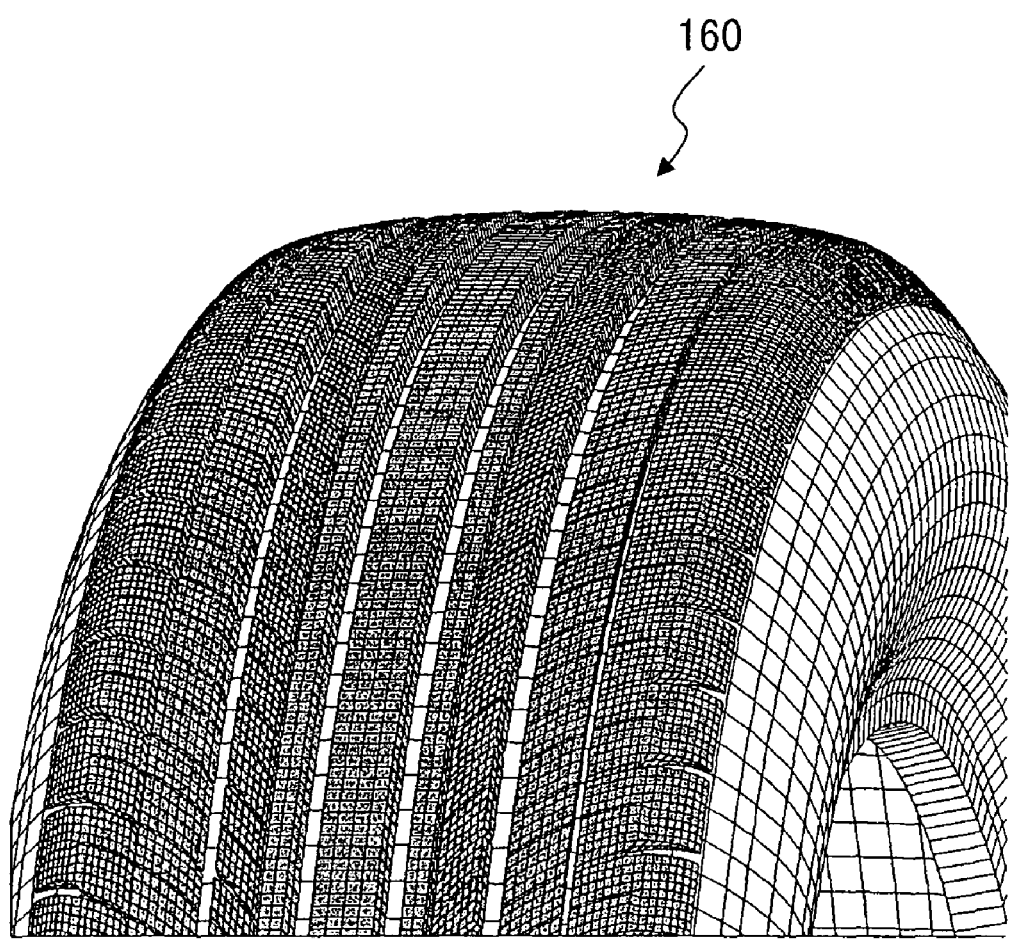
FIG. 28 shows an example of a tire finite element model created by the evaluation device shown in FIG. 27.

According to the characteristic value of the specific component member, which is calculated in the model creating section 146 and the characteristic value calculating section 144, a part of the conditions for creating a tire model set in advance by the condition setting section 142, such as a property value corresponding to the specific component member, is corrected as necessary, to thereby create a tire finite element model 160 shown in FIG. 28 based on the conditions for creating a tire model thus corrected. FIG. 28 shows a part of the tire finite element model 160. Through the creation of the model, the position coordinates of node points of the tire finite element model 160, sets of numbers obtained by encoding the node points constituting each finite element, the material constant number for each finite element and the like, constitute at least a single file to be stored in the memory 119.

The simulation computing section 148 performs simulation computing on the tire finite element model 160 thus created, according to the conditions for simulation computing, such conditions being set by the condition setting section 142. For example, a rim model (not shown), which is prepared separately, is attached to the tire finite element model 160, and the tire finite element model 160 is loaded with a constant force on an inner surface thereof so as to reproduce the state of inflation and thereby perform inflation processing. Furthermore, the tire finite element model 160, which has been subjected to inflation processing, is applied with a set load so as to be brought into contact with a rigid road-surface model (not shown), thus creating a tire finite element model 160 in the contact state. Moreover, the tire finite element model 160 in the contact state is subjected to a translation speed and angular rotation speed so as to reproduce a state in which the tire is rolling on the road surface, thus creating a tire finite element model 160 in the rolling state.

In this state, the road surface is reproduced as a dry surface and the simulation computing is performed based on that state. The simulation computing is not specifically limited, and a heretofore known computing method can be employed. For example, a slip angle may be applied to the tire in order to simulate a cornering behavior. In this case, data on lateral force $F_y(t)$ acting on the tire's axial force is calculated as output data in the simulation. The simulation computing is performed based on conditions that imitate the tire's usage conditions (such as the conditions of load and rolling speed).

The time-series lateral force data $F_y(t)$ thus calculated is sent to the first parameter deriving section 152 together with the time-series slip angle $\alpha(t)$, which is applied in the simulation.

The first parameter deriving section 152 obtains, similarly to the first parameter deriving section 52, the values for $t_3$ and $K_y$ in the above-mentioned Formula (A) by using the slip angle $\alpha(t)$ so that the output data $F(t)$ in Formula (A) matches the lateral force data $F_y(t)$ within an allowable range. The second parameter deriving section 154 obtains, similarly to the second parameter deriving section 54, an equivalent lateral stiffness $K_L$ by using the above-mentioned Formula (B) together with information on the rolling speed. The evaluation section 156 reads out a plurality of tire dynamic element parameters ($t_3$, $K_y$, $K_L$) stored in the memory 119 to create a plot diagram for showing a speed dependency that indicates a correlation between rolling speeds and the respective dynamic element parameter values at different rolling speeds, and outputs the plot diagram to the display 118. Alternatively, the evaluation section 156 creates another plot diagram for showing a load dependency that indicates a correlation between load values and the respective dynamic element parameter values at different load values, and outputs the plot diagram to the display 118.

The specific component members of the tire finite element model 160 created by the model creating section 146 include, for example, a belt cover material and a carcass cord. The characteristic value calculating section 114 calculates the property values of the belt cover material and carcass cord in the tire to be evaluated, based on information on a strain distribution pertaining to the belt cover material and carcass cord used in a product tire, with the strain distribution being pre-stored in the memory 119. In this case, the strain distribution of the carcass cord that is pre-stored in the memory 119 is obtained as follows: A carcass cord, which is used in a real product tire closely related to the tire to be evaluated, is measured and stored in advance, and the strain distribution of the carcass cord, which is the measurement result of the closely related tire, is read out and obtained as the strain distribution of the tire to be evaluated.

Specifically, first, a liner portion of the product tire is removed in order to reveal the carcass cord aligned on the product tire. At this time, a stress that has been applied in the tire manufacturing process remains in the carcass cord. With the stress remaining in the carcass cord, the carcass cord thus revealed is marked with identifiable indications (marking is performed on the carcass cord) at predetermined intervals (for example, at intervals of 5 mm to 30 mm). The indications actually marked on the carcass cord are then transferred, for example, to an inflexible tape. The intervals (L) at which the indications transferred on the inflexible tape are marked correspond to the intervals at which indications are marked on the carcass cord in a state where the stress remains in the carcass cord. Next, the marked carcass cord is taken out from the product tire without applying additional stress, and the intervals (L') at which the indications marked in the above-mentioned marking on the carcass cord thus taken out are measured. The stress applied to the carcass cord in the above-mentioned manufacturing process is removed when the carcass cord is taken out. If the carcass cord is marked at the above-mentioned intervals (L') before the application of stress in the manufacturing process, the stress applied in the manufacturing process turns the intervals (L') into the intervals (L) at which the indications transferred to the inflexible tape are marked. With the technique described above, the intervals (L) and the intervals (L') are obtained, and a strain $\epsilon$ of the carcass cord in the product tire can be obtained through the following formula:

$$\epsilon = (L - L')/L'$$

The strain is obtained for each of a plurality of carcass cords, and the intervals at which indications are marked on a carcass cord are measured for each of the carcass cords in order to calculate the strain distribution in the product tire.

Based on the strain distribution information of the carcass cord thus calculated, a property value is calculated for the carcass cord used in the tire to be evaluated. Specifically, based on the strain distribution information pertaining to the carcass cord described above, a property value (a material constant such as Young's modulus or a Poisson's ratio) is calculated. For example, information on the stress/strain curve shown in FIG. 29, which indicates the correlation between the stress applied to a carcass cord and the strain, is stored as a database, and the property value of the carcass cord in the product tire is calculated based on the strain information. According to the stress/strain curve shown in FIG. 29, the tire finite element model has a reinforcing material portion that corresponds to the carcass cord, which is set to have a material characteristic in which stiffness in the tensile direction differs from the stiffness in the compression direction. This is because, as understood from the embodiments described later, a modulus in the tensile direction and a modulus in the compression direction are made to be different from each other, whereby it is possible to acquire an evaluation result that closely resembles the actual evaluation result. The slope of the stress/strain curve of FIG. 29 at a predetermined portion (that is, the slope of a tangent line of the curve passing through a predetermined point) indicates a viscoelasticity of the carcass cord in a specific direction (a tensile direction or a compression direction). The property value of the carcass cord varies greatly, depending on whether the compression stress is applied to the carcass cord, whether the tensile stress is applied to the carcass cord and how much strain is being caused in the carcass cord. By using the stress/strain curve described above, the property value of the carcass cord is obtained based on the above-mentioned strain distribution. Additionally, the above-mentioned stress distribution or an initial stress may be applied to a portion corresponding to the carcass cord of the tire finite element model prior to performing the inflation process on the tire finite element model to be evaluated. An initial strain may also be applied.

The evaluation result of a tire based on the above-mentioned simulation is described according to a third example.

Figure 29:
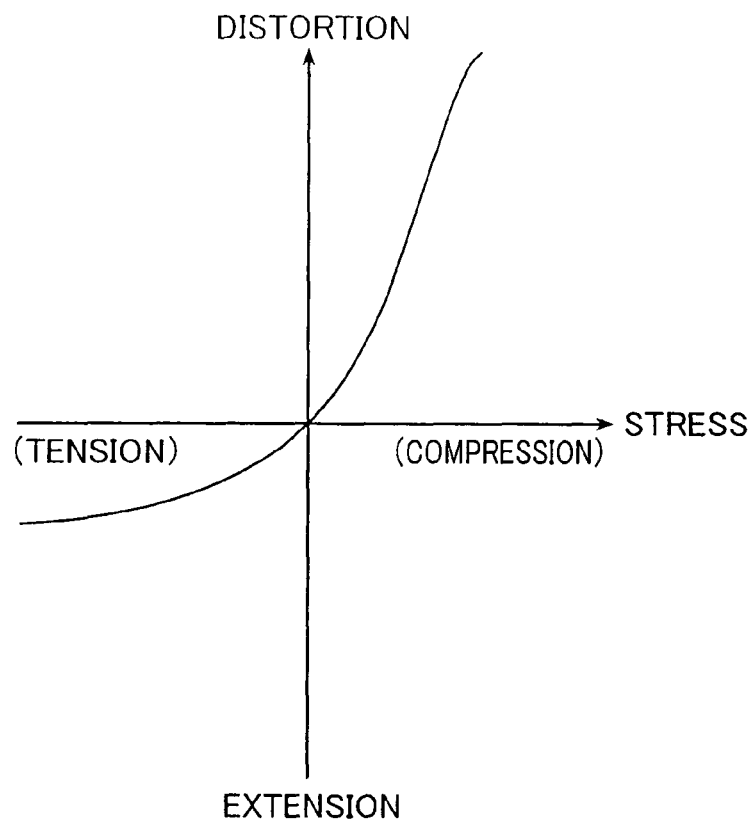
FIG. 29 is a diagram that shows an example of a stress/strain curve of a carcass cord of a tire.

A real product tire (size 205/55R16 V550) was reproduced based on a finite element in order to create a tire finite element model 160. A carcass cord in the tire finite element model 160 was modeled based on a quadrangular membrane element defined by the anisotropy as shown in FIG. 29, and a rubber layer, a bead core and the like were modeled based on a solid hexahedral or pentahedral element. A flat virtual road surface was defined by a rigid body having static friction and dynamic friction coefficients of 1.3. The number of node points and the number of elements of the tire finite element model 160 were 118028 and 112294, respectively.

Figure 30:
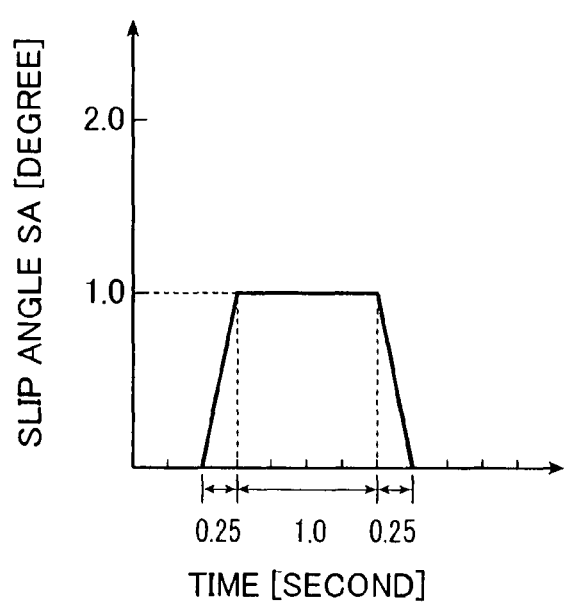
FIG. 30 is a graph that shows a time-series variation of the slip angle applied to the tire finite element model by the tire cornering characteristic measuring device shown in FIG. 27.

The simulation was performed in such a way that a rim model was attached to the tire finite element model 160, and the tire finite element model 160 was subjected to inflation processing so as to be filled to an internal pressure of 200 kPa. Subsequently, the tire finite element model 160 was subjected to different loads (of 2, 4 and 6 kN) so as to be brought into contact with the virtual road surface, and the road surface was relatively displaced so as to cause the tire finite element model 160 to roll at different speeds (40, 80, 120 and 160 km/h). When the simulation was performed under the different loads, the rolling speed was set to 40 km/h. When the simulation was performed under the different rolling speeds, the load was set to 4 kN. As the time-series slip angle α(t), a slip angle in a stepwise pattern of a trapezoidal shape, as shown in FIG. 30, was used.

Figure 31A:
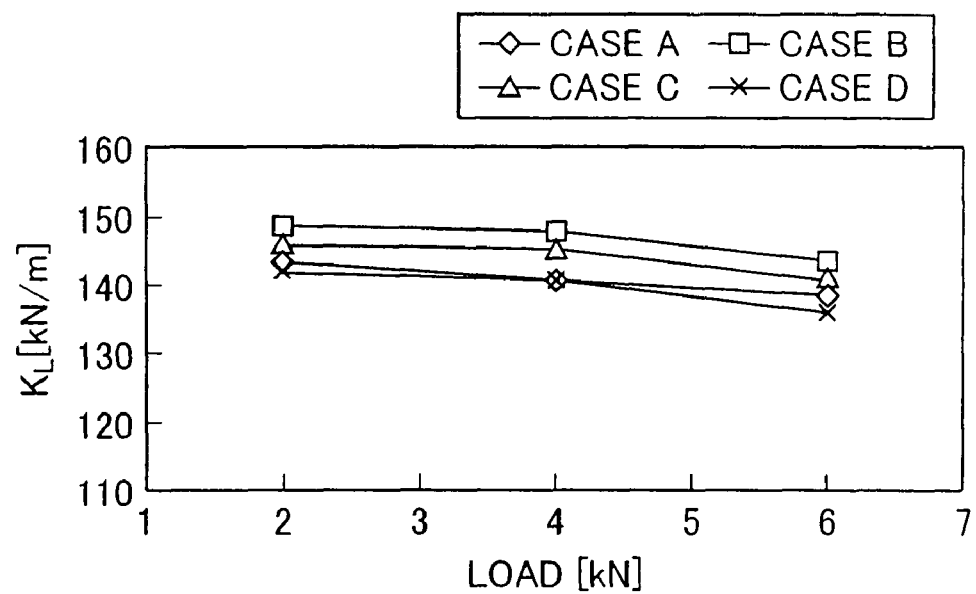
FIGS. 31A and 31B are plot diagrams that show the load dependencies of the equivalent lateral stiffness acquired by the evaluation device shown in FIG. 27.
Figure 31B:
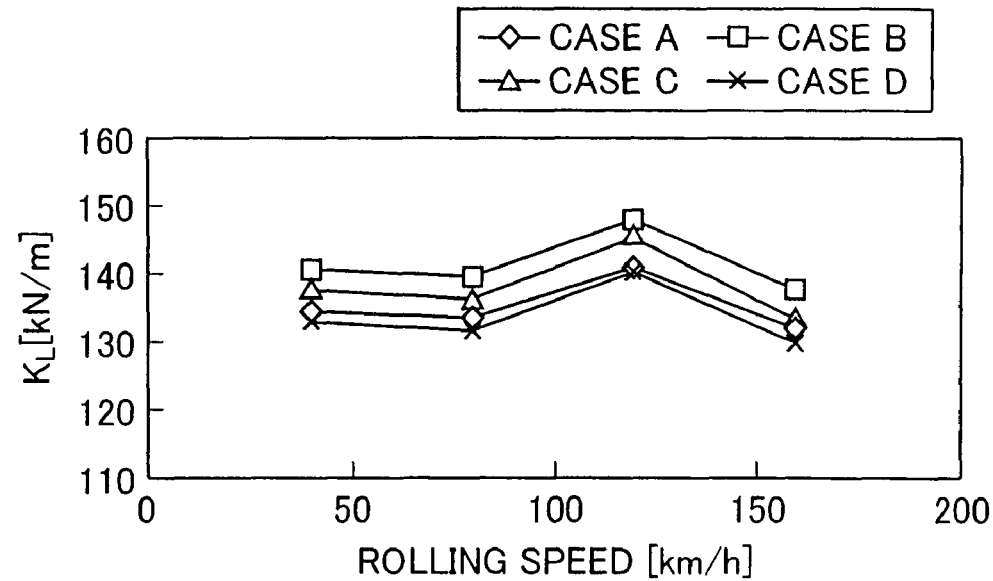

FIGS. 31A and 31B are plot diagrams showing the speed dependency and load dependency acquired through the simulation. The case A of FIGS. 31A and 31B shows the results pertaining to the speed dependency and load dependency, respectively, acquired through the measurement of a real product tire, based on which the tire finite element model 160 was created, by using the cornering characteristic measuring device 50 shown in FIG. 19. The case B shows a case whereby a compression modulus and a tensile modulus are set to the same value not only for the modulus of the carcass code but also for the modulus of a portion corresponding to the belt cover material. The case C shows a case whereby the modulus of the carcass cord and the modulus of the belt cover material are set to be bilinear (the value of the compression modulus is set to be one-hundredth of the tensile modulus value). The case D shows a case where the modulus of the carcass cord and the modulus of the belt cover material are set to be bilinear, and an initial stress (initial tension) corresponding to a strain based on the strain distribution obtained by measuring the real product tire with the above-mentioned method is applied.

As can be understood from FIGS. 31A and 31B, the equivalent lateral stiffness $K_L$ of the case C is close, as compared with case B, to the data of case A, which was acquired from the lateral force data obtained through the measurement of the real product tire. The equivalent lateral stiffness $K_L$ of the case D substantially matches the data of the case A, which was acquired from the lateral force data obtained through the measurement of the real product tire. Accordingly, it is understood that, in the tire finite element model, the actual cornering characteristic can be evaluated accurately by setting a material constant of the tire reinforcing material to be bilinear or by applying an initial stress (initial tension) to the tire reinforcing material. Particularly, it is understood that the data, which is obtained by setting a modulus of the tire reinforcing material to be bilinear as well as applying an initial stress (initial tension) to the tire reinforcing material, substantially matches the data of the case A, which was acquired from the lateral force data obtained through the measurement of the real product tire. As described above, the evaluation result of the cornering characteristic acquired by applying a slip angle to the product tire corresponds to the evaluation result of the cornering characteristic acquired in the on-vehicle ride feeling test. Therefore, the cornering characteristic, which is evaluated based on the result obtained through the simulation in which the finite element model of a tire is used, corresponds to the evaluation result of the cornering characteristic acquired in the on-vehicle ride feeling test.

Information on the speed dependency of the dynamic element parameter values ($t_3$, $K_y$, $K_L$) obtained according to the present invention can be suitably used in, for example, the development of a tire with improved steering stability in high-speed travel.

Although the description of the present invention has been made in detail, the present invention is not limited to the above-mentioned embodiment. It is apparent that various modifications and changes are possible without departing from the scope or the gist of the present invention.

What is claimed is:

1. A tire transient response data calculating method, for calculating tire transient response data during cornering with a slip angle provided as time-series data based on a tire dynamic model constituted by using at least one tire dynamic element parameter, comprising the steps of:

acquiring a value of at least one tire dynamic element parameter constituting the tire dynamic model, thereby making the tire dynamic model operable;

calculating the time-series data of a transient response of the slip angle between a tread part and a road surface in the tire dynamic model by computing a convolution integral of a response function of a first-order-lag response of the tire dynamic model with a time gradient of the time-series data of the slip angle provided to the tire dynamic model, the first-order-lag response specifying a deformation response of the tread part during cornering; and calculating, as transient response data during cornering, output data of at least one of a lateral force and self-aligning torque by using the tire dynamic model based on the calculated time-series data of the transient response of the slip angle.

2. The tire transient response data calculating method according to claim 1, wherein the time-series data of the slip angle provided to the tire dynamic model is modified by torsional deformation of the tire dynamic model which is caused by a self-aligning torque during cornering, and the modified time-series data is used for calculating the time-series data of the transient response of the slip angle.

3. The tire transient response data calculating method according to claim 2, wherein the torsional deformation of the tire which is generated by the self-aligning torque is represented by dividing a convolution integral of a response function of a first-order-lag response of the tire dynamic model with a time gradient of previous time-series data of the self-aligning torque, by a value of a stiffness contained in the tire dynamic model, the first-order-lag response specifying a deformation response of a side part during cornering.

4. The tire transient response data calculating method according to claim 1, wherein the output data calculated using the tire dynamic model comprises data of the lateral force corrected by lateral bending deformation of a belt part generated by the lateral force.

5. The tire transient response data calculating method according to claim 4, wherein the lateral bending deformation of the belt part generated by the lateral force is represented by computing a convolution integral of a response function of a first-order-lag response of the tire dynamic model with a time gradient of previous time-series data of the generated lateral force, the first-order-lag response specifying a deformation response of the belt part during cornering.

6. A tire transient response data calculating method, for calculating tire transient response data during cornering with a slip angle provided as time-series data based on a tire dynamic model, comprising the steps of:

- previously acquiring values of at least one of a lateral force and a self-aligning torque in a steady state from actual measurement of a tire by providing a tire with the time-series data of the slip angle varying across at least a range between 0 degrees and a predetermined angle as the slip angle in the steady state;
- calculating the time-series data of a transient response of the slip angle between a tread part and a road surface in the tire dynamic model by computing a convolution integral of a response function of a first-order-lag response of the tire dynamic model with a time gradient of the time-series data of the slip angle provided to the tire, the first-order-lag response specifying a deformation response of the tread part during cornering; and
- acquiring, as transient response data during cornering, the time-series data of at least one of the lateral force and self-aligning torque in a transient state by obtaining a value of at least one of the lateral force and self-aligning torque in the steady state corresponding to each value of the calculated time-series data of the transient response of the slip angle.

7. A data processing method, in which a deformation response of a tread part which specifies a transient response during cornering in a tire dynamic model is set as a first-order-lag response to calculate a value of a transient response parameter that defines the first-order-lag response, comprising the steps of:

- previously acquiring measurement data of the transient response of at least one of a lateral force and self-aligning force during cornering of a tire by providing the tire with the time-series data of a slip angle as a measurement condition;
- setting a value of the transient response parameter initially and defining a response function of the first-order-lag response, thereby making the tire dynamic model operable;
- performing simulating calculation including:
  - obtaining the time-series data of a transient response of the slip angle between the tread part and a road surface in the tire dynamic model by computing a convolution integral of the defined response function of the first-order-lag response with a time gradient of the time-series data of the slip angle provided to the tire as the measurement condition;
  - calculating, as the time-series data of at least one of the lateral force and the self-aligning torque in a transient state during cornering, values of at least one of the lateral force and the self-aligning torque by using the tire dynamic model based on the obtained time-series data of the transient response of the slip angle; and
  - obtaining a sum of square residuals between the calculated time-series data of at least one of the lateral force and self-aligning torque and the measurement data of the tire, repeating the simulating calculation while correcting the set value of the transient response parameter until the sum of square residuals becomes minimum, and determining the value of the transient response parameter obtained when the sum of square residuals becomes minimum as the value of the transient response parameter that defines the first-order-lag response.

8. A data processing method, in which a deformation response of a tread part which specifies a transient response during cornering in a tire dynamic model is set as a first-order-lag response to calculate a value of a transient response parameter that defines the first-order-lag response, comprising the steps of:

- previously acquiring measurement data of the transient response of at least one of a lateral force and a self-aligning torque during cornering of a tire by providing the tire with the time-series data of a slip angle, which varies across at least a range between 0 degrees and a predetermined angle while the slip angle reciprocates, as a measurement condition;
- setting the value of the transient response parameter initially and defining a response function of the first-order-lag response, thereby making the tire dynamic model operable;
- performing regression calculation including:
  - obtaining the time-series data of a transient response of the slip angle between the tread part and a road surface in the tire dynamic model by computing a convolution integral of the response function of the first-order-lag response with a time gradient of the time-series data of the slip angle provided to the tire as the measurement condition;
  - subjecting a characteristic curve, which represents a values value of at least one of the lateral force and the self-aligning torque with respect to values of the obtained time-series data of the transient response of the slip angle, to least square regression into a single smooth curve by using a curve function; and
  - obtaining a sum of square residuals between the least square regression curve obtained by the least square regression and the characteristic curve; and
- repeating the regression calculation while correcting the set value of the transient response parameter until the calculated sum of square residuals becomes minimum, and determining the value of the transient response parameter obtained when the sum of square residuals becomes minimum as the value of the transient response parameter that defines the first-order-lag response.

9. A tire transient response data calculating method, for calculating tire transient response data during braking/driving with a slip ratio in a longitudinal direction of a tire provided as time-series data based on a tire dynamic model constituted by using at least one tire dynamic element parameter, comprising the steps of:

- acquiring a value of the tire dynamic element parameter constituting the tire dynamic model, thereby making the tire dynamic model operable;
- calculating the time-series data of a transient response of the slip ratio between a tread part and a road surface in the tire dynamic model by computing a convolution integral of a response function of a first-order-lag response of the tire dynamic model with a time gradient of the time-series data of the slip ratio provided to the tire dynamic model, the first-order-lag response specifying a deformation response of the tread part during braking/driving; and
- calculating, as transient response data during braking/driving, output data of a longitudinal force by using the tire dynamic model based on the time-series data of the transient response of the slip ratio.

10. A tire transient response data calculating method, for calculating tire transient response data during braking/driving with a slip ratio in a longitudinal direction of a tire provided as time-series data based on a tire dynamic model, comprising the steps of:

- previously acquiring values of a longitudinal force in a steady state from actual measurement of the tire when the time-series data of the slip ratio varying across at least a range between 0 degrees and a predetermined slip ratio is provided as the slip ratio in the steady state;

calculating the time-series data of a transient response of the slip ratio between a tread part and a road surface in the tire dynamic model by computing a convolution integral of a response function of a first-order-lag response of the tire dynamic model with a time gradient of the time-series data of the slip ratio, the first-order-lag response specifying a deformation response of the tread part during braking/driving; and acquiring, as transient response data during braking/driving, the time-series data of the longitudinal force in a transient state by obtaining a value of the longitudinal force in the steady state corresponding to each value of the calculated time-series data of the transient response of the slip ratio.

11. A data processing method, in which a deformation response of a tread part which specifies a transient response during braking/driving of a tire in a tire dynamic model is set as a first-order-lag response to calculate a value of a transient response parameter that defines the first-order-lag response, comprising the steps of:

previously acquiring measurement data of the transient response of a longitudinal force during braking/driving of a tire by providing the tire with the time-series data of a slip ratio, which varies across at least a range between 0 degrees and a predetermined slip ratio while the slip ratio reciprocates, as a measurement condition;

setting the value of the transient response parameter initially and defining a response function of the first-order-lag response, thereby making the tire dynamic model operable;

performing regression calculation including:
obtaining the time-series data of a transient response of the slip ratio between the tread part and a road surface in the tire dynamic model by computing a convolution integral of the response function of the first-order-lag response with a time gradient of the time-series data of the slip ratio provided to the tire as the measurement condition;

subjecting a characteristic curve, which represents values of the longitudinal force with respect to values of the obtained time-series data of the transient response of the slip ratio, to least square regression into a single smooth curve by using a curve function; and obtaining a sum of square residuals between the least square regression curve obtained by the least square regression and the characteristic curve; and repeating the regression calculation while correcting the set value of the transient response parameter until the calculated sum of square residuals becomes minimum, and determining the value of the transient response parameter obtained when the sum of square residuals becomes minimum as the value of the transient response parameter that defines the first-order-lag response.

12. A data processing method, in which a deformation response of a tread part which specifies a transient response during braking/driving in a tire dynamic model constituted by using at least one tire dynamic element parameter is set as a first-order-lag response to calculate a value of a transient response parameter that defines the first-order-lag response, comprising the steps of:

previously acquiring measurement data of the transient response of a longitudinal force during braking/driving of a tire by providing the tire with the time-series data of a slip ratio in a longitudinal direction of the tire as a measurement condition;

setting the value of the transient response parameter initially and defining a response function of the first-order-lag response, thereby making the tire dynamic model operable;

performing simulating calculation including:
obtaining the time-series data of a transient response of the slip ratio between the tread part and a road surface in the tire dynamic model by computing a convolution integral of the defined response function of the first-order-lag response with a time gradient of the time-series data of the slip ratio provided to the tire as the measurement condition;

calculating a longitudinal force by using the tire dynamic model based on a value of the obtained time-series data of the transient response of the slip ratio, to obtain the time-series data of the longitudinal force in a transient state during braking/driving; and calculating a sum of square residuals of the calculated time-series data of the longitudinal force and the measurement data of the tire, repeating the simulating calculation while correcting the set value of the transient response parameter until the sum of square residuals becomes minimum, and determining the value of the transient response parameter obtained when the sum of square residuals becomes minimum as the value of the transient response parameter that defines the first-order-lag response.

13. A tire designing method, comprising the steps of:
calculating and outputting tire transient response data by using a tire transient response data calculating method for calculating the tire transient response data during cornering with a slip angle provided as time-series data based on a tire dynamic model constituted by using at least one tire dynamic element parameter, the tire transient response data calculating method including the steps of:

acquiring a value of the tire dynamic element parameter constituting the tire dynamic model, thereby making the tire dynamic model operable;

calculating the time-series data of a transient response of the slip angle between a tread part and a road surface in the tire dynamic model by computing a convolution integral of a response function of a first-order-lag response of the tire dynamic model, which specifies a deformation response of the tread part during cornering, with a time gradient of the time-series data of the slip angle provided to the tire dynamic model; and calculating, as transient response data during cornering, output data of at least one of a lateral force and self-aligning torque by using the tire dynamic model based on the time-series data of the transient response of the slip angle;

repeatedly calculating and outputting the tire transient response data while correcting the value of the tire dynamic element parameter or a value of a transient response parameter that defines the first-order-lag response by adjusting a tire component member that defines the tire dynamic element parameter or the first-order-lag response until the output transient response data satisfies a preset target condition; and determining the tire component member as a target tire component member when the output data satisfies the target condition.

14. A tire designing method, comprising the steps of:
calculating and outputting tire transient response data by using a tire transient response data calculating method for calculating the tire transient response data during cornering with a slip angle provided as time-series data based on a tire dynamic model,
the tire transient response data calculating method including the steps of:
previously acquiring values of at least one of a lateral force and a self-aligning torque in a steady state from actual measurement of a tire by providing a tire with the time-series data of the slip angle varying across at least a range between 0 degrees and a predetermined angle as the slip angle in the steady state;
calculating the time-series data of a transient response of the slip angle between a tread part and a road surface in the tire dynamic model by computing a convolution integral of a response function of a first-order-lag response of the tire dynamic model, which specifies a deformation response of the tread part during cornering, with a time gradient of the time-series data of the slip angle provided to the tire; and
calculating, as transient response data during cornering, the time-series data of at least one of the lateral force and self-aligning torque in a transient state by obtaining a value of one of the lateral force and self-aligning torque in the steady state corresponding to a value of the calculated time-series data of the transient response of the slip angle;
repeatedly calculating and outputting the tire transient response data while correcting a value of a transient response parameter that defines the first-order-lag response by adjusting a tire component member that defines the first-order-lag response until the output transient response data satisfies a preset target condition; and
determining the tire component member as a target tire component member when the output data satisfies the target condition.

15. A tire designing method, comprising the steps of:
calculating and outputting tire transient response data by using a tire transient response data calculating method for calculating the tire transient response data during braking/driving with a slip ratio in a longitudinal direction of a tire provided as time-series data based on a tire dynamic model constituted by using at least one of tire dynamic element parameter,
the tire transient response data calculating method including the steps of:
acquiring a value of the tire dynamic element parameter constituting the tire dynamic model, thereby making the tire dynamic model operable;
calculating the time-series data of a transient response of the slip ratio between a tread part and a road surface in the tire dynamic model by computing a convolution integral of a response function of a first-order-lag response of the tire dynamic model, which specifies a deformation response of the tread part during braking/driving, with a time gradient of the time-series data of the slip ratio provided to the tire dynamic model; and
calculating, as transient response data during braking/driving, output data of a longitudinal force by using the tire dynamic model based on the time-series data of the transient response of the slip ratio;
repeatedly calculating and outputting the tire transient response data while correcting a value of the tire dynamic element parameter or a value of a transient response parameter that defines the first-order-lag response by adjusting a tire component member that defines one of the tire dynamic element parameter or the first-order-lag response until the output transient response data satisfies a preset target condition; and
determining the tire component member as a target tire component member when the output data satisfies the target condition.

16. A tire designing method, comprising the steps of:
calculating and outputting tire transient response data by using a tire transient response data calculating method for calculating the tire transient response data during braking/driving with a slip ratio in a longitudinal direction of a tire provided as time-series data based on a tire dynamic model,
the tire transient response data calculating method including the steps of:
previously acquiring a value of a longitudinal force in a steady state from actual measurement of the tire when the time-series data of the slip ratio varying across at least a range between 0 degrees and a predetermined slip ratio is provided as the slip ratio in the steady state;
calculating the time-series data of a transient response of the slip ratio between a tread part and a road surface in the tire dynamic model by computing a convolution integral of a response function of a first-order-lag response of the tire dynamic model, which specifies a deformation response of the tread part during braking/driving, with a time gradient of the time-series data of the slip ratio; and
acquiring, as transient response data during braking/driving, the time-series data of the longitudinal force in a transient state by obtaining a value of the longitudinal force in the steady state corresponding to a value of the calculated time-series data of the transient response of the slip ratio;
repeatedly calculating and outputting the tire transient response data while correcting a value of a transient response parameter that defines the first-order-lag response by adjusting a tire component member that defines the first-order-lag response until the output transient response data satisfies a preset target condition; and
determining the tire component member as a target tire component member when the output data satisfies the target condition.

17. A vehicle motion predicting method, comprising the steps of:
calculating and outputting tire transient response data by using a tire transient response data calculating method for calculating the tire transient response data during cornering with a slip angle provided as time-series data based on a tire dynamic model constituted by using at least one tire dynamic element parameter,
the tire transient response data calculating method including the steps of:
acquiring a value of the tire dynamic element parameter constituting the tire dynamic model, thereby making the tire dynamic model operable;
calculating the time-series data of a transient response of the slip angle between a tread part and a road surface in the tire dynamic model by computing a convolution integral of a response function of a first-order-lag response of the tire dynamic model, which specifies a deformation response of the tread part during cornering, with a time gradient of the time-series data of the slip angle provided to the tire dynamic model; and calculating, as transient response data during cornering, output data of at least one of a lateral force and self-aligning torque by using the tire dynamic model based on the time-series data of the transient response of the slip angle; and predicting a vehicle motion based on a vehicle model by providing the transient response data to an axle portion of the vehicle model.

18. A vehicle motion predicting method, comprising the steps of:

calculating and outputting tire transient response data by using a tire transient response data calculating method for calculating the tire transient response data during cornering with a slip angle provided as time-series data based on a tire dynamic model, the tire transient response data calculating method including the steps of:

previously acquiring values of at least one of a lateral force and a self-aligning torque in a steady state from actual measurement of a tire by providing a tire with the time-series data of the slip angle varying across at least a range between 0 degrees and a predetermined angle as the slip angle in the steady state;

calculating the time-series data of a transient response of the slip angle between a tread part and a road surface in the tire dynamic model by computing a convolution integral of a response function of a first-order-lag response of the tire dynamic model, which specifies a deformation response of the tread part during cornering, with a time gradient of the time-series data of the slip angle provided to the tire; and acquiring, as transient response data during cornering, the time-series data of one of the lateral force and self-aligning torque in a transient state by obtaining a value of at least one of the lateral force and self-aligning torque in the steady state corresponding to a value of the calculated time-series data of the transient response of the slip angle; and predicting a vehicle motion based on a vehicle model by providing the transient response data to an axle portion of the vehicle model.

19. A vehicle motion predicting method, comprising the steps of:

calculating and outputting tire transient response data by using a tire transient response data calculating method for calculating the tire transient response data during braking/driving with a slip ratio in a longitudinal direction of a tire provided as time-series data based on a tire dynamic model constituted by using at least one tire dynamic element parameter, the tire transient response data calculating method including the steps of:

acquiring a value of the tire dynamic element parameter constituting the tire dynamic model, thereby making the tire dynamic model operable;

calculating the time-series data of a transient response of the slip ratio between a tread part and a road surface in the tire dynamic model by computing a convolution integral of a response function of a first-order-lag response of the tire dynamic model, which specifies a deformation response of the tread part during braking/driving, with a time gradient of the time-series data of the slip ratio provided to the tire dynamic model; and calculating, as transient response data during braking/driving, output data of a longitudinal force by using the tire dynamic model based on the time-series data of the transient response of the slip ratio; and predicting a vehicle motion based on a vehicle model by providing the transient response data to an axle portion of the vehicle model.

20. A vehicle motion predicting method, comprising the steps of:

calculating and outputting tire transient response data by using a tire transient response data calculating method for calculating the tire transient response data during braking/driving with a slip ratio in a longitudinal direction of a tire provided as time-series data based on a tire dynamic model, the tire transient response data calculating method including the steps of:

previously acquiring values of a longitudinal force in a steady state from actual measurement of the tire when the time-series data of the slip ratio varying across at least a range between 0 degrees and a predetermined slip ratio is provided as the slip ratio in the steady state;

calculating the time-series data of a transient response of the slip ratio between a tread part and a road surface in the tire dynamic model by computing a convolution integral of a response function of a first-order-lag response of the tire dynamic model, which specifies a deformation response of the tread part during braking/driving, with a time gradient of the time-series data of the slip ratio; and acquiring, as transient response data during braking/driving, the time-series data of the longitudinal force in a transient state by obtaining a value of the longitudinal force in the steady state corresponding to a value of the calculated time-series data of the transient response of the slip ratio; and predicting a vehicle motion based on a vehicle model by providing the transient response data to an axle portion of the vehicle model.

21. A method of evaluating a cornering characteristic of a tire when a slip angle is provided as time-series data, comprising the steps of:

acquiring time-series lateral force data with respect to the time-series data of the slip angle, regarding the tire which generates a tire lateral force by being brought into contact with a ground in a contact patch and rolling at a predetermined rolling speed; and deriving a value of a tire dynamic element parameter representing the cornering characteristic of the tire by using: a transient response calculation model that is constituted by using at least one tire dynamic element parameter and is used to calculate output data corresponding to the lateral force data of a transient response generated in the tire with respect to the time-series data of the slip angle; and the acquired lateral force data, wherein the step of deriving the value of the tire dynamic element parameter is performed by using the time-series data of a transient response of the slip angle obtained by computing a convolution integral of a response function of a first-order-lag response of the transient response calculation model, which specifies a deformation response of a tread part of the tire during cornering, with a time gradient of the time-series data of the slip angle provided to the transient response calculation model.

22. The method of evaluating a cornering characteristic of a tire according to claim 21, wherein the step of acquiring the lateral force data is performed by reproducing an evaluation target tire with a tire finite element model, which is obtained by dividing the evaluation target tire into a finite number of elements, and by using a finite element method to acquire, as the lateral force data, simulation data of the lateral force acting on the tire finite element model which is brought into contact with the ground in the contact patch and caused to roll at the predetermined rolling speed and to which a time-series slip angle is input.

23. The method of evaluating a cornering characteristic of a tire according to claim 22, wherein the tire finite element model is coupled with a rim model for reproducing a rim, and reproduces the tire brought into contact with the ground in the contact patch and rolling at the predetermined rolling speed by bringing the tire finite element model into contact with a flat virtual road surface in the contact patch and moving the tire finite element model at the predetermined rolling speed relatively to the virtual road surface.

24. The method of evaluating a cornering characteristic of a tire according to claim 22, wherein the tire finite element model includes a reinforcement material portion corresponding to a cord reinforcing material of the tire, the reinforcement material portion having such a material characteristic that a stiffness along a tensile direction and a stiffness along a compression direction are different from each other.

25. The method of evaluating a cornering characteristic of a tire according to claim 22, wherein the tire finite element model is subjected to an inflation process for simulating tire inflation, and the inflation process is performed after one of an initial stress and an initial strain is applied to at least one portion of the tire finite element model.

26. The method of evaluating a cornering characteristic of a tire according to claim 21, wherein the step of acquiring the lateral force data is performed by providing a time-series slip angle to the tire while bringing the tire into contact with the ground in the contact patch and rolling the tire at the predetermined rolling speed, and by acquiring, as the lateral force data, measurement data of the time-series tire lateral force corresponding to the slip angle.

27. The method of evaluating a cornering characteristic of a tire according to claim 21, wherein:
the transient response calculation model is represented by setting a transient response of the tire lateral force with respect to the slip angle as a first-order-lag response; and
the slip angle to be input ranges within such a linear range that the slip angle and the response of the tire lateral force with respect to the slip angle are in a substantially linear relation.

28. The method of evaluating a cornering characteristic of a tire according to claim 21, wherein the step of deriving the value of the tire dynamic element parameter is performed by using the time-series data of the input slip angle and the time-series lateral force data corresponding to the time-series data of the slip angle in such a manner that the output data of the transient response calculation model matches the time-series lateral force data.

29. The method of evaluating a cornering characteristic of a tire according to claim 21, wherein the slip angle ranges from −2.0 degrees to 2.0 degrees.

30. The method of evaluating a cornering characteristic of a tire according to claim 29, wherein:
when the output data is represented by F(t), the transient response calculation model contains a formula represented by Formula (A) described below; and
the step of deriving the value of the tire dynamic element parameter includes obtaining a value of a cornering stiffness $K_y$, and a value of a time constant $t_3$, which are dynamic element parameters of Formula (A) described below, by using the input time-series slip angle $\alpha(t)$ in such a manner that the F(t) within Formula (A) described below matches the time-series lateral force data $F_y(t)$ corresponding to the slip angle $\alpha(t)$.

$$F(t) = K_y \cdot \tan\left\{ \int_0^t \left[ 1 - \exp\left( -\frac{t-t'}{t_3} \right) \right] \frac{d\alpha(t')}{dt'} dt' \right\}. \quad (A)$$

31. The method of evaluating a cornering characteristic of a tire according to claim 30, wherein:
the output data calculated by the transient response calculation model comprises data of the tire lateral force transmitting to a wheel side via an equivalent stiffness $K_L$ of an entirety of the tire with respect to an input of the slip angle; and
when the predetermined rolling speed at a time of acquiring the lateral force data is assumed to be V, the step of deriving the value of the tire dynamic element parameter includes deriving a value of the equivalent stiffness $K_L$ representing a transmission characteristic of the tire lateral force by substituting the value of the cornering stiffness $K_y$, and the value of the time constant $t_3$, which are obtained by using the above-mentioned Formula (A), and the rolling speed V, into Formula (B) described below.

$$t_3 = \frac{K_y}{K_L V}. \quad (B)$$

32. An apparatus for evaluating a cornering characteristic of a tire under a condition in which a slip angle is provided as time-series data, comprising:
a data acquiring section for acquiring time-series lateral force data with respect to a time-series slip angle, regarding the tire being brought into contact with a ground in a contact patch and rolling at a predetermined rolling speed;
a deriving section for deriving a value of a tire dynamic element parameter representing the cornering characteristic of the tire by using: a transient response calculation model that is constituted by using at least one tire dynamic element parameter and is used to calculate output data corresponding to the lateral force data of a transient response generated in the tire with respect to the slip angle; and the lateral force data; and
a memory in which the value of the tire dynamic element parameter derived by the deriving section representing the cornering characteristic of the tire is stored,
wherein the deriving section derives the value of the tire dynamic element parameter by using the time-series data of a transient response of the slip angle obtained by computing a convolution integral of a response function of a first-order-lag response, which specifies a deformation response of a tread part of the tire during cornering, with a time gradient of the time-series data of the slip angle provided to the transient response calculation model.

33. The apparatus for evaluating a cornering characteristic of a tire according to claim 32, further comprising:
a evaluation section for reading out values of the tire dynamic element parameters stored in the memory, and creating a diagram showing a load dependency of the values of the respective dynamic element parameters or a rolling speed dependency of the values of the respective dynamic element parameters; and a display to which the diagram representing the load dependency or the rolling speed dependency of the values of the respective dynamic element parameters created by evaluation section is displayed.

34. The apparatus for evaluating a cornering characteristic of a tire according to claim 32 or 33, further comprising:

a sensor for measuring the time-series lateral force data with respect to the time-series slip angle, regarding the tire being brought into contact with the ground in the contact patch and rolling at the predetermined rolling speed, wherein the data acquiring section acquires the time-series lateral force data measured by the sensor.

* * * * *